United States Patent
Zhou et al.

(10) Patent No.: US 12,435,085 B2
(45) Date of Patent: Oct. 7, 2025

(54) CRYSTALLINE FORMS AND FORMULATIONS OF A VCP/p97 INHIBITOR

(71) Applicant: CASI Pharmaceuticals, Inc., Rockville, MD (US)

(72) Inventors: Han-Jie Zhou, Foster City, CA (US); Bing Yao, Millbrae, CA (US)

(73) Assignee: CASI Pharmaceuticals, Inc., Rockville, MD (US)

(*) Notice: Subject to any disclaimer, the term of this patent is extended or adjusted under 35 U.S.C. 154(b) by 376 days.

(21) Appl. No.: 17/998,333

(22) PCT Filed: May 10, 2021

(86) PCT No.: PCT/US2021/031621
§ 371 (c)(1),
(2) Date: Nov. 9, 2022

(87) PCT Pub. No.: WO2021/231322
PCT Pub. Date: Nov. 18, 2021

(65) Prior Publication Data
US 2023/0174529 A1 Jun. 8, 2023

Related U.S. Application Data

(60) Provisional application No. 63/023,123, filed on May 11, 2020.

(51) Int. Cl.
*C07D 471/04* (2006.01)
*A61K 9/48* (2006.01)
*A61K 45/06* (2006.01)

(52) U.S. Cl.
CPC ............ *C07D 471/04* (2013.01); *A61K 9/485* (2013.01); *A61K 9/4858* (2013.01); *A61K 9/4866* (2013.01); *A61K 45/06* (2013.01); *C07B 2200/13* (2013.01)

(58) Field of Classification Search
CPC .... C07D 471/04; A61K 9/485; A61K 9/4858; A61K 9/4866; A61K 45/06; C07B 2200/13
See application file for complete search history.

(56) References Cited

U.S. PATENT DOCUMENTS

| | | | |
|---|---|---|---|
| 4,327,725 A | 5/1982 | Cortese et al. | |
| 4,624,848 A | 11/1986 | Lee | |
| 4,968,509 A | 11/1990 | Radebaugh et al. | |
| 5,323,907 A | 6/1994 | Kalvelage | |
| 5,456,923 A | 10/1995 | Nakamichi et al. | |
| 5,461,140 A | 10/1995 | Heller et al. | |
| 5,516,527 A | 5/1996 | Curatolo | |
| 5,622,721 A | 4/1997 | Dansereau et al. | |
| 5,686,105 A | 11/1997 | Kelm et al. | |
| 5,700,410 A | 12/1997 | Nakamichi et al. | |
| 5,977,175 A | 11/1999 | Lin | |
| 6,465,014 B1 | 10/2002 | Moroni et al. | |
| 6,932,983 B1 | 8/2005 | Straub et al. | |
| 9,828,363 B2 | 11/2017 | Zhou et al. | |
| 2016/0304495 A1 | 10/2016 | Wustrow et al. | |
| 2016/0332990 A1 | 11/2016 | Zhou et al. | |
| 2017/0267679 A1 | 9/2017 | Zhou et al. | |
| 2018/0044325 A1 | 2/2018 | Zhou et al. | |

FOREIGN PATENT DOCUMENTS

| | | | |
|---|---|---|---|
| CN | 106458996 | 2/2017 | |
| CN | 116234804 | 6/2023 | |
| EP | 4149934 | 3/2023 | |
| TW | 201605833 | 2/2016 | |
| TW | 202208357 | 3/2022 | |
| WO | WO-2015109285 A1 * | 7/2015 | ............... A61P 3/06 |
| WO | WO-2016200840 A1 | 12/2016 | |
| WO | WO-2021231322 A1 | 11/2021 | |
| WO | WO-2021231323 A1 | 11/2021 | |

OTHER PUBLICATIONS

Berge et al. Pharmaceutical Salts. Journal of Pharmaceutical Sciences 66(1):1-19 (Jan. 1977).
Bernstein. Crystal Structure Prediction and Polymorphism. ACA Transactions 39:14-23 (2004).
Braga et al. Making crystals from crystals: a green route to crystal engineering and polymorphism. J. Royal Soc. Chem. Commun 29:3635-3645 (2005).
Cheson et al. Clinical application and proposal for modification of the International Working Group (IWG) response criteria in myelodysplasia. Blood 108(2):419-25 (2006).
Christianson et al., Defining human ERAD networks through an integrative mapping strategy. Nat Cell Biol 14:93-105 (2012).
Döhner et al. Diagnosis and management of AML in adults: 2017 ELN recommendations from an international expert panel. Blood 129(4):424-447 (2017).
Dumortier et al., A review of poloxamer 407 pharmaceutical and pharmacological characteristics. Pharm Res. 23(12):2709-2728 (2006).
Hosseini et al., Direct compression of cushion-layered ethyl cellulose-coated extended release pellets into rapidly disintegrating tablets without changes in the release profile. Int J Pharm. 457(2):503-509 (2013).

(Continued)

*Primary Examiner* — Joseph K McKane
*Assistant Examiner* — Quincy McKoy
(74) *Attorney, Agent, or Firm* — Schwegman Lundberg & Woessner, P.A.

(57) ABSTRACT

Described herein are crystalline forms of 1-(4-(benzylamino)-5,6,7,8-tetrahydropyrido[2,3-d]pyrimidin-2-yl)-2-methyl-1H-indole-4-carboxamide, and pharmaceutically acceptable salts and solvates thereof. Also described herein are pharmaceutical formulations of 1-(4-(benzylamino)-5,6,7,8-tetrahydropyrido[2,3-d]pyrimidin-2-yl)-2-methyl-1H-indole-4-carboxamide, and pharmaceutically acceptable salts and solvates thereof.

17 Claims, 13 Drawing Sheets

(56) References Cited

OTHER PUBLICATIONS

Jonat et al., Investigation of compacted hydrophilic and hydrophobic colloidal silicon dioxides as glidants for pharmaceutical excipients. Powder Technology 141:31-43 (2004).
Jones et al.: Pharmaceutical Cocrystals: An Emerging Approach to Physical Property Enhancement. MRS Bulletin 31:875-879 (2006).
Liberman et al. Pharmaceutical Dosage Forms. 2nd Ed. 1:209-214 (1990).
Marais et al., Effect of compression force, humidity and disintegrant concentration on the disintegration and dissolution of directly compressed furosemide tablets using croscarmellose sodium as disintegrant. Tropical Journal of Pharmaceutical Research 2(1): 125-135 (2003).
PCT/US2021/031621 International Invitation to Pay Additional Fees dated Jul. 13, 2021.
PCT/US2021/031621 International Search Report and Written Opinion dated Sep. 30, 2021.
PCT/US2021/031622 International Search Report and Written Opinion dated Aug. 9, 2021.
Price. The computational prediction of pharmaceutical crystal structures and polymorphism. Advanced Drug Delivery Reviews 56:301-319 (2004).
Savona et al. An international consortium proposal of uniform response criteria for myelodysplastic/myeloproliferative neoplasms (MDS/MPN) in adults. Blood 125(12):1857-65 (2015).
Singh et al. Encyclopedia of Pharmaceutical Technology 2nd Ed. pp. 751-753 (2002).
Tefferi et al. Revised response criteria for myelofibrosis: International Working Group-Myeloproliferative Neoplasms Research and Treatment (IWG-MRT) and European LeukemiaNet (ELN) consensus report. Blood 122(8):1395-98 (2013).
"International Application Serial No. PCT US2021 031621, International Preliminary Report on Patentability mailed Nov. 24, 2022", 15 pages.
"European Application Serial No. 21802890.0, Response to Communication pursuant to Rules 161(2) and 162 EPC filed Jun. 26, 2023", 12 pages.
"European Application Serial No. 21802890.0, Extended European Search Report mailed Apr. 15, 2024", 10 pages.
"Chinese Application Serial No. 202180049132 .1, Office Action mailed Jun. 14, 2024", with English translation, 20 48 pages.
"European Application Serial No. 21802890.0, Indication of deficiencies in a request under Rule 22 EPC mailed Jan. 14, 2025", 3 pages.
"Taiwanese Application Serial No. 110116804, Office Action mailed Jan. 9, 2025", with English Translation, 9 pages.
Anderson, "Chapter 11, Tools for Purifying the Product: Column Chromatography, Crystallization and Reslurrying In: Anderson:", Practical Process Research and Development. Academic Press, San Diego,, (2000), 2 pages.
Bastin, Richard J., "Salt Selection and Optimisation Procedures for Pharmaceutical New Chemical Entities", Organic Process Research and Development, 4, (Jul. 19, 2000), 9 pages.
Byrn, Stephen, "Pharmaceutical solids: a strategic approach to regulatory considerations", Pharmaceutical Research, 12(7), (Jul. 1995), 10 pages.

* cited by examiner

CB-5339

1-(4-(benzylamino)-5,6,7,8-tetrahydropyrido[2,3-d]pyrimidin-2-yl)-2-methyl-1H-indole-4-carboxamide (Compound 1)

CRYSTALLINE FORMS AND FORMULATIONS OF A VCP/p97 INHIBITOR

CROSS-REFERENCE

This application claims benefit of U.S. Provisional Patent Application No. 63/023,123, filed on May 11, 2020, which is incorporated herein by reference in its entirety.

BACKGROUND

The Valosin containing protein VCP/p97 and its functions are essential for continued cellular viability.

SUMMARY OF THE INVENTION 1-(4-(Benzylamino)-5,6,7,8-tetrahydropyrido[2,3-d]pyrimidin-2-yl)-2-methyl-1H-indole-4-carboxamide is a VCP/p97 inhibitor. In one aspect, described herein is a crystalline form of 1-(4-(benzylamino)-5,6,7,8-tetrahydropyrido[2,3-d]pyrimidin-2-yl)-2-methyl-1H-indole-4-carboxamide, or a pharmaceutically acceptable salt or solvate thereof. In some embodiments, the crystalline form of 1-(4-(benzylamino)-5,6,7,8-tetrahydropyrido[2,3-d]pyrimidin-2-yl)-2-methyl-1H-indole-4-carboxamide is a pharmaceutically acceptable salt. In some embodiments, the crystalline form of 1-(4-(benzylamino)-5,6,7,8-tetrahydropyrido[2,3-d]pyrimidin-2-yl)-2-methyl-1H-indole-4-carboxamide is a pharmaceutically acceptable salt, wherein the pharmaceutically acceptable salt is a hydrochloric acid salt, hydrobromic acid salt, sulfuric acid salt, methanesulfonic acid salt, benzenesulfonic acid salt, p-toluenesulfonic acid salt, phosphoric acid salt, citric acid salt, tartaric acid salt, gentisic acid salt, acetic acid salt, adipic acid salt, benzoic acid salt, glutamic acid salt, glycolic acid salt, lactic acid salt, malic acid salt, malonic acid salt, or a succinic acid salt.

In one embodiment, the crystalline form of 1-(4-(benzylamino)-5,6,7,8-tetrahydropyrido[2,3-d]pyrimidin-2-yl)-2-methyl-1H-indole-4-carboxamide is a p-toluenesulfonic acid salt (tosylate). In another embodiment, the crystalline form of 1-(4-(benzylamino)-5,6,7,8-tetrahydropyrido[2,3-d]pyrimidin-2-yl)-2-methyl-1H-indole-4-carboxamide tosylate has at least one of the following properties:
  (a) an X-ray powder diffraction (XRPD) pattern substantially the same as shown in FIG. 1;
  (b) an X-ray powder diffraction (XRPD) pattern with characteristic peaks at 7.5° 2-Theta, 10.8° 2-Theta, 12.5° 2-Theta, 17.4° 2-Theta, 18.8° 2-Theta, 20.3° 2-Theta, 20.5° 2-Theta, 22.4° 2-Theta, 22.5° 2-Theta, and 22.6° 2-Theta;
  (c) a thermo-gravimetric analysis (TGA) substantially similar to the one set forth in FIG. 2;
  (d) a DSC thermogram substantially similar to the one set forth in FIG. 3;
  (e) a DSC thermogram with an endotherm at about 233° C.; or
  (f) combinations thereof.

In some embodiments is a crystalline form of 1-(4-(benzylamino)-5,6,7,8-tetrahydropyrido[2,3-d]pyrimidin-2-yl)-2-methyl-1H-indole-4-carboxamide tosylate, wherein the crystalline form has an X-ray powder diffraction (XRPD) pattern substantially the same as shown in FIG. 1.

In some embodiments is a crystalline form of 1-(4-(benzylamino)-5,6,7,8-tetrahydropyrido[2,3-d]pyrimidin-2-yl)-2-methyl-1H-indole-4-carboxamide tosylate, wherein the crystalline form has an X-ray powder diffraction (XRPD) pattern with characteristic peaks at 7.5° 2-Theta, 10.8° 2-Theta, 12.5° 2-Theta, 17.4° 2-Theta, 18.8° 2-Theta, 20.3° 2-Theta, 20.5° 2-Theta, 22.4° 2-Theta, 22.5° 2-Theta, and 22.6° 2-Theta.

In some embodiments is a crystalline form of 1-(4-(benzylamino)-5,6,7,8-tetrahydropyrido[2,3-d]pyrimidin-2-yl)-2-methyl-1H-indole-4-carboxamide tosylate, wherein the crystalline form has a thermogravimetric analysis (TGA) substantially similar to the one set forth in FIG. 2.

In some embodiments is a crystalline form of 1-(4-(benzylamino)-5,6,7,8-tetrahydropyrido[2,3-d]pyrimidin-2-yl)-2-methyl-1H-indole-4-carboxamide tosylate, wherein the crystalline form has a DSC thermogram substantially similar to the one set forth in FIG. 3.

In some embodiments is a crystalline form of 1-(4-(benzylamino)-5,6,7,8-tetrahydropyrido[2,3-d]pyrimidin-2-yl)-2-methyl-1H-indole-4-carboxamide tosylate, wherein the crystalline form has a DSC thermogram with an endotherm at about 233° C.

In some embodiments is a crystalline form of 1-(4-(benzylamino)-5,6,7,8-tetrahydropyrido[2,3-d]pyrimidin-2-yl)-2-methyl-1H-indole-4-carboxamide tosylate, wherein the crystalline form is a monohydrate.

In some embodiments is a crystalline form of 1-(4-(benzylamino)-5,6,7,8-tetrahydropyrido[2,3-d]pyrimidin-2-yl)-2-methyl-1H-indole-4-carboxamide tosylate, wherein the crystalline form is characterized as having properties: (a) an X-ray powder diffraction (XRPD) pattern substantially the same as shown in FIG. 1; (b) an X-ray powder diffraction (XRPD) pattern with characteristic peaks at 7.5° 2-Theta, 10.8° 2-Theta, 12.5° 2-Theta, 17.4° 2-Theta, 18.8° 2-Theta, 20.3° 2-Theta, 20.5° 2-Theta, 22.4° 2-Theta, 22.5° 2-Theta, and 22.6° 2-Theta; (c) a thermogravimetric analysis (TGA) substantially similar to the one set forth in FIG. 2; (d) a DSC thermogram substantially similar to the one set forth in FIG. 3; and (e) a DSC thermogram with an endotherm at about 233° C.

In another embodiment, the crystalline form of 1-(4-(benzylamino)-5,6,7,8-tetrahydropyrido[2,3-d]pyrimidin-2-yl)-2-methyl-1H-indole-4-carboxamide is a sulfuric acid salt (sulfate). In some embodiments, the crystalline form of 1-(4-(benzylamino)-5,6,7,8-tetrahydropyrido[2,3-d]pyrimidin-2-yl)-2-methyl-1H-indole-4-carboxamide sulfate has at least one of the following properties:
  (a) an X-ray powder diffraction (XRPD) pattern substantially the same as shown in FIG. 4;
  (b) an X-ray powder diffraction (XRPD) pattern with characteristic peaks at 6.8° 2-Theta, 7.6° 2-Theta, 7.7° 2-Theta, 10.2° 2-Theta, 12.0° 2-Theta, 12.5° 2-Theta, 16.3° 2-Theta, 21.0° 2-Theta, 21.3° 2-Theta, 22.6° 2-Theta, 23.7° 2-Theta, 25.5° 2-Theta, 27.0° 2-Theta, 30.1° 2-Theta;
  (c) a thermogravimetric analysis (TGA) substantially similar to the one set forth in FIG. 5;
  (d) a DSC thermogram substantially similar to the one set forth in FIG. 6;
  (e) a DSC thermogram with an endotherm at about 229° C.; or
  (f) combinations thereof.

In some embodiments is a crystalline form of 1-(4-(benzylamino)-5,6,7,8-tetrahydropyrido[2,3-d]pyrimidin-2-yl)-2-methyl-1H-indole-4-carboxamide sulfate, wherein the crystalline form has an X-ray powder diffraction (XRPD) pattern substantially the same as shown in FIG. 4.

In some embodiments is a crystalline form of 1-(4-(benzylamino)-5,6,7,8-tetrahydropyrido[2,3-d]pyrimidin-2-yl)-2-methyl-1H-indole-4-carboxamide sulfate, wherein the crystalline form has an X-ray powder diffraction (XRPD)

pattern with characteristic peaks at 6.8° 2-Theta, 7.6° 2-Theta, 7.7° 2-Theta, 10.2° 2-Theta, 12.0° 2-Theta, 12.5° 2-Theta, 16.3° 2-Theta, 21.0° 2-Theta, 21.3° 2-Theta, 22.6° 2-Theta, 23.7° 2-Theta, 25.5° 2-Theta, 27.0° 2-Theta, 30.1° 2-Theta.

In some embodiments is a crystalline form of 1-(4-(benzylamino)-5,6,7,8-tetrahydropyrido[2,3-d]pyrimidin-2-yl)-2-methyl-1H-indole-4-carboxamide sulfate, wherein the crystalline form has a thermogravimetric analysis (TGA) substantially similar to the one set forth in FIG. 5.

In some embodiments is a crystalline form of 1-(4-(benzylamino)-5,6,7,8-tetrahydropyrido[2,3-d]pyrimidin-2-yl)-2-methyl-1H-indole-4-carboxamide sulfate, wherein the crystalline form has a DSC thermogram substantially similar to the one set forth in FIG. 6.

In some embodiments is a crystalline form of 1-(4-(benzylamino)-5,6,7,8-tetrahydropyrido[2,3-d]pyrimidin-2-yl)-2-methyl-1H-indole-4-carboxamide sulfate, wherein the crystalline form has a DSC thermogram with an endotherm at about 229° C.

In some embodiments is a crystalline form of 1-(4-(benzylamino)-5,6,7,8-tetrahydropyrido[2,3-d]pyrimidin-2-yl)-2-methyl-1H-indole-4-carboxamide sulfate, wherein the crystalline form is characterized as having properties: (a) an X-ray powder diffraction (XRPD) pattern substantially the same as shown in FIG. 4; (b) an X-ray powder diffraction (XRPD) pattern with characteristic peaks at 6.8° 2-Theta, 7.6° 2-Theta, 7.7° 2-Theta, 10.2° 2-Theta, 12.0° 2-Theta, 12.5° 2-Theta, 16.3° 2-Theta, 21.0° 2-Theta, 21.3° 2-Theta, 22.6° 2-Theta, 23.7° 2-Theta, 25.5° 2-Theta, 27.0° 2-Theta, 30.1° 2-Theta; (c) a thermogravimetric analysis (TGA) substantially similar to the one set forth in FIG. 5; (d) a DSC thermogram substantially similar to the one set forth in FIG. 6; and (e) a DSC thermogram with an endotherm at about 229° C.

In another embodiment, the crystalline form of 1-(4-(benzylamino)-5,6,7,8-tetrahydropyrido[2,3-d]pyrimidin-2-yl)-2-methyl-1H-indole-4-carboxamide is a hydrochloric acid salt (hydrochloride). In some embodiments, the crystalline form of 1-(4-(benzylamino)-5,6,7,8-tetrahydropyrido[2,3-d]pyrimidin-2-yl)-2-methyl-1H-indole-4-carboxamide hydrochloride has at least one of the following properties:

(a) an X-ray powder diffraction (XRPD) pattern substantially the same as shown in FIG. 7;
(b) an X-ray powder diffraction (XRPD) pattern with characteristic peaks at 9.8° 2-Theta, 11.3° 2-Theta, 20.0° 2-Theta, 21.2° 2-Theta, 21.4° 2-Theta, and 23.8° 2-Theta;
(c) a thermogravimetric analysis (TGA) substantially similar to the one set forth in FIG. 8;
(d) a DSC thermogram substantially similar to the one set forth in FIG. 9;
(e) a DSC thermogram with an endotherm at about 236° C.; or
(f) combinations thereof.

In some embodiments is a crystalline form of 1-(4-(benzylamino)-5,6,7,8-tetrahydropyrido[2,3-d]pyrimidin-2-yl)-2-methyl-1H-indole-4-carboxamide hydrochloride, wherein the crystalline form has an X-ray powder diffraction (XRPD) pattern substantially the same as shown in FIG. 7.

In some embodiments is a crystalline form of 1-(4-(benzylamino)-5,6,7,8-tetrahydropyrido[2,3-d]pyrimidin-2-yl)-2-methyl-1H-indole-4-carboxamide hydrochloride, wherein the crystalline form has an X-ray powder diffraction (XRPD) pattern with characteristic peaks at 9.8° 2-Theta, 11.3° 2-Theta, 20.0° 2-Theta, 21.2° 2-Theta, 21.4° 2-Theta, and 23.8° 2-Theta.

In some embodiments is a crystalline form of 1-(4-(benzylamino)-5,6,7,8-tetrahydropyrido[2,3-d]pyrimidin-2-yl)-2-methyl-1H-indole-4-carboxamide hydrochloride, wherein the crystalline form has a thermogravimetric analysis (TGA) substantially similar to the one set forth in FIG. 8.

In some embodiments is a crystalline form of 1-(4-(benzylamino)-5,6,7,8-tetrahydropyrido[2,3-d]pyrimidin-2-yl)-2-methyl-1H-indole-4-carboxamide hydrochloride, wherein the crystalline form has a DSC thermogram substantially similar to the one set forth in FIG. 9.

In some embodiments is a crystalline form of 1-(4-(benzylamino)-5,6,7,8-tetrahydropyrido[2,3-d]pyrimidin-2-yl)-2-methyl-1H-indole-4-carboxamide hydrochloride, wherein the crystalline form has a DSC thermogram with an endotherm at about 236° C.

In some embodiments is a crystalline form of 1-(4-(benzylamino)-5,6,7,8-tetrahydropyrido[2,3-d]pyrimidin-2-yl)-2-methyl-1H-indole-4-carboxamide sulfate, wherein the crystalline form is characterized as having properties: (a) an X-ray powder diffraction (XRPD) pattern substantially the same as shown in FIG. 7; (b) an X-ray powder diffraction (XRPD) pattern with characteristic peaks at 9.8° 2-Theta, 11.3° 2-Theta, 20.0° 2-Theta, 21.2° 2-Theta, 21.4° 2-Theta, and 23.8° 2-Theta; (c) a thermogravimetric analysis (TGA) substantially similar to the one set forth in FIG. 8; (d) a DSC thermogram substantially similar to the one set forth in FIG. 9; and (e) a DSC thermogram with an endotherm at about 236° C.

In some embodiments is a crystalline form of 1-(4-(benzylamino)-5,6,7,8-tetrahydropyrido[2,3-d]pyrimidin-2-yl)-2-methyl-1H-indole-4-carboxamide, wherein the crystalline form is unsolvated.

In some embodiments is a crystalline form of 1-(4-(benzylamino)-5,6,7,8-tetrahydropyrido[2,3-d]pyrimidin-2-yl)-2-methyl-1H-indole-4-carboxamide described herein, wherein the crystalline form is non-hygroscopic.

In some embodiments is a crystalline form of 1-(4-(benzylamino)-5,6,7,8-tetrahydropyrido[2,3-d]pyrimidin-2-yl)-2-methyl-1H-indole-4-carboxamide described herein, for use in medicine.

In another aspect is a pharmaceutical composition comprising a crystalline form of 1-(4-(benzylamino)-5,6,7,8-tetrahydropyrido[2,3-d]pyrimidin-2-yl)-2-methyl-1H-indole carboxamide described herein, and at least one inactive ingredient selected from pharmaceutically acceptable carriers, diluents, and excipients. In some embodiments, the pharmaceutical composition of crystalline 1-(4-(benzylamino)-5,6,7,8-tetrahydropyrido[2,3-d]pyrimidin-2-yl)-2-methyl-1H-indole-4-carboxamide described herein are formulated for oral, intravenous, intramuscular, or subcutaneous administration.

In another aspect is a pharmaceutical formulation in a solid dosage form comprising:
(a) about 10 mg to about 120 mg of 1-(4-(benzylamino)-5,6,7,8-tetrahydropyrido[2,3-d]pyrimidin-2-yl)-2-methyl-1H-indole-4-carboxamide, or a pharmaceutically acceptable salt thereof;
(b) about 20 mg to about 100 mg of a first filler;
(c) about 20 mg to about 100 mg of a second filler;
(d) about 1.0 mg to about 10 mg of a surfactant;
(e) about 1.0 mg to about 10 mg of a disintegrant;
(f) about 0.1 mg to about 5 mg of a lubricant; and
(g) about 0.1 mg to about 5 mg of a glidant;
wherein the first filler and second filler are independently selected from lactose, mannitol, dicalcium phosphate, microcrystalline cellulose, silicified microcrystalline cellulose, starch, and pregelatinized starch (Starch 1500).

In another aspect is a pharmaceutical formulation in a solid dosage form comprising:
 (a) about 10 mg to about 120 mg of 1-(4-(benzylamino)-5,6,7,8-tetrahydropyrido[2,3-d]pyrimidin-2-yl)-2-methyl-1H-indole-4-carboxamide, or a pharmaceutically acceptable salt thereof;
 (b) about 20 mg to about 100 mg of a first filler;
 (c) about 20 mg to about 100 mg of a second filler;
 (d) about 1.0 mg to about 10 mg of a surfactant;
 (e) about 1.0 mg to about 10 mg of a disintegrant;
 (f) about 0.1 mg to about 5 mg of a lubricant; and
 (g) about 0.1 mg to about 5 mg of a glidant;
  wherein the surfactant is selected from polysorbates, poloxamers, bile salts, glyceryl monostearate, sodium lauryl sulfate, sorbitan monooleate, polyoxyethylene sorbitan monooleate, copolymers of ethylene oxide and propylene oxide, and d-α-tocopheryl polyethylene glycol succinate (Vitamin E TPGS).

In another aspect is a pharmaceutical formulation in a solid dosage form comprising:
 (a) about 10 mg to about 120 mg of 1-(4-(benzylamino)-5,6,7,8-tetrahydropyrido[2,3-d]pyrimidin-2-yl)-2-methyl-1H-indole-4-carboxamide, or a pharmaceutically acceptable salt thereof;
 (b) about 20 mg to about 100 mg of a first filler;
 (c) about 20 mg to about 100 mg of a second filler;
 (d) about 1.0 mg to about 10 mg of a surfactant;
 (e) about 1.0 mg to about 10 mg of a disintegrant;
 (f) about 0.1 mg to about 5 mg of a lubricant; and
 (g) about 0.1 mg to about 5 mg of a glidant;
  wherein the disintegrant is selected from povidone, crospovidone, hypromellose, croscarmellose sodium, hydroxypropyl cellulose, and polyvinyl alcohol.

In another aspect is a pharmaceutical formulation in a solid dosage form comprising:
 (a) about 10 mg to about 120 mg of 1-(4-(benzylamino)-5,6,7,8-tetrahydropyrido[2,3-d]pyrimidin-2-yl)-2-methyl-1H-indole-4-carboxamide, or a pharmaceutically acceptable salt thereof;
 (b) about 20 mg to about 100 mg of a first filler;
 (c) about 20 mg to about 100 mg of a second filler;
 (d) about 1.0 mg to about 10 mg of a surfactant;
 (e) about 1.0 mg to about 10 mg of a disintegrant;
 (f) about 0.1 mg to about 5 mg of a lubricant; and
 (g) about 0.1 mg to about 5 mg of a glidant;
  wherein the lubricant is selected from magnesium stearate, stearic acid, and sodium stearyl fumarate.

In another aspect is a pharmaceutical formulation in a solid dosage form comprising:
 (a) about 10 mg to about 120 mg of 1-(4-(benzylamino)-5,6,7,8-tetrahydropyrido[2,3-d]pyrimidin-2-yl)-2-methyl-1H-indole-4-carboxamide, or a pharmaceutically acceptable salt thereof;
 (b) about 20 mg to about 100 mg of a first filler;
 (c) about 20 mg to about 100 mg of a second filler;
 (d) about 1.0 mg to about 10 mg of a surfactant;
 (e) about 1.0 mg to about 10 mg of a disintegrant;
 (f) about 0.1 mg to about 5 mg of a lubricant; and
  wherein the glidant is silicon dioxide or talc.

In some embodiments is a pharmaceutical formulation wherein the first filler and second filler are independently selected from lactose, mannitol, dicalcium phosphate, microcrystalline cellulose, silicified microcrystalline cellulose, starch, and pregelatinized starch (Starch 1500). In some embodiments is a pharmaceutical formulation wherein the surfactant is selected from polysorbates, poloxamers, bile salts, glyceryl monostearate, sodium lauryl sulfate, sorbitan monooleate, polyoxyethylene sorbitan monooleate, copolymers of ethylene oxide and propylene oxide, and d-α-tocopheryl polyethylene glycol succinate (Vitamin E TPGS). In some embodiments is a pharmaceutical formulation wherein the disintegrant is selected from povidone, crospovidone, hypromellose, croscarmellose sodium, hydroxypropyl cellulose, and polyvinyl alcohol. In some embodiments is a pharmaceutical formulation wherein the lubricant is selected from magnesium stearate, stearic acid, and sodium stearyl fumarate. In some embodiments is a pharmaceutical formulation wherein the glidant is silicon dioxide or talc. In some embodiments is a pharmaceutical formulation comprising about 25 mg to about 35 mg of a first filler and about 25 mg to about 35 mg of a second filler. In some embodiments is a pharmaceutical formulation comprising about 85 mg to about 95 mg of a first filler and about 85 mg to about 95 mg of a second filler. In some embodiments is a pharmaceutical formulation wherein the first filler and second filler are independently selected from lactose, mannitol, microcrystalline cellulose, and silicified microcrystalline cellulose. In some embodiments is a pharmaceutical formulation wherein the first filler is silicified microcrystalline cellulose and the second filler is mannitol. In some embodiments is a pharmaceutical formulation comprising about 1.5 mg to about 3 mg of a surfactant. In some embodiments is a pharmaceutical formulation comprising about 6.5 mg to about 8.5 mg of a surfactant. In some embodiments is a pharmaceutical formulation wherein the surfactant is a poloxamer. In some embodiments is a pharmaceutical formulation wherein the surfactant is poloxamer 407. In some embodiments is a pharmaceutical formulation comprising about 1.5 mg to about 3 mg of a disintegrant. In some embodiments is a pharmaceutical formulation comprising about 6.5 mg to about 8.5 mg of a disintegrant. In some embodiments is a pharmaceutical formulation wherein the disintegrant is croscarmellose sodium. In some embodiments is a pharmaceutical formulation comprising about 0.1 mg to about 1.0 mg of a glidant. In some embodiments is a pharmaceutical formulation comprising about 1 mg to about 2 mg of a glidant. In some embodiments is a pharmaceutical formulation wherein the glidant is silicon dioxide. In some embodiments is a pharmaceutical formulation comprising about 0.1 mg to about 1.0 mg of a lubricant. In some embodiments is a pharmaceutical formulation comprising about 1 mg to about 2 mg of a lubricant. In some embodiments is a pharmaceutical formulation wherein the lubricant is magnesium stearate. In some embodiments is a pharmaceutical formulation comprising about 20 mg to about 45 mg of 1-(4-(benzylamino)-5,6,7,8-tetrahydropyrido[2,3-d]pyrimidin-2-yl)-2-methyl-1H-indole-4-carboxamide, or a pharmaceutically acceptable salt thereof. In some embodiments is a pharmaceutical formulation comprising about 70 mg to about 110 mg of 1-(4-(benzylamino)-5,6,7,8-tetrahydropyrido[2,3-d]pyrimidin-2-yl)-2-methyl-1H-indole-4-carboxamide, or a pharmaceutically acceptable salt thereof. In some embodiments is a pharmaceutical formulation wherein the 1-(4-(benzylamino)-5,6,7,8-tetrahydropyrido[2,3-d]pyrimidin-2-yl)-2-methyl-1H-indole-4-carboxamide is a p-toluenesulfonic acid salt (tosylate). In some embodiments is a pharmaceutical formulation wherein the 1-(4-(benzylamino)-5,6,7,8-tetrahydropyrido[2,3-d]pyrimidin-2-yl)-2-methyl-1H-indole-4-carboxamide is a sulfuric acid salt (sulfate). In some embodiments is a pharmaceutical formulation wherein the 1-(4-(benzylamino)-5,6,7,8-tetrahydropyrido[2,3-d]pyrimidin-2-yl)-2-methyl-1H-indole-4-carboxamide is a hydrochloric acid salt (hydrochloride). In some embodiments is a pharmaceutical formulation wherein the 1-(4-(benzylamino)-5,6,7,8-tetrahydropyrido[2,3-d]pyrimidin-2-yl)-2-methyl-1H-indole-4-carboxamide is a free base.

In another aspect is a pharmaceutical formulation comprising:
(a) about 20 mg to about 45 mg of 1-(4-(benzylamino)-5,6,7,8-tetrahydropyrido[2,3-d]pyrimidin-2-yl)-2-methyl-1H-indole-4-carboxamide, or a pharmaceutically acceptable salt thereof;
(b) about 25 mg to about 35 mg of silicified microcrystalline cellulose;
(c) about 25 mg to about 35 mg of mannitol;
(d) about 1.5 mg to about 3 mg of poloxamer 407;
(e) about 1.5 mg to about 3 mg of croscarmellose sodium;
(f) about 0.1 mg to about 1.0 mg of magnesium stearate; and
(g) about 0.1 mg to about 1.0 mg of silicon dioxide.

In another aspect is a pharmaceutical formulation comprising:
(a) about 35 mg of 1-(4-(benzylamino)-5,6,7,8-tetrahydropyrido[2,3-d]pyrimidin-2-yl)-2-methyl-1H-indole-4-carboxamide p-toluenesulfonic acid (tosylate) salt;
(b) about 29 mg of silicified microcrystalline cellulose;
(c) about 29 mg of mannitol;
(d) about 2.5 mg of poloxamer 407;
(e) about 2.5 mg of croscarmellose sodium;
(f) about 0.5 mg of magnesium stearate; and
(h) about 0.5 mg of silicon dioxide.

In another aspect is a pharmaceutical formulation comprising:
(a) about 70 mg to about 110 mg of 1-(4-(benzylamino)-5,6,7,8-tetrahydropyrido[2,3-d]pyrimidin-2-yl)-2-methyl-1H-indole-4-carboxamide, or a pharmaceutically acceptable salt thereof;
(b) about 85 mg to about 95 mg of silicified microcrystalline cellulose;
(c) about 85 mg to about 95 mg of mannitol;
(d) about 6.5 mg to about 8.5 mg of poloxamer 407;
(e) about 6.5 mg to about 8.5 mg of croscarmellose sodium;
(f) about 1 mg to about 2 mg of magnesium stearate; and
(g) about 1 mg to about 2 mg of silicon dioxide.

In another aspect is a pharmaceutical formulation comprising:
(a) about 106 mg of 1-(4-(benzylamino)-5,6,7,8-tetrahydropyrido[2,3-d]pyrimidin-2-yl)-2-methyl-1H-indole-4-carboxamide p-toluenesulfonic acid (tosylate) salt;
(b) about 88 mg of silicified microcrystalline cellulose;
(c) about 88 mg of mannitol;
(d) about 7.5 mg of poloxamer 407;
(e) about 7.5 mg of croscarmellose sodium;
(f) about 1.5 mg of magnesium stearate; and
(g) about 1.5 mg of silicon dioxide.

In some embodiments is a pharmaceutical formulation wherein the solid dosage form is selected from a powder, a tablet, a bite-disintegration tablet, a chewable tablet, a caplet, a capsule, a gelcap, an effervescent powder, a rapid-disintegration tablet, an abuse-deterrent tablet, a modified release tablet, a modified release caplet, a modified release capsule, and an aqueous suspension produced from a powder. In some embodiments is a pharmaceutical formulation wherein the solid dosage form is a capsule. In some embodiments is a pharmaceutical formulation wherein the 1-(4-(benzylamino)-5,6,7,8-tetrahydropyrido[2,3-d]pyrimidin-2-yl)-2-methyl-1H-indole-4-carboxamide, or a pharmaceutically acceptable salt thereof, is crystalline. In some embodiments is a pharmaceutical formulation wherein the 1-(4-(benzylamino)-5,6,7,8-tetrahydropyrido[2,3-d]pyrimidin-2-yl)-2-methyl-1H-indole-4-carboxamide, or a pharmaceutically acceptable salt thereof, is a crystalline form described herein.

In another aspect is a method of treating cancer in an individual in need thereof, wherein the method comprises administering to the individual, a therapeutically effective amount of a crystalline form of 1-(4-(benzylamino)-5,6,7,8-tetrahydropyrido[2,3-d]pyrimidin-2-yl)-2-methyl-1H-indole-4-carboxamide, or a pharmaceutically acceptable salt thereof, or a pharmaceutical formulation of 1-(4-(benzylamino)-5,6,7,8-tetrahydropyrido[2,3-d]pyrimidin yl)-2-methyl-1H-indole-4-carboxamide described herein. In some embodiments, the cancer is selected from the group consisting of a solid tumor, a metastatic form of a solid tumor, an advanced metastatic solid tumor, a lymphoma, and an advanced lymphoma. In some embodiments, the cancer is selected from brain (gliomas), glioblastomas, breast, Wilm's tumor, Ewing's sarcoma, rhabdomyosarcoma, ependymoma, medulloblastoma, colon, head and neck, kidney, lung, liver, melanoma, ovarian, pancreatic, prostate, sarcoma, osteosarcoma, giant cell tumor of bone, thyroid, lymphoblastic T cell leukemia, myelodysplastic syndrome, chronic myelogenous leukemia, chronic lymphocytic leukemia, Hairy-cell leukemia, acute lymphoblastic leukemia, acute myelogenous leukemia (AML), chronic neutrophilic leukemia, acute lymphoblastic T cell leukemia, plasmacytoma, immunoblastic large cell leukemia, mantle cell leukemia, multiple myeloma megakaryoblastic leukemia, multiple myeloma, acute megakaryocytic leukemia, promyelocytic leukemia, erythroleukemia, malignant lymphoma, Hodgkin's lymphoma, non-Hodgkin's lymphoma, lymphoblastic T cell lymphoma, Burkitt's lymphoma, follicular lymphoma, neuroblastoma, bladder cancer, urothelial cancer, lung cancer, vulval cancer, cervical cancer, endometrial cancer, renal cancer, mesothelioma, esophageal cancer, salivary gland cancer, hepatocellular cancer, gastric cancer, nasopharangeal cancer, buccal cancer, cancer of the mouth, GIST (gastrointestinal stromal tumor) and testicular cancer. In some embodiments, the cancer is selected from acute myelogenous leukemia (AML) and myelodysplastic syndrome (MDS). In some embodiments, the acute myelogenous leukemia (AML) is relapsed AML, recurrent AML, refractory AML, or any combination thereof.

In some embodiments is a method of treating cancer in an individual in need thereof, wherein the method comprises administering to the individual, a therapeutically effective amount of a crystalline form of 1-(4-(benzylamino)-5,6,7,8-tetrahydropyrido[2,3-d]pyrimidin-2-yl)-2-methyl-1H-indole-4-carboxamide, or a pharmaceutically acceptable salt thereof, or a pharmaceutical formulation of 1-(4-(benzylamino)-5,6,7,8-tetrahydropyrido[2,3-d]pyrimidin-2-yl)-2-methyl-1H-indole-4-carboxamide described herein, wherein the cancer is a hematological cancer. In some embodiments is a method of treating cancer in an individual in need thereof, wherein the method comprises administering to the individual, a therapeutically effective amount of a crystalline form of 1-(4-(benzylamino)-5,6,7,8-tetrahydropyrido[2,3-d]pyrimidin yl)-2-methyl-1H-indole-4-carboxamide, or a pharmaceutically acceptable salt thereof, or a pharmaceutical formulation of 1-(4-(benzylamino)-5,6,7,8-tetrahydropyrido[2,3-d]pyrimidin yl)-2-methyl-1H-indole-4-carboxamide described herein, wherein the cancer is selected from the group consisting of acute myeloid leukemia (AML), myelodysplastic syndrome (MDS), myelodysplastic/myeloproliferative overlap neoplasms (MDS/MPN), CMML (chronic myelomonocytic leukemia), atypical CML (chronic myeloid leukemia), multiple myeloma, myeloma, amyloidosis, Waldenstrom's macroglobulinemia (also known as lymphoplasmacytic lymphoma), acute lymphoblastic leukemia (ALL), B-lymphoblastic leukemia, T-lymphoblastic leukemia, lymphoma, B-cell acute lymphoblastic leukemia, T-cell acute lymphoblastic leukemia, B-cell acute lymphoblastic lymphoma, T-cell acute lymphoblastic lymphoma, Burkitt's leukemia/lymphoma, Non-Hodgkin's lymphoma (NHL), chronic lymphocytic leukemia (CLL), small lymphocytic lymphoma (SLL), B-cell NHL, follicular lymphoma, marginal zone lymphoma, mantle cell lymphoma, diffuse large B-cell lymphoma (DLBCL), double/triple hit B-cell lymphoma, myeloproliferative neoplasm (MPN), essential thrombocythemia (ET), polycythemia vera (PV), myelofibrosis, primary myelofibrosis, post-PV myelofibrosis, Post-ET myelofibrosis, chronic myeloid leukemia (CML), blastic plasmacytoid dendritic cell neoplasm (BPDCN), M3 AML, and APL (acute promyelocytic leukemia).

In some embodiments is a method of treating cancer in an individual in need thereof, wherein the method comprises administering to the individual, a therapeutically effective amount of a crystalline form of 1-(4-(benzylamino)-5,6,7,8-tetrahydropyrido[2,3-d]pyrimidin-2-yl)-2-methyl-1H-indole-4-carboxamide, or a pharmaceutically acceptable salt thereof, or a pharmaceutical formulation of 1-(4-(benzylamino)-5,6,7,8-tetrahydropyrido[2,3-d]pyrimidin-2-yl)-2-methyl-1H-indole-4-carboxamide described herein, further comprising the administration of a second therapeutic agent. In some embodiments, the second therapeutic agent is a chemotherapeutic agent, hormonal therapeutic agent, or an immunotherapeutic agent.

In another aspect is 1-(4-(benzylamino)-5,6,7,8-tetrahydropyrido[2,3-d]pyrimidin-2-yl)-2-methyl-1H-indole-4-carboxamide p-toluenesulfonic acid salt (tosylate).

In another aspect is a pharmaceutical composition comprising 1-(4-(benzylamino)-5,6,7,8-tetrahydropyrido[2,3-d]pyrimidin-2-yl)-2-methyl-1H-indole-4-carboxamide p-toluenesulfonic acid salt (tosylate) and at least one inactive ingredient selected from pharmaceutically acceptable carriers, diluents, and excipients.

In another aspect is a method for treating cancer in an individual in need thereof, comprising administering to the individual a therapeutically effective amount of 1-(4-(benzylamino)-5,6,7,8-tetrahydropyrido[2,3-d]pyrimidin-2-yl)-2-methyl-1H-indole carboxamide p-toluenesulfonic acid salt (tosylate).

INCORPORATION BY REFERENCE

All publications, patents, and patent applications mentioned in this specification are herein incorporated by reference to the extent applicable and relevant and to the same extent as if each individual publication, patent, or patent application was specifically and individually indicated to be incorporated by reference.

DETAILED DESCRIPTION OF THE INVENTION

Figure 1:
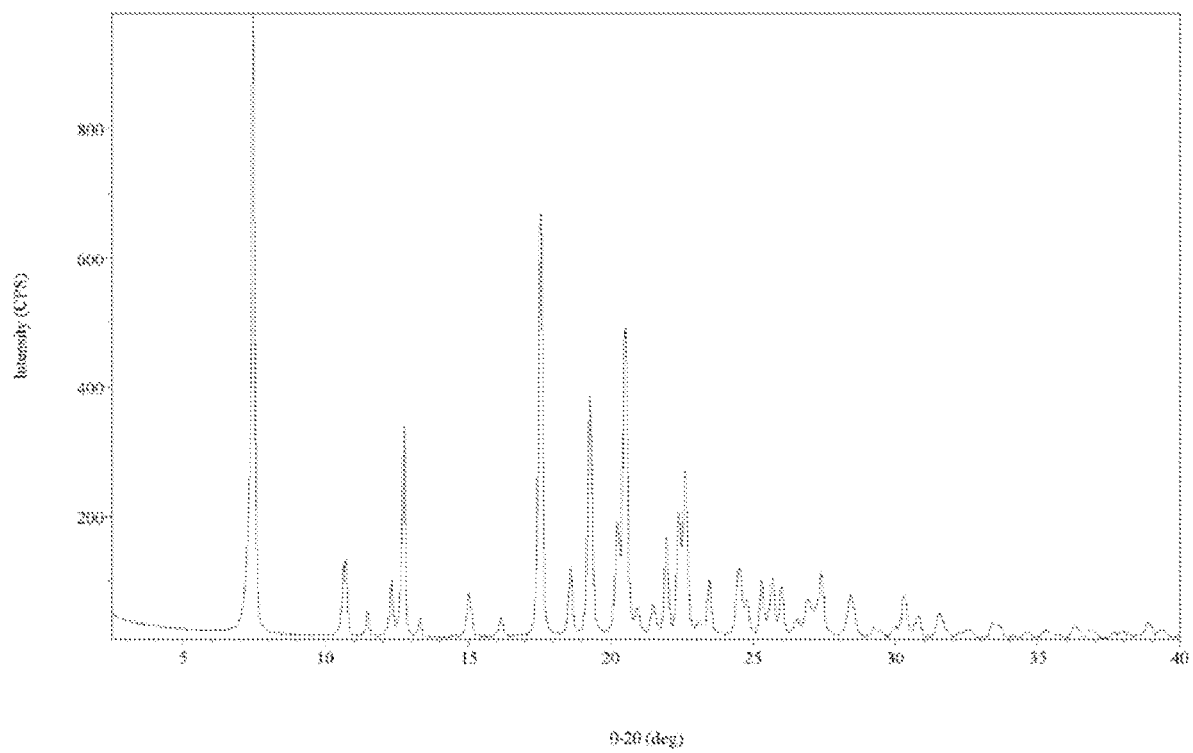
FIG. 1. Illustrates an X-ray powder diffraction (XRPD) pattern of crystalline 1-(4-(benzylamino)-5,6,7,8-tetrahydropyrido[2,3-d]pyrimidin-2-yl)-2-methyl-1H-indole-4-carboxamide tosylate.

VCP/p97 is known to be overproduced in multiple cancers. Therefore, pharmacologic interference with VCP/p97 function is expected to have meaningful antitumor effects by generating irresolvable endoplasmic reticulum (ER) stress and/or irresolvable genotoxic stress. Thus, inhibitors of VCP/p97 function could provide a mechanism to exploit a cancer cell's addiction to protein homeostasis and DNA damage repair pathways.

1-(4-(Benzylamino)-5,6,7,8-tetrahydropyrido[2,3-d]pyrimidin-2-yl)-2-methyl-1H-indole-4-carboxamide (Compound 1) is a VCP/p97 inhibitor. Described herein are crystalline forms of 1-(4-(benzylamino)-5,6,7,8-tetrahydropyrido[2,3-d]pyrimidin-2-yl)-2-methyl-1H-indole-4-carboxamide. Also described herein are pharmaceutical formulations of 1-(4-(benzylamino)-5,6,7,8-tetrahydropyrido[2,3-d]pyrimidin-2-yl)-2-methyl-1H-indole-4-carboxamide. Further described herein are salt forms of 1-(4-(benzylamino)-5,6,7,8-tetrahydropyrido[2,3-d]pyrimidin-2-yl)-2-methyl-1H-indole-4-carboxamide.

Compound 1

In one embodiment is 1-(4-(benzylamino)-5,6,7,8-tetrahydropyrido[2,3-d]pyrimidin-2-yl)-2-methyl-1H-indole-4-carboxamide (Compound 1). 1-(4-(Benzylamino)-5,6,7,8-tetrahydropyrido[2,3-d]pyrimidin-2-yl)-2-methyl-1H-indole-4-carboxamide (Compound 1) is CB-5339. "Compound 1", "CB-5339", or "1-(4-(benzylamino)-5,6,7,8-tetrahydropyrido[2,3-d]pyrimidin-2-yl)-2-methyl-1H-indole-4-carboxamide" refers to the compound with the following structure:

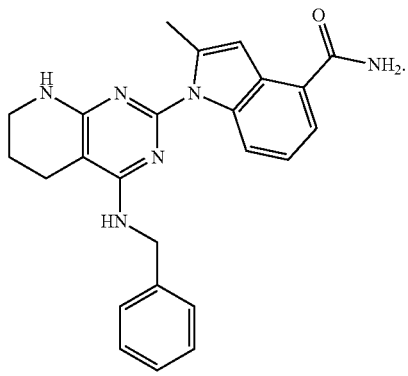 [SMILES: Cc1cc2c(C(N)=O)cccc2n1-c1nc2c(c(NCc3ccccc3)n1)CCCN2]

In some embodiments, Compound 1 is in the form of pharmaceutically acceptable salt. In some embodiments, Compound 1 is in the form of pharmaceutically acceptable salt selected from a hydrochloric acid salt, hydrobromic acid salt, sulfuric acid salt, methanesulfonic acid salt, benzenesulfonic acid salt, p-toluenesulfonic acid salt, phosphoric acid salt, citric acid salt, tartaric acid salt, gentisic acid salt, acetic acid salt, adipic acid salt, benzoic acid salt, glutamic acid salt, glycolic acid salt, lactic acid salt, malic acid salt, malonic acid salt, and succinic acid salt. In some embodiments, Compound 1 is in the form of pharmaceutically acceptable salt selected from a hydrochloric acid salt, sulfuric acid salt, methanesulfonic acid salt, benzenesulfonic acid salt, p-toluenesulfonic acid salt, phosphoric acid salt, citric acid salt, tartaric acid salt, and gentisic acid salt. In some embodiments, Compound 1 is in the form of pharmaceutically acceptable salt selected from a hydrochloric acid salt, sulfuric acid salt, and p-toluenesulfonic acid salt. In some embodiments, Compound 1 is a free base. In addition, Compound 1 can exist in unsolvated as well as solvated forms with pharmaceutically acceptable solvents. The solvated forms of Compound 1 presented herein are also considered to be disclosed herein. In some embodiments, Compound 1 is solvated. In some embodiments, Compound 1 is unsolvated.

"Pharmaceutically acceptable," as used herein, refers a material, such as a carrier or diluent, which does not abrogate the biological activity or properties of the compound, and is relatively nontoxic, i.e., the material is administered to an individual without causing undesirable biological effects or interacting in a deleterious manner with any of the components of the composition in which it is contained.

The term "pharmaceutically acceptable salt" refers to a form of a therapeutically active agent that consists of a cationic form of the therapeutically active agent in combination with a suitable anion, or in alternative embodiments, an anionic form of the therapeutically active agent in combination with a suitable cation. Handbook of Pharmaceutical Salts: Properties, Selection and Use. International Union of Pure and Applied Chemistry, Wiley-VCH 2002. S. M. Berge, L. D. Bighley, D. C. Monkhouse, J. Pharm. Sci. 1977, 66, 1-19. P. H. Stahl and C. G. Wermuth, editors, *Handbook of Pharmaceutical Salts: Properties, Selection and Use*, Weinheim/Zürich: Wiley-VCH/VHCA, 2002. Pharmaceutical salts typically are more soluble and more rapidly soluble in stomach and intestinal juices than non-ionic species and so are useful in solid dosage forms. Furthermore, because their solubility often is a function of pH, selective dissolution in one or another part of the digestive tract is possible, and this capability can be manipulated as one aspect of delayed and sustained release behaviors. Also, because the salt-forming molecule can be in equilibrium with a neutral form, passage through biological membranes can be adjusted.

Solvates contain either stoichiometric or non-stoichiometric amounts of a solvent, and are formed during the process of product formation or isolation with pharmaceutically acceptable solvents such as water, ethanol, methanol, tert-butyl methyl ether (MTBE), diisopropyl ether (DIPE), ethyl acetate, isopropyl acetate, isopropyl alcohol, methyl isobutyl ketone (MIBK), methyl ethyl ketone (MEK), acetone, nitromethane, tetrahydrofuran (THF), dichloromethane (DCM), dioxane, heptanes, toluene, anisole, acetonitrile, and the like. In some embodiments, solvates are formed using, but not limited to, Class 3 solvent(s). In some embodiments, solvates are formed using, but not limited to, Class 2 solvent(s). Categories of solvents are defined in, for example, the International Conference on Harmonization of Technical Requirements for Registration of Pharmaceuticals for Human Use (ICH), "Impurities: Guidelines for Residual Solvents Q3C(R6)," (October 2016). Hydrates are formed when the solvent is water, or alcoholates are formed when the solvent is alcohol.

In other embodiments, Compound 1 is prepared in various forms, including but not limited to, an amorphous phase, crystalline forms, milled forms, and nano-particulate forms.

While not intending to be bound by any particular theory, certain solid forms are characterized by physical properties, e.g., stability, solubility, and dissolution rate, appropriate for pharmaceutical and therapeutic dosage forms. Moreover, while not wishing to be bound by any particular theory, certain solid forms are characterized by physical properties (e.g., density, compressibility, hardness, morphology, cleavage, stickiness, solubility, water uptake, electrical properties, thermal behavior, solid-state reactivity, physical stability, and chemical stability) affecting particular processes (e.g., yield, filtration, washing, drying, milling, mixing, tableting, flowability, dissolution, formulation, and lyophilization) which make certain solid forms suitable for the manufacture of a solid dosage form. Such properties can be determined using particular analytical chemical techniques, including solid-state analytical techniques (e.g., X-ray diffraction, microscopy, spectroscopy and thermal analysis), as described herein.

Crystalline Forms

The identification and selection of a solid form of a pharmaceutical compound are complex, given that a change in solid form may affect a variety of physical and chemical properties, which may provide benefits or drawbacks in processing, formulation, stability, bioavailability, storage, and handling (e.g., shipping), among other important pharmaceutical characteristics. Useful pharmaceutical solids include crystalline solids and amorphous solids, depending on the product and its mode of administration. Amorphous solids are characterized by a lack of long-range structural order, whereas crystalline solids are characterized by structural periodicity. The desired class of pharmaceutical solid depends upon the specific application; amorphous solids are sometimes selected on the basis of, e.g., an enhanced dissolution profile, while crystalline solids may be desirable for properties such as, e.g., physical or chemical stability.

Whether crystalline or amorphous, solid forms of a pharmaceutical compound include single-component and multiple-component solids. Single-component solids consist essentially of the pharmaceutical compound or active ingredient in the absence of other compounds. Variety among single-component crystalline materials may potentially arise from the phenomenon of polymorphism, wherein multiple three-dimensional arrangements exist for a particular pharmaceutical compound.

Notably, it is not possible to predict a priori if crystalline forms of a compound even exist, let alone how to successfully prepare them (see, e.g., Braga and Grepioni, 2005, "Making crystals from crystals: a green route to crystal engineering and polymorphism," *Chem. Commun.*:3635-3645 (with respect to crystal engineering, if instructions are not very precise and/or if other external factors affect the process, the result can be unpredictable); Jones et al., 2006, Pharmaceutical Cocrystals: An Emerging Approach to Physical Property Enhancement," *MRS Bulletin* 31:875-879 (At present it is not generally possible to computationally predict the number of observable polymorphs of even the simplest molecules); Price, 2004, "The computational prediction of pharmaceutical crystal structures and polymorphism," *Advanced Drug Delivery Reviews* 56:301-319 ("Price"); and Bernstein, 2004, "Crystal Structure Prediction and Polymorphism," *ACA Transactions* 39:14-23 (a great deal still needs to be learned and done before one can state with any degree of confidence the ability to predict a crystal structure, much less polymorphic forms)).

The variety of possible solid forms creates potential diversity in physical and chemical properties for a given pharmaceutical compound. The discovery and selection of solid forms are of great importance in the development of an effective, stable, and marketable pharmaceutical product.

In some embodiments, Compound 1 is crystalline. In some embodiments, Compound 1 is crystalline and in the form of pharmaceutically acceptable salt. In some embodiments, crystalline Compound 1 is in the form of pharmaceutically acceptable salt selected from a hydrochloric acid salt, hydrobromic acid salt, hydroiodic acid salt, sulfuric acid salt, methanesulfonic acid salt, benzenesulfonic acid salt, p-toluenesulfonic acid salt, phosphoric acid salt, nitric acid salt, chloric acid salt, perchloric acid salt, citric acid salt, tartaric acid salt, gentisic acid salt, acetic acid salt, adipic acid salt, benzoic acid salt, glutamic acid salt, glycolic acid salt, lactic acid salt, malic acid salt, malonic acid salt, and succinic acid salt. In some embodiments, crystalline Compound 1 is in the form of pharmaceutically acceptable salt selected from a hydrochloric acid salt, sulfuric acid salt, methanesulfonic acid salt, benzenesulfonic acid salt, p-toluenesulfonic acid salt, phosphoric acid salt, citric acid salt, tartaric acid salt, and gentisic acid salt. In some embodiments, crystalline Compound 1 is in the form of pharmaceutically acceptable salt selected from a hydrochloric acid salt, hydrobromic acid salt, sulfuric acid salt, methanesulfonic acid salt, benzenesulfonic acid salt, p-toluenesulfonic acid salt, phosphoric acid salt, citric acid salt, tartaric acid salt, gentisic acid salt, acetic acid salt, adipic acid salt, benzoic acid salt, glutamic acid salt, glycolic acid salt, lactic acid salt, malic acid salt, malonic acid salt, and succinic acid salt. In some embodiments, crystalline Compound 1 is in the form of pharmaceutically acceptable salt selected from a hydrochloric acid salt, sulfuric acid salt, methanesulfonic acid salt, benzenesulfonic acid salt, p-toluenesulfonic acid salt, phosphoric acid salt, citric acid salt, tartaric acid salt, and gentisic acid salt. In some embodiments, crystalline Compound 1 is in the form of pharmaceutically acceptable salt selected from a hydrochloric acid salt, sulfuric acid salt, and p-toluenesulfonic acid salt. In some embodiments, crystalline Compound 1 is a free base. In addition, Compound 1 can exist in unsolvated as well as solvated forms with pharmaceutically acceptable solvents. The solvated forms of Compound 1 presented herein are also considered to be disclosed herein. In some embodiments, Compound 1 is solvated. In some embodiments, Compound 1 is unsolvated.

In some embodiments, Compound 1, or a pharmaceutically acceptable salt or solvate thereof, is amorphous.

Crystalline Compound 1, p-toluenesulfonic Acid Salt (Tosylate)

Figure 2:
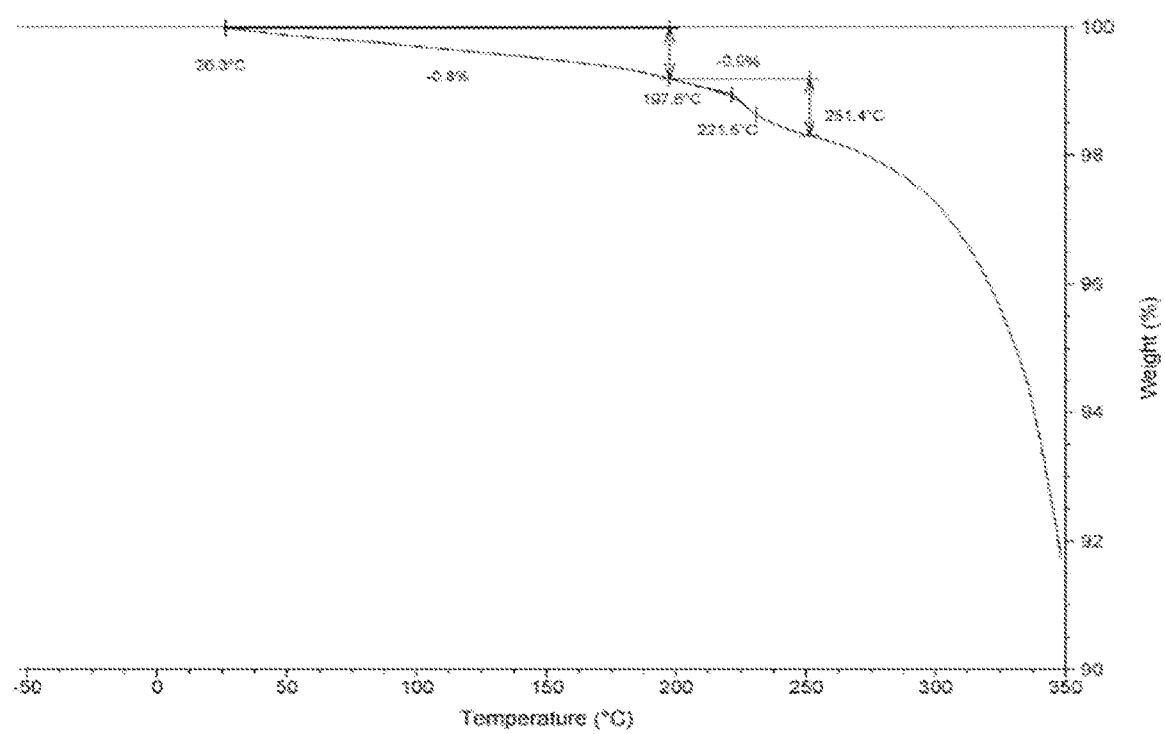
FIG. 2. Illustrates a thermogravimetric analysis (TGA) thermogram of crystalline 1-(4-(benzylamino)-5,6,7,8-tetrahydropyrido[2,3-d]pyrimidin-2-yl)-2-methyl-1H-indole-4-carboxamide tosylate.
Figure 3:
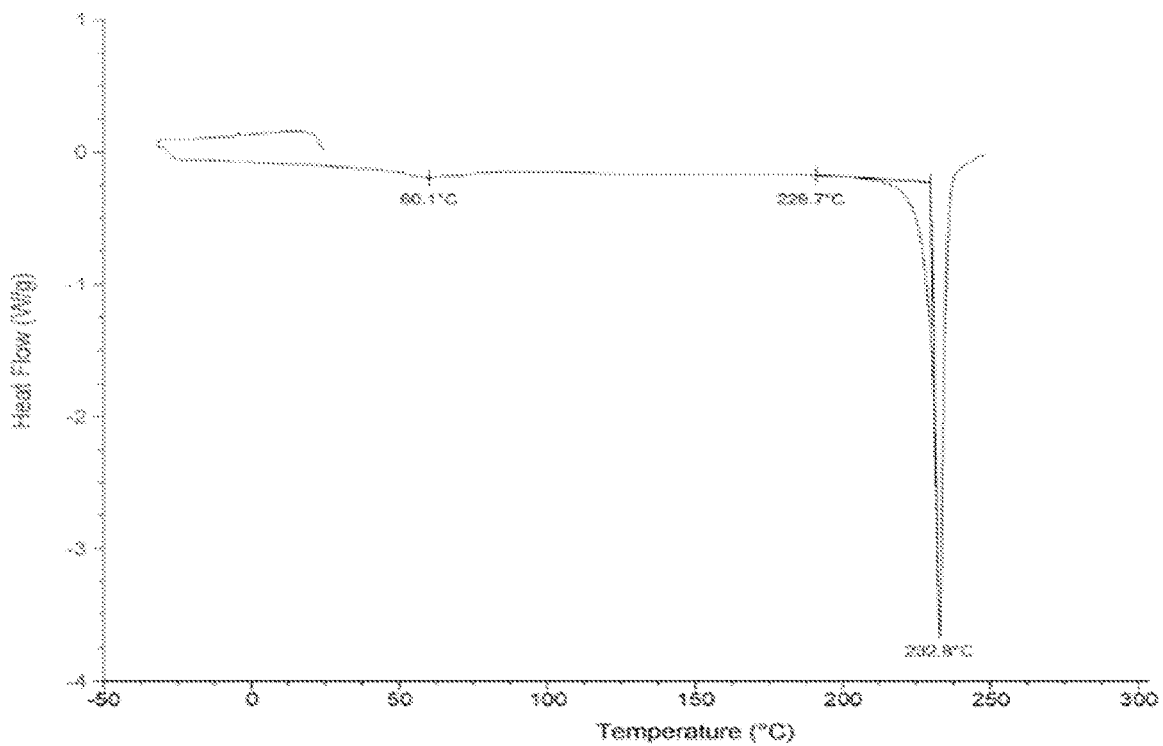
FIG. 3. Illustrates a differential scanning calorimetry (DSC) thermogram of crystalline 1-(4-(benzylamino)-5,6,7,8-tetrahydropyrido[2,3-d]pyrimidin-2-yl)-2-methyl-1H-indole-4-carboxamide tosylate.

In some embodiments, Compound 1 is crystalline. In some embodiments, crystalline Compound 1 is a p-toluenesulfonic acid salt (tosylate). In some embodiments, crystalline Compound 1 tosylate characterized as having at least one of the following properties:
  (a) an X-ray powder diffraction (XRPD) pattern substantially the same as shown in FIG. 1;
  (b) an X-ray powder diffraction (XRPD) pattern with characteristic peaks at 7.5° 2-Theta, 10.8° 2-Theta, 12.5° 2-Theta, 17.4° 2-Theta, 18.8° 2-Theta, 20.3° 2-Theta, 20.5° 2-Theta, 22.4° 2-Theta, 22.5° 2-Theta, and 22.6° 2-Theta;
  (c) a thermogravimetric analysis (TGA) substantially similar to the one set forth in FIG. 2;
  (d) a DSC thermogram substantially similar to the one set forth in FIG. 3;

(e) a DSC thermogram with an endotherm having an onset at about 233° C.; or
(f) combinations thereof.

In some embodiments, crystalline Compound 1 tosylate is characterized as having at least two of the properties selected from (a) to (e). In some embodiments, crystalline Compound 1 tosylate is characterized as having at least three of the properties selected from (a) to (e). In some embodiments, crystalline Compound 1 tosylate is characterized as having at least four of the properties selected from (a) to (e). In some embodiments, crystalline Compound 1 tosylate is characterized as having properties (a) to (e).

In some embodiments, crystalline Compound 1 tosylate has an X-ray powder diffraction (XRPD) pattern substantially the same as shown in FIG. 1. In some embodiments, crystalline Compound 1 tosylate has an X-ray powder diffraction (XRPD) pattern with characteristic peaks at 7.5° 2-Theta, 10.8° 2-Theta, 12.5° 2-Theta, 17.4° 2-Theta, 18.8° 2-Theta, 20.3° 2-Theta, 20.5° 2-Theta, 22.4° 2-Theta, 22.5° 2-Theta, and 22.6° 2-Theta. In some embodiments, crystalline Compound 1 tosylate has a thermogravimetric analysis (TGA) thermogram substantially similar to the one set forth in FIG. 2. In some embodiments, crystalline Compound 1 tosylate has a DSC thermogram substantially similar to the one set forth in FIG. 3. In some embodiments, crystalline Compound 1 tosylate has a DSC thermogram with an endotherm having an onset at about 233° C. In some embodiments, crystalline Compound 1 tosylate is obtained from tetrahydrofuran. In some embodiments, crystalline Compound 1 tosylate is solvated. In some embodiments, crystalline Compound 1 tosylate is unsolvated. In some embodiments, crystalline Compound 1 tosylate is non-hygroscopic.

Crystalline Compound 1, Sulfuric Acid Salt (Sulfate)

Figure 4:
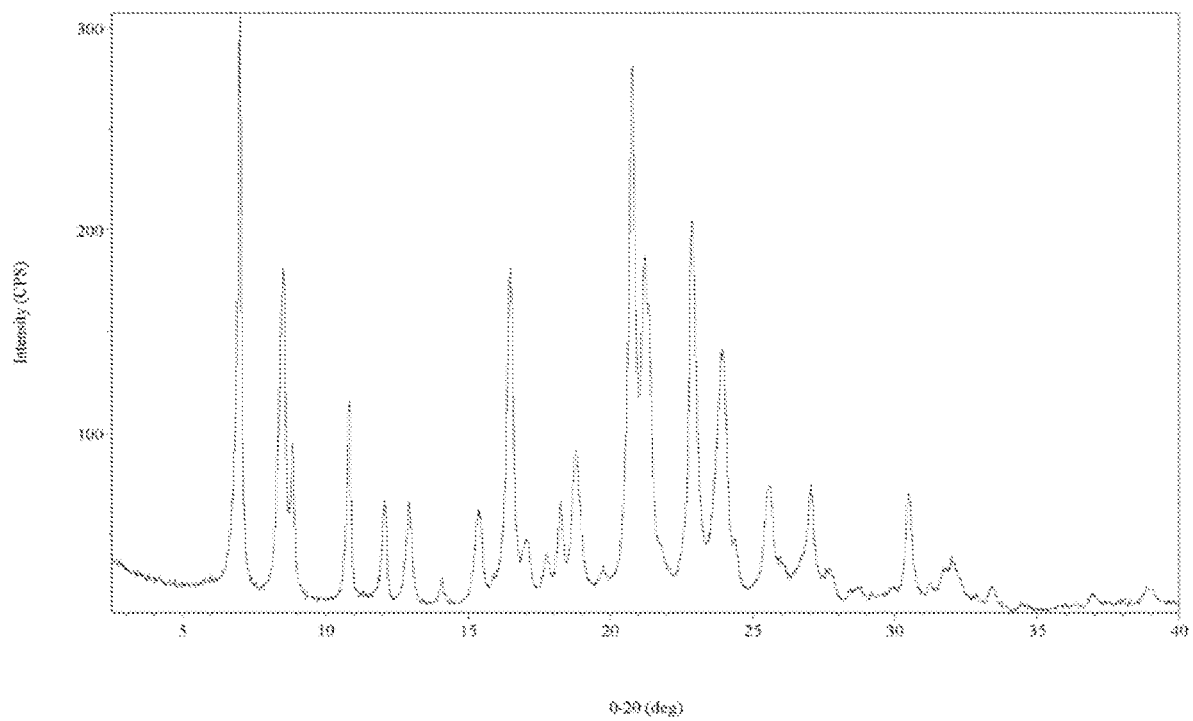
FIG. 4. Illustrates an X-ray powder diffraction (XRPD) pattern of crystalline 1-(4-(benzylamino)-5,6,7,8-tetrahydropyrido[2,3-d]pyrimidin-2-yl)-2-methyl-1H-indole-4-carboxamide sulfate.
Figure 5:
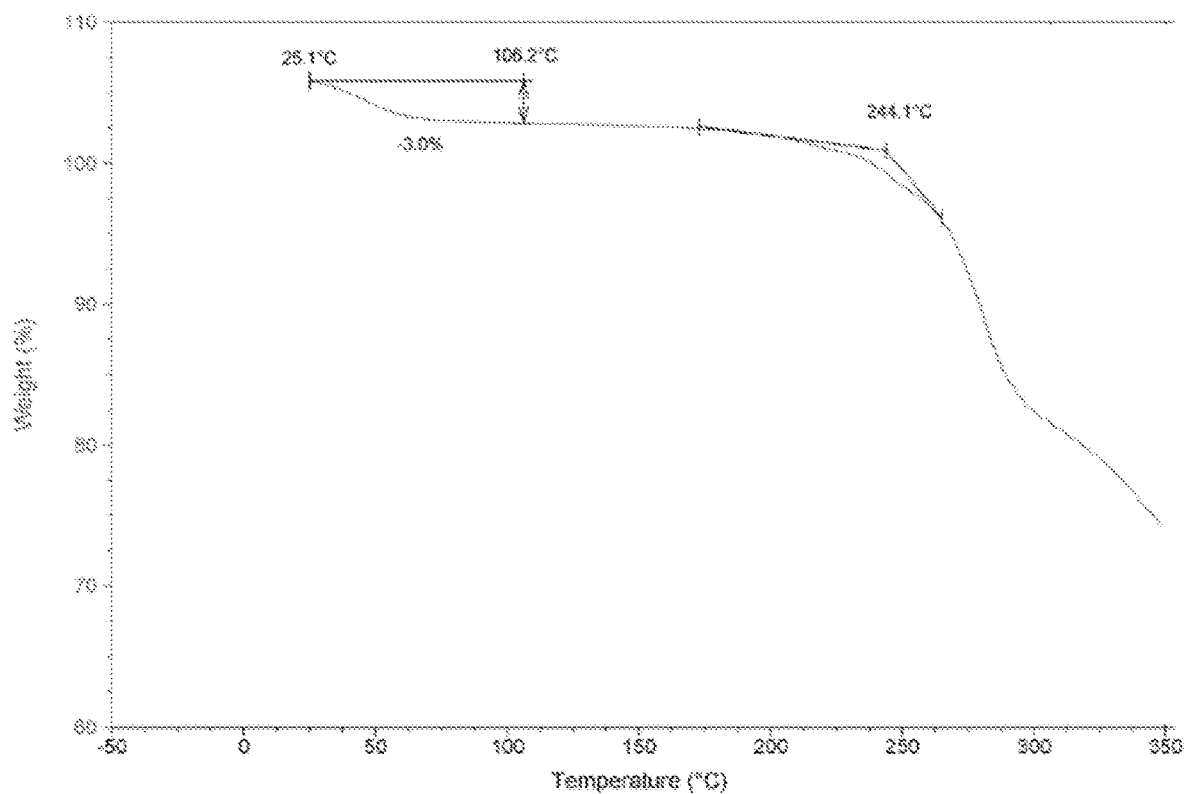
FIG. 5. Illustrates a thermogravimetric analysis (TGA) thermogram of crystalline 1-(4-(benzylamino)-5,6,7,8-tetrahydropyrido[2,3-d]pyrimidin-2-yl)-2-methyl-1H-indole-4-carboxamide sulfate.
Figure 6:
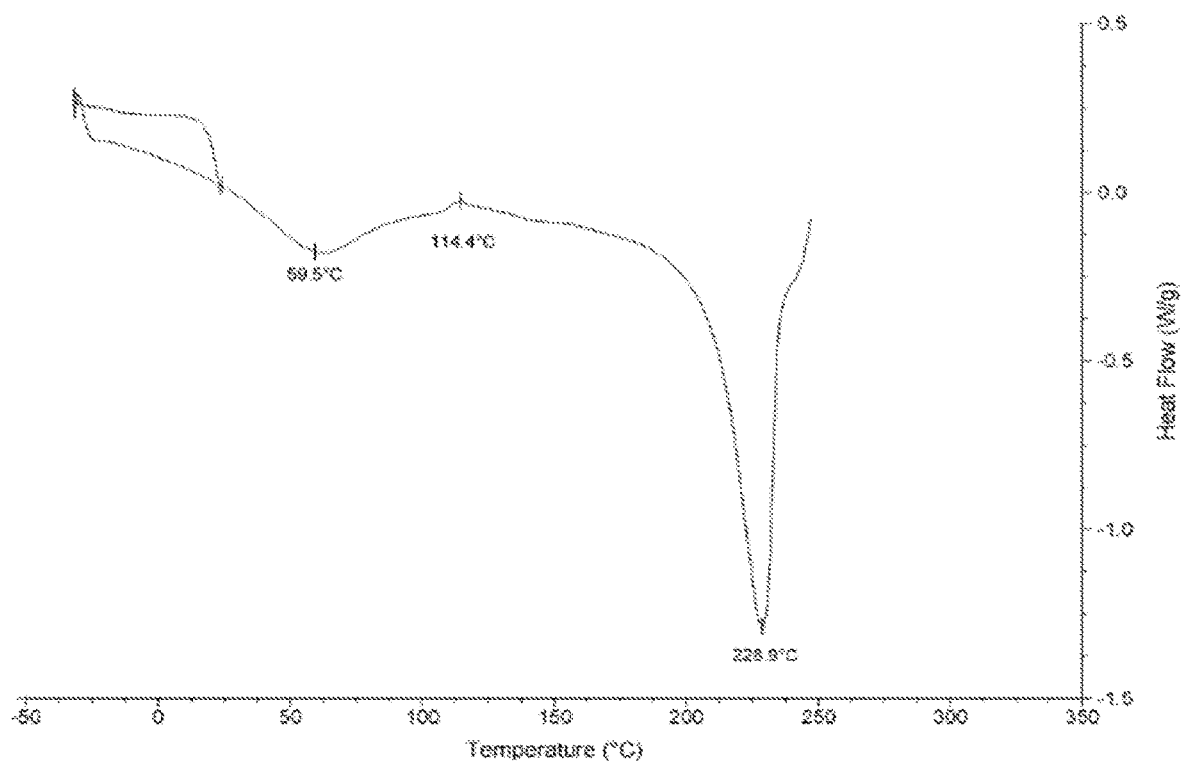
FIG. 6. Illustrates a differential scanning calorimetry (DSC) thermogram of crystalline 1-(4-(benzylamino)-5,6,7,8-tetrahydropyrido[2,3-d]pyrimidin-2-yl)-2-methyl-1H-indole-4-carboxamide sulfate.

In some embodiments, crystalline Compound 1 is a sulfuric acid salt (sulfate). In some embodiments, crystalline Compound 1 sulfate is characterized as having at least one of the following properties:
(a) an X-ray powder diffraction (XRPD) pattern substantially the same as shown in FIG. 4;
(b) an X-ray powder diffraction (XRPD) pattern with characteristic peaks at 6.8° 2-Theta, 7.6° 2-Theta, 7.7° 2-Theta, 10.2° 2-Theta, 12.0° 2-Theta, 12.5° 2-Theta, 16.3° 2-Theta, 21.0° 2-Theta, 21.3° 2-Theta, 22.6° 2-Theta, 23.7° 2-Theta, 25.5° 2-Theta, 27.0° 2-Theta, 30.1° 2-Theta;
(c) a thermogravimetric analysis (TGA) substantially similar to the one set forth in FIG. 5;
(d) a DSC thermogram substantially similar to the one set forth in FIG. 6;
(e) a DSC thermogram with an endotherm having an onset at about 229° C.; or
(f) combinations thereof.

In some embodiments, crystalline Compound 1 sulfate is characterized as having at least two of the properties selected from (a) to (e). In some embodiments, crystalline Compound 1 sulfate is characterized as having at least three of the properties selected from (a) to (e). In some embodiments, crystalline Compound 1 sulfate is characterized as having at least four of the properties selected from (a) to (e). In some embodiments, crystalline Compound 1 sulfate is characterized as having properties (a) to (e).

In some embodiments, crystalline Compound 1 sulfate has an X-ray powder diffraction (XRPD) pattern substantially the same as shown in FIG. 4. In some embodiments, crystalline Compound 1 sulfate has an X-ray powder diffraction (XRPD) pattern with characteristic peaks at 6.8° 2-Theta, 7.6° 2-Theta, 7.7° 2-Theta, 10.2° 2-Theta, 12.0° 2-Theta, 12.5° 2-Theta, 16.3° 2-Theta, 21.0° 2-Theta, 21.3° 2-Theta, 22.6° 2-Theta, 23.7° 2-Theta, 25.5° 2-Theta, 27.0° 2-Theta, 30.1° 2-Theta. In some embodiments, crystalline Compound 1 sulfate has a thermogravimetric analysis (TGA) thermogram substantially similar to the one set forth in FIG. 5. In some embodiments, crystalline Compound 1 sulfate has a DSC thermogram substantially similar to the one set forth in FIG. 6. In some embodiments, crystalline Compound 1 sulfate has a DSC thermogram with an endotherm having an onset at about 229° C. In some embodiments, crystalline Compound 1 sulfate is obtained from tetrahydrofuran and drying at 80° C. for 24 hours. In some embodiments, crystalline Compound 1 sulfate is solvated. In some embodiments, crystalline Compound 1 sulfate is unsolvated. In some embodiments, crystalline Compound 1 sulfate is non-hygroscopic.

Crystalline Compound 1, Sulfuric Acid Salt (Sulfate) THF Solvate

Figure 10:
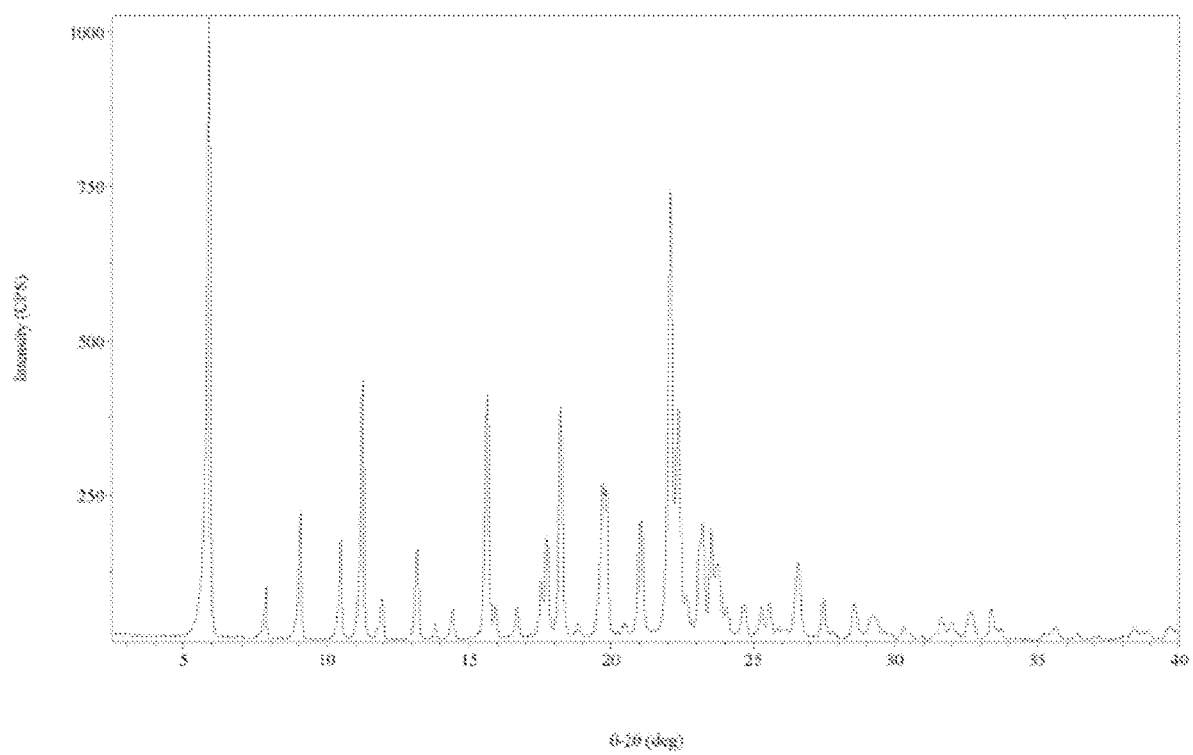
FIG. 10. Illustrates an X-ray powder diffraction (XRPD) pattern of crystalline 1-(4-(benzylamino)-5,6,7,8-tetrahydropyrido[2,3-d]pyrimidin-2-yl)-2-methyl-1H-indole carboxamide sulfate THF solvate.

In some embodiments, crystalline Compound 1 sulfate is a THF solvate. In some embodiments, crystalline Compound 1 sulfate THF solvate has an X-ray powder diffraction (XRPD) pattern substantially the same as shown in FIG. 10. In some embodiments, crystalline Compound 1 sulfate is obtained from tetrahydrofuran.

Crystalline Compound 1, Hydrochloric Acid Salt (Hydrochloride)

Figure 7:
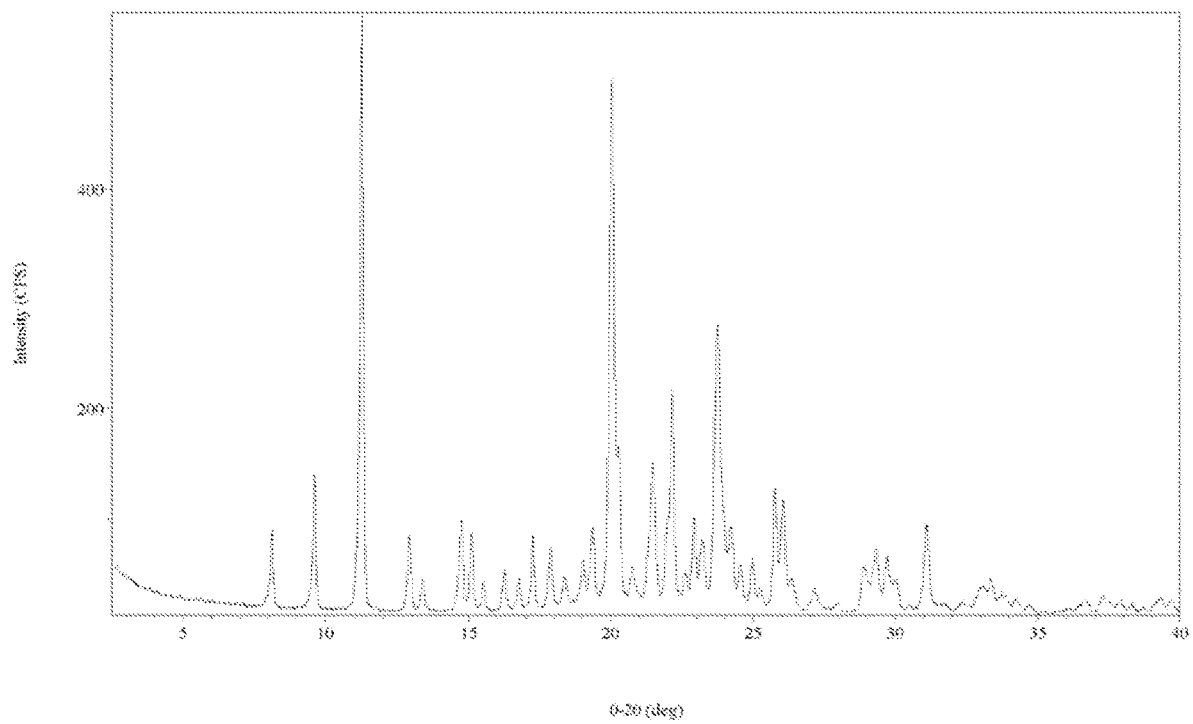
FIG. 7. Illustrates an X-ray powder diffraction (XRPD) pattern of crystalline 1-(4-(benzylamino)-5,6,7,8-tetrahydropyrido[2,3-d]pyrimidin-2-yl)-2-methyl-1H-indole-4-carboxamide hydrochloride.
Figure 8:
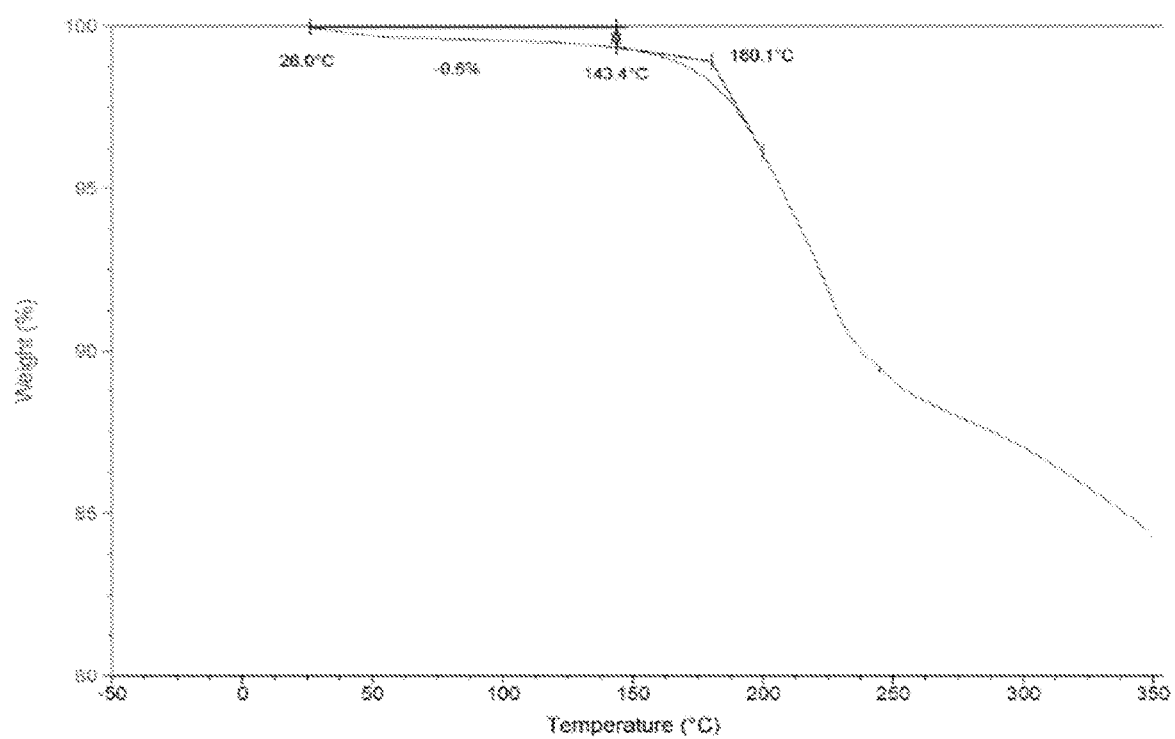
FIG. 8. Illustrates a thermogravimetric analysis (TGA) thermogram of crystalline 1-(4-(benzylamino)-5,6,7,8-tetrahydropyrido[2,3-d]pyrimidin-2-yl)-2-methyl-1H-indole-4-carboxamide hydrochloride.
Figure 9:
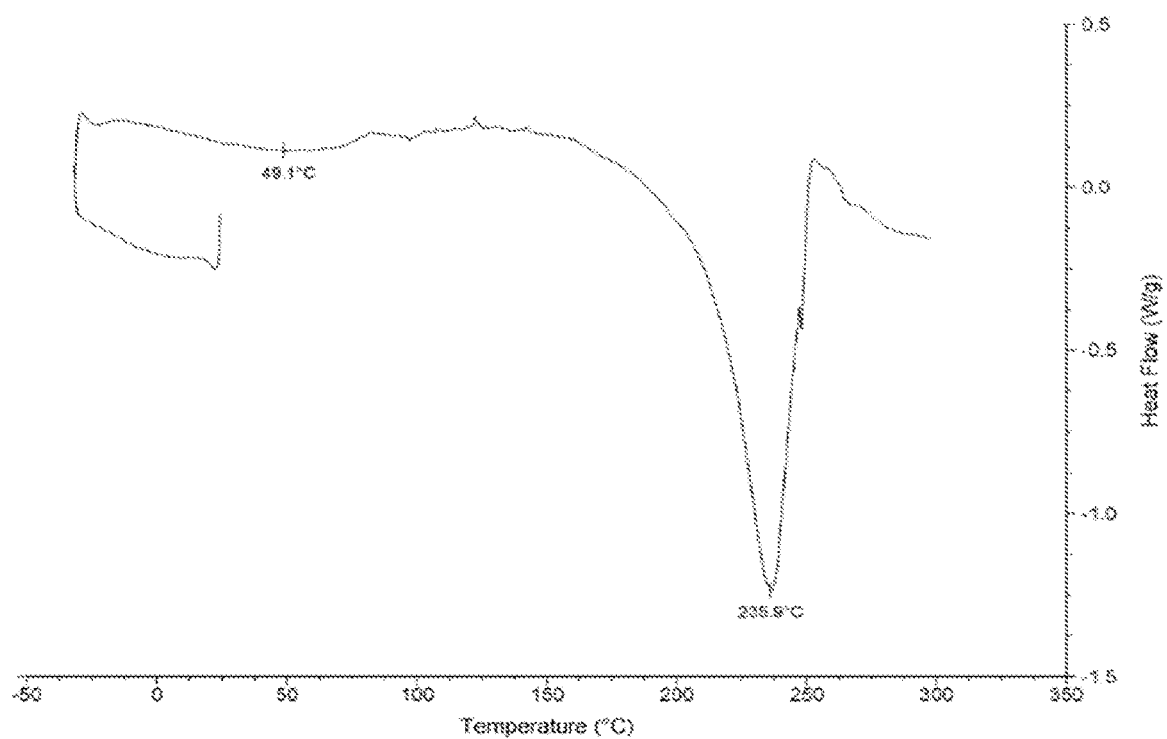
FIG. 9. Illustrates a differential scanning calorimetry (DSC) thermogram of crystalline 1-(4-(benzylamino)-5,6,7,8-tetrahydropyrido[2,3-d]pyrimidin-2-yl)-2-methyl-1H-indole carboxamide hydrochloride.

In some embodiments, crystalline Compound 1 is a hydrochloric acid salt (hydrochloride). In some embodiments, crystalline Compound 1 sulfate is characterized as having at least one of the following properties:
(a) an X-ray powder diffraction (XRPD) pattern substantially the same as shown in FIG. 7;
(b) an X-ray powder diffraction (XRPD) pattern with characteristic peaks at 9.8° 2-Theta, 11.3° 2-Theta, 20.0° 2-Theta, 21.2° 2-Theta, 21.4° 2-Theta, and 23.8° 2-Theta;
(c) a thermogravimetric analysis (TGA) substantially similar to the one set forth in FIG. 8;
(d) a DSC thermogram substantially similar to the one set forth in FIG. 9;
(e) a DSC thermogram with an endotherm having an onset at about 236° C.; or
(f) combinations thereof.

In some embodiments, crystalline Compound 1 hydrochloride is characterized as having at least two of the properties selected from (a) to (e). In some embodiments, crystalline Compound 1 hydrochloride is characterized as having at least three of the properties selected from (a) to (e). In some embodiments, crystalline Compound 1 hydrochloride is characterized as having at least four of the properties selected from (a) to (e). In some embodiments, crystalline Compound 1 hydrochloride is characterized as having properties (a) to (e).

In some embodiments, crystalline Compound 1 hydrochloride has an X-ray powder diffraction (XRPD) pattern substantially the same as shown in FIG. 7. In some embodiments, crystalline Compound 1 hydrochloride has an X-ray powder diffraction (XRPD) pattern with characteristic peaks at 9.8° 2-Theta, 11.3° 2-Theta, 20.0° 2-Theta, 21.2° 2-Theta, 21.4° 2-Theta, and 23.8° 2-Theta. In some embodiments, crystalline Compound 1 hydrochloride has a thermogravimetric analysis (TGA) thermogram substantially similar to the one set forth in FIG. 8. In some embodiments, crystalline Compound 1 hydrochloride has a DSC thermogram substantially similar to the one set forth in FIG. 9. In some embodiments, crystalline Compound 1 hydrochloride has a DSC thermogram with an endotherm having an onset at about 236° C. In some embodiments, crystalline Compound 1 hydrochloride is obtained from methyl ethyl ketone. In some embodiments, crystalline Compound 1 hydrochloride is solvated. In some embodiments, crystalline Compound 1 hydrochloride is unsolvated. In some embodiments, crystalline Compound 1 hydrochloride is non-hygroscopic.

Crystalline Compound 1, Hydrochloric Acid Salt (Hydrochloride) THF Solvate

Figure 11:
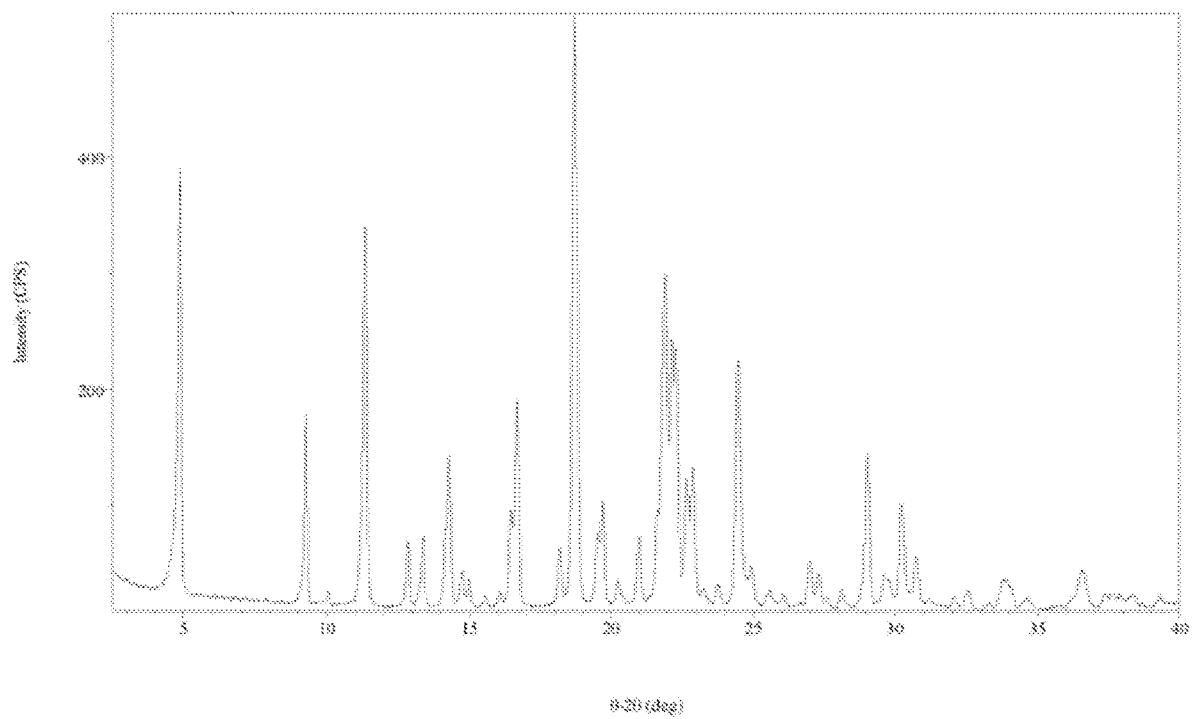
FIG. 11. Illustrates an X-ray powder diffraction (XRPD) pattern of crystalline 1-(4-(benzylamino)-5,6,7,8-tetrahydropyrido[2,3-d]pyrimidin-2-yl)-2-methyl-1H-indole-4-carboxamide hydrochloride THF solvate.

In some embodiments, crystalline Compound 1 hydrochloride is a THF solvate. In some embodiments, crystalline Compound 1 hydrochloride THF solvate has an X-ray powder diffraction (XRPD) pattern substantially the same as shown in FIG. 11. In some embodiments, crystalline Compound 1 hydrochloride THF solvate is obtained from tetrahydrofuran.

Crystalline Compound 1, Benzenesulfonic Acid Salt (Besylate)

Figure 12:
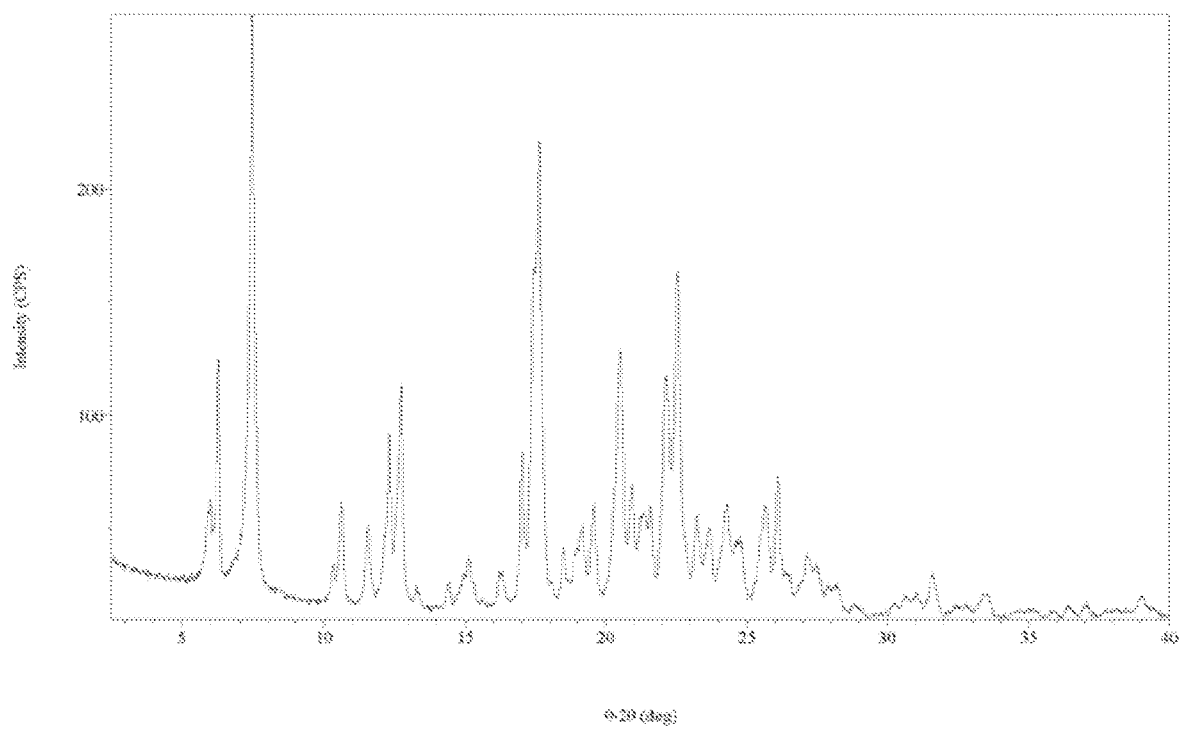
FIG. 12. Illustrates an X-ray powder diffraction (XRPD) pattern of crystalline 1-(4-(benzylamino)-5,6,7,8-tetrahydropyrido[2,3-d]pyrimidin-2-yl)-2-methyl-1H-indole-4-carboxamide besylate.

In some embodiments, crystalline Compound 1 is a benzenesulfonic acid salt (besylate). In some embodiments, crystalline Compound 1 besylate has an X-ray powder diffraction (XRPD) pattern substantially the same as shown in FIG. 12. In some embodiments, crystalline Compound besylate is obtained from tetrahydrofuran. In some embodiments, crystalline Compound 1 besylate is solvated. In some embodiments, crystalline Compound 1 besylate is unsolvated.

Crystalline Compound 1, Free Base (Form A)

Figure 13:
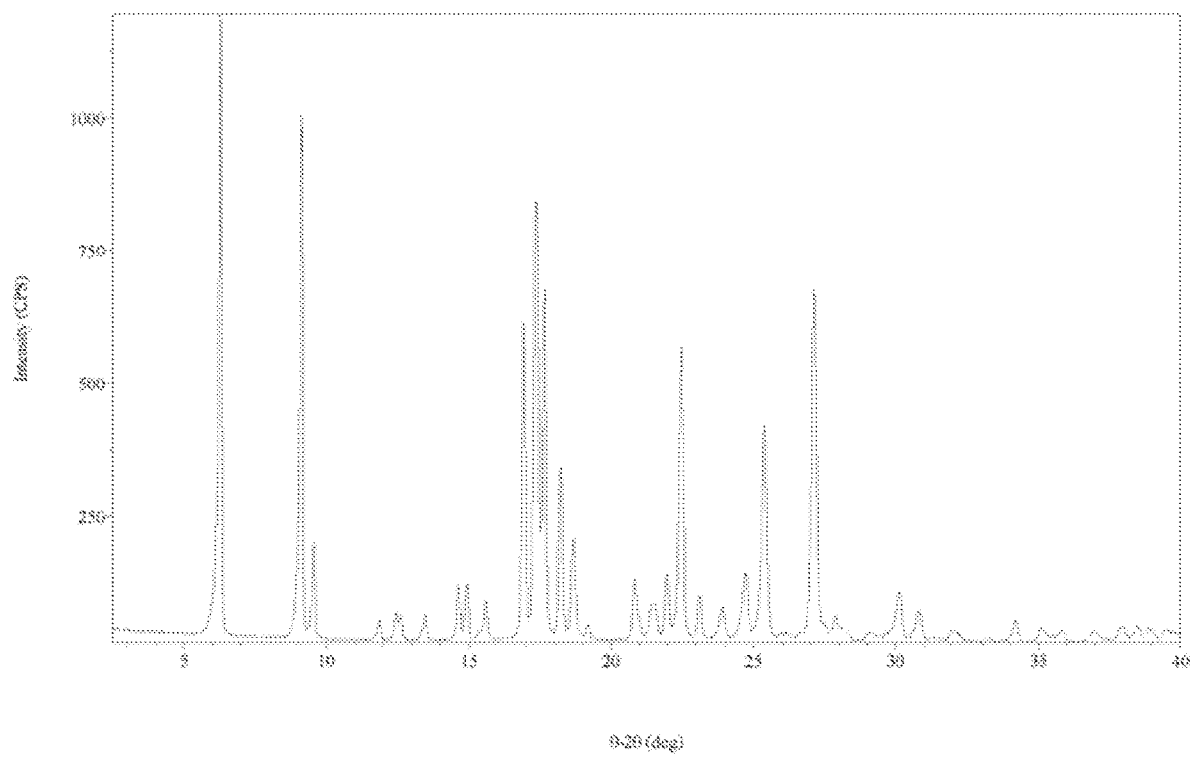
FIG. 13. Illustrates an X-ray powder diffraction (XRPD) pattern of crystalline 1-(4-(benzylamino)-5,6,7,8-tetrahydropyrido[2,3-d]pyrimidin-2-yl)-2-methyl-1H-indole-4-carboxamide free base (form A).
Figure 14:
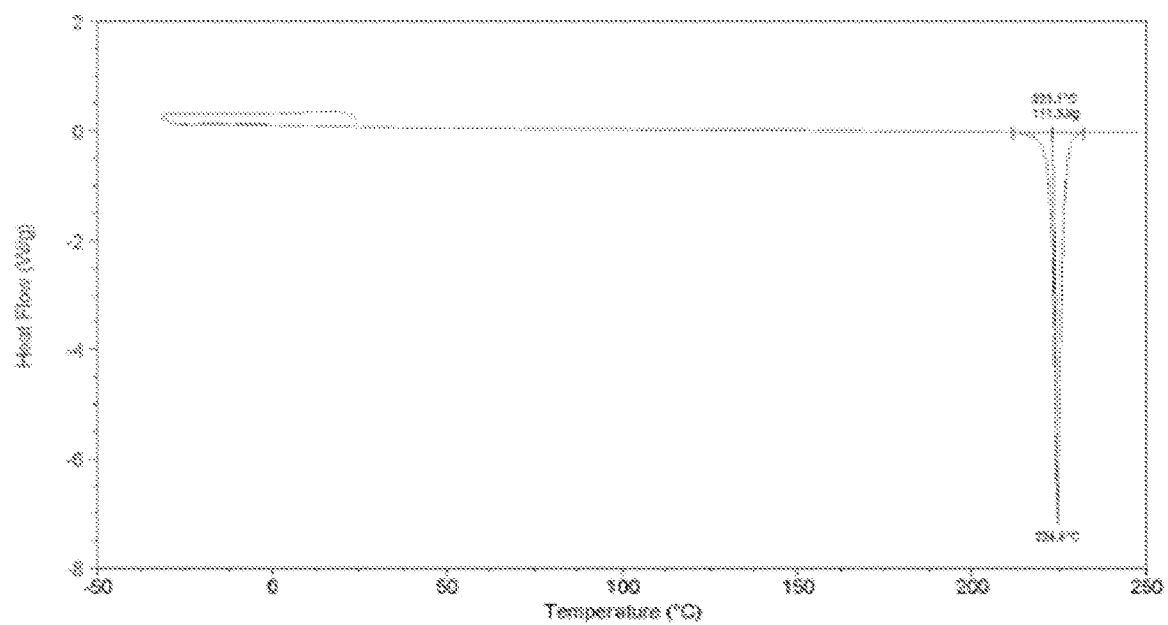
FIG. 14. Illustrates a differential scanning calorimetry (DSC) thermogram of crystalline 1-(4-(benzylamino)-5,6,7,8-tetrahydropyrido[2,3-d]pyrimidin-2-yl)-2-methyl-1H-indole-4-carboxamide free base (form A).

In some embodiments, crystalline Compound 1 is a free base. In some embodiments, crystalline Compound 1 is a free base (form A). In some embodiments, crystalline Compound 1 free base (form A) has an X-ray powder diffraction (XRPD) pattern substantially the same as shown in FIG. 13. In some embodiments, crystalline Compound 1 free base (form A) has a DSC thermogram substantially similar to the one set forth in FIG. 14. In some embodiments, crystalline Compound 1 free base (form A) has a DSC thermogram with an endotherm having an onset at about 224° C. In some embodiments, crystalline Compound 1 free base (form A) is solvated. In some embodiments, crystalline Compound 1 free base (form A) is unsolvated.

Crystalline Compound 1, Free Base (Form B)

Figure 15:
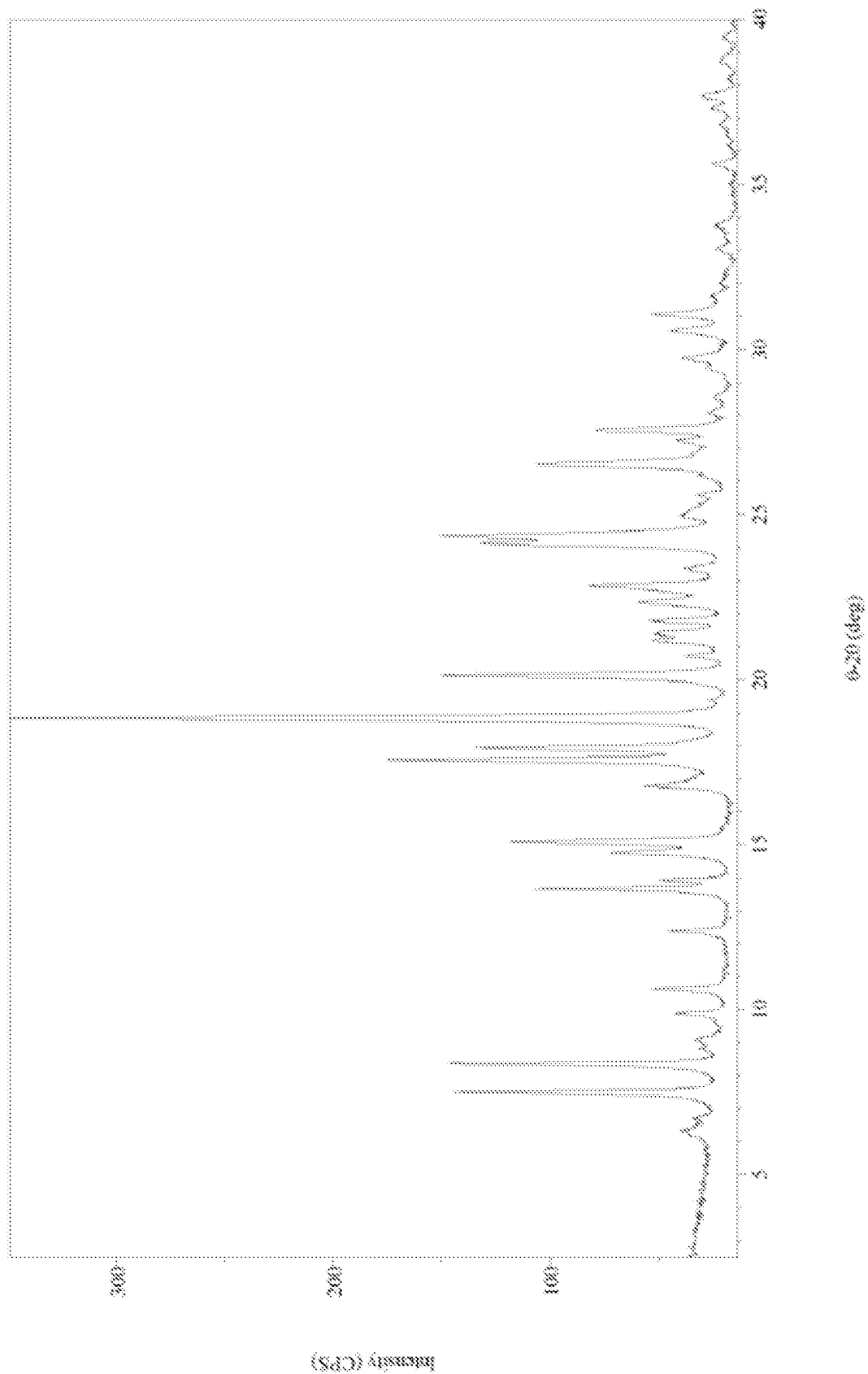
FIG. 15. Illustrates an X-ray powder diffraction (XRPD) pattern of crystalline 1-(4-(benzylamino)-5,6,7,8-tetrahydropyrido[2,3-d]pyrimidin-2-yl)-2-methyl-1H-indole-4-carboxamide free base (form B).

In some embodiments, crystalline Compound 1 is a free base (form B). In some embodiments, crystalline Compound 1 free base (form B) has an X-ray powder diffraction (XRPD) pattern substantially the same as shown in FIG. 15. In some embodiments, crystalline Compound 1 free base (form B) is solvated. In some embodiments, crystalline Compound 1 free base (form B) is unsolvated.

Preparation of Crystalline Salts of Compound 1

In some embodiments, crystalline salt forms of Compound 1 are prepared as outlined in the Examples. It is noted that solvents, temperatures, and other reaction conditions presented herein may vary.

In certain embodiments, provided herein are methods for making a solid form of Compound 1, comprising 1) suspending Compound 1 free base (form A) and a pharmaceutically acceptable acid in a suitable solvent at a first temperature at room temperature; 2) cycling the Compound 1 mixture between ambient and a second temperature (e.g., about 40° C.) in 4 hour cycles over 72 hours; 3) collecting a solid if there is precipitation, and evaporating the solvent to collect a solid if there is no precipitation; and 4) optionally drying. In certain embodiments, provided herein are methods for making a solid salt form of Compound 1, comprising 1) obtaining a saturated solution of Compound 1 free base (form A) and a pharmaceutically acceptable acid in a suitable solvent; 2) adding an anti-solvent into the saturated solution; 3) cooling down to about 2-8° C. and the at about −20° C.; 4) collecting a solid if there is precipitation, and evaporating the solvent to collect a solid if there is no precipitation; and 5) optionally drying. In certain embodiments, the ratio by volume of solvent and anti-solvent is about 1:9. In certain embodiments, the ratio by volume of solvent and anti-solvent is about 1:4. In certain embodiments, the ratio by volume of solvent and anti-solvent is about 1:2. In certain embodiments, the ratio by volume of solvent and anti-solvent is about 1:1. In certain embodiments, the methods for making a solid form of Compound 1 are anti-solvent recrystallization experiments.

In another embodiment, crystalline Compound 1 tosylate is substantially pure. In certain embodiments, the substantially pure crystalline Compound 1 tosylate is substantially free of other solid forms, e.g., amorphous solid. In certain embodiments, the purity of the substantially pure crystalline Compound 1 tosylate is no less than about 95%, no less than about 96%, no less than about 97%, no less than about 98%, no less than about 98.5%, no less than about 99%, no less than about 99.5%, or no less than about 99.8%.

In another embodiment, crystalline Compound 1 sulfate is substantially pure. In certain embodiments, the substantially pure crystalline Compound 1 sulfate is substantially free of other solid forms, e.g., amorphous solid. In certain embodiments, the purity of the substantially pure crystalline Compound 1 sulfate is no less than about 95%, no less than about 96%, no less than about 97%, no less than about 98%, no less than about 98.5%, no less than about 99%, no less than about 99.5%, or no less than about 99.8%.

In another embodiment, crystalline Compound 1 hydrochloride is substantially pure. In certain embodiments, the substantially pure crystalline Compound 1 hydrochloride is substantially free of other solid forms, e.g., amorphous solid. In certain embodiments, the purity of the substantially pure crystalline Compound 1 hydrochloride is no less than about 95%, no less than about 96%, no less than about 97%, no less than about 98%, no less than about 98.5%, no less than about 99%, no less than about 99.5%, or no less than about 99.8%.

Suitable Solvents

Therapeutic agents that are administrable to mammals, such as humans, must be prepared by following regulatory guidelines. Such government regulated guidelines are referred to as Good Manufacturing Practice (GMP). GMP guidelines outline acceptable contamination levels of active therapeutic agents, such as, for example, the amount of residual solvent in the final product. In some embodiments, solvents disclosed herein are those that are suitable for use in GMP facilities and consistent with industrial safety concerns. Categories of solvents are defined in, for example, the International Conference on Harmonization of Technical Requirements for Registration of Pharmaceuticals for Human Use (ICH), "Impurities: Guidelines for Residual Solvents Q3C(R6)," (October 2016).

Solvents are categorized into three classes. Class 1 solvents are toxic and are to be avoided. Class 2 solvents are solvents to be limited in use during the manufacture of the therapeutic agent. Class 3 solvents are solvents with low toxic potential and of lower risk to human health. Data for Class 3 solvents indicate that they are less toxic in acute or short-term studies and negative in genotoxicity studies.

Class 1 solvents, which are to be avoided, include: benzene; carbon tetrachloride; 1,2-dichloroethane; 1,1-dichloroethene; and 1,1,1-trichloroethane.

Examples of Class 2 solvents are: acetonitrile, chlorobenzene, chloroform, cumene, cyclohexane, 1,2-dichloroethene, dichloromethane, 1,2-dimethoxyethane, N,N-dimethylacetamide, N,N-dimethylformamide, 1,4-dioxane, 2-ethoxyethanol, ethylene glycol, formamide, hexane, methanol, 2-methoxyethanol, methylbutyl ketone, methylcyclohexane, methylisobutylketone, N-methylpyrrolidone, nitromethane, pyridine, sulfolane, tetrahydrofuran, tetralin, toluene, 1,1,2-trichloroethene and xylene.

Class 3 solvents, which possess low toxicity, include: acetic acid, acetone, anisole, 1-butanol, 2-butanol, butyl acetate, tert-butyl methyl ether (MTBE), dimethyl sulfoxide, ethanol, ethyl acetate, ethyl ether, ethyl formate, formic acid, heptane, isobutyl acetate, isopropyl acetate, methyl acetate, 3-methyl-1-butanol, methylethyl ketone, 2-methyl-1-propanol, pentane, 1-pentanol, 1-propanol, 2-propanol, propyl acetate, and triethylamine.

Residual solvents in active pharmaceutical ingredients (APIs) originate from the manufacture of APIs. In some cases, the solvents are not completely removed by practical manufacturing techniques. Appropriate selection of the solvent for the synthesis of APIs may enhance the yield, or determine characteristics such as crystal form, purity, and solubility. Therefore, the solvent is a critical parameter in the synthetic process.

In some embodiments, compositions comprising Compound 1 comprise an organic solvent(s). In some embodiments, compositions comprising Compound 1 comprise a residual amount of an organic solvent(s). In some embodiments, compositions comprising Compound 1 comprise a residual amount of a Class 3 solvent. In some embodiments, the organic solvent is a Class 3 solvent. In some embodiments, the Class 3 solvent is selected from the group consisting of acetic acid, acetone, anisole, 1-butanol, 2-butanol, butyl acetate, tert-butyl methyl ether (MTBE), dimethyl sulfoxide, ethanol, ethyl acetate, ethyl ether, ethyl formate, formic acid, heptane, isobutyl acetate, isopropyl acetate, methyl acetate, 3-methyl-1-butanol, methylethyl ketone, 2-methyl-1-propanol, pentane, 1-pentanol, 1-propanol, 2-propanol, propyl acetate, and triethylamine. In some embodiments, the Class 3 solvent is selected from the group consisting of acetone, ethyl acetate, isopropyl acetate, tert-butyl methyl ether, heptane, isopropanol, and ethanol.

In some embodiments, compositions comprising Compound 1 comprise a residual amount of a Class 2 solvent. In some embodiments, the organic solvent is a Class 2 solvent. In some embodiments, the Class 2 solvent is selected from the group consisting of acetonitrile, chlorobenzene, chloroform, cumene, cyclohexane, 1,2-dichloroethene, dichloromethane, 1,2-dimethoxyethane, N,N-dimethyl acetamide, N,N-dimethylformamide, 1,4-dioxane, 2-ethoxyethanol, ethylene glycol, formamide, hexane, methanol, 2-methoxyethanol, methylbutyl ketone, methylcyclohexane, methylisobutylketone, N-methylpyrrolidone, nitromethane, pyridine, sulfolane, tetrahydrofuran, tetralin, toluene, 1,1,2-trichloroethene and xylene. In some embodiments, the Class 2 solvent is selected from the group consisting of acetonitrile, tetrahydrofuran, and toluene. In some embodiments, the Class 2 solvent is acetonitrile.

In some embodiments, compositions comprising Compound 1 comprise a residual amount of a solvent for which no adequate toxicological data were found. In some embodiments, the organic solvent is a solvent for which no adequate toxicological data were found.

Certain Terminology

Unless defined otherwise, all technical and scientific terms used herein have the same meaning as is commonly understood by one of skill in the art to which the claimed subject matter belongs. It is to be understood that the foregoing general description and the following detailed description are exemplary and explanatory only and are not restrictive of any subject matter claimed. In this application, the use of the singular includes the plural unless specifically stated otherwise. It must be noted that, as used in the specification and the appended claims, the singular forms "a," "an" and "the" include plural referents unless the context clearly dictates otherwise. In this application, the use of "or" means "and/or" unless stated otherwise. Furthermore, use of the term "including" as well as other forms, such as "include", "includes," and "included," is not limiting. The term "comprising" (and related terms such as "comprise" or "comprises" or "having" or "including") is not intended to exclude that in other certain embodiments, for example, an embodiment of any composition of matter, composition, method, or process, or the like, described herein, may "consist of or" consist essentially of the described features. The term "about" when referring to a number or a numerical range means that the number or numerical range referred to is an approximation within experimental variability (or within statistical experimental error), and thus the number or numerical range may vary between 1% and 15% of the stated number or numerical range.

The section headings used herein are for organizational purposes only and are not to be construed as limiting the subject matter described. All documents, or portions of documents, cited in the application including, but not limited to, patents, patent applications, articles, books, manuals, and treatises are hereby expressly incorporated by reference in their entirety.

As used herein, "amelioration" of the symptoms of a particular disease, disorder, or condition by administration of a particular compound or pharmaceutical composition refers to any lessening of severity, delay in onset, slowing of progression, or shortening of duration, whether permanent or temporary, lasting or transient that can be attributed to or associated with administration of the compound or composition.

"Bioavailability" refers to the percentage of Compound 1 dosed that is delivered into the general circulation of the animal or human being studied. The total exposure ($AUC_{(0-\infty)}$) of a drug when administered intravenously is usually defined as 100% bioavailable (F %). "Oral bioavailability" refers to the extent to which Compound 1 is absorbed into the general circulation when the pharmaceutical composition is taken orally as compared to intravenous injection.

"Blood plasma concentration" refers to the concentration of Compound 1 in the plasma component of blood of a subject. It is understood that the plasma concentration of Compound 1 may vary significantly between subjects, due to variability with respect to metabolism and/or possible interactions with other therapeutic agents. In accordance with one embodiment disclosed herein, the blood plasma concentration of Compound 1 may vary from subject to subject. Likewise, values such as maximum plasma concentration ($C_{max}$) or time to reach maximum plasma concentration ($T_{max}$), or total area under the plasma concentration time curve ($AUC_{(0-\infty)}$) may vary from subject to subject. Due to this variability, the amount necessary to constitute "a therapeutically effective amount" of Compound 1 may vary from subject to subject.

The terms "co-administration" or the like, as used herein, are meant to encompass administration of the selected therapeutic agents to a single patient, and are intended to include treatment regimens in which the agents are administered by the same or different route of administration or at the same or different time.

The terms "effective amount" or "therapeutically effective amount," as used herein, refer to a sufficient amount of an agent or a compound being administered which will relieve to some extent one or more of the symptoms of the disease or condition being treated. The result can be reduction and/or alleviation of the signs, symptoms, or causes of a disease, or any other desired alteration of a biological system. For example, an "effective amount" for therapeutic uses is the amount of the composition including a compound as disclosed herein required to provide a clinically significant decrease in disease symptoms without undue adverse side effects. An appropriate "effective amount" in any individual case may be determined using techniques, such as a dose escalation study. The term "therapeutically effective amount" includes, for example, a prophylactically effective amount. An "effective amount" of a compound disclosed herein is an amount effective to achieve a desired pharmacologic effect or therapeutic improvement without undue adverse side effects. It is understood that "an effect amount" or "a therapeutically effective amount" can vary from subject to subject, due to variation in metabolism of Compound 1 age, weight, general condition of the subject, the condition being treated, the severity of the condition being treated, and the judgment of the prescribing physician. By way of example only, therapeutically effective amounts may be determined by a dose escalation clinical trial.

The terms "enhance" or "enhancing" means to increase or prolong either in potency or duration a desired effect. By way of example, "enhancing" the effect of therapeutic agents refers to the ability to increase or prolong, either in potency or duration, the effect of therapeutic agents on during treatment of a disease, disorder, or condition. An "enhancing-effective amount," as used herein, refers to an amount adequate to enhance the effect of a therapeutic agent in the treatment of a disease, disorder, or condition. When used in a patient, amounts effective for this use will depend on the severity and course of the disease, disorder, or condition, previous therapy, the patient's health status and response to the drugs, and the judgment of the treating physician.

The term "prophylactically effective amount," as used herein, refers that amount of a composition applied to a patient which will relieve to some extent one or more of the symptoms of a disease, condition or disorder being treated. In such prophylactic applications, such amounts may depend on the patient's state of health, weight, and the like. As an example, one can determine such prophylactically effective amounts by a dose escalation clinical trial.

The term "subject" as used herein, refers to an animal which is the object of treatment, observation or experiment. By way of example only, a subject may be, but is not limited to, a mammal including, but not limited to, a human.

As used herein, the term "target activity" refers to a biological activity capable of being modulated by a selective modulator. Certain exemplary target activities include, but are not limited to, binding affinity, signal transduction, enzymatic activity, tumor growth, inflammation or inflammation-related processes, and amelioration of one or more symptoms associated with a disease or condition.

The terms "treat," "treating" or "treatment", as used herein, include alleviating, abating or ameliorating a disease or condition symptoms, preventing additional symptoms, ameliorating or preventing the underlying metabolic causes of symptoms, inhibiting the disease or condition, e.g., arresting the development of the disease or condition, relieving the disease or condition, causing regression of the disease or condition, relieving a condition caused by the disease or condition, or stopping the symptoms of the disease or condition. The terms "treat," "treating" or "treatment", include, but are not limited to, prophylactic and/or therapeutic treatments.

As used herein, $IC_{50}$ refers to a dosage, concentration or amount of a particular test compound that elicits a dose-dependent response at 50% of maximal expression of a particular response that is induced, provoked or potentiated by the particular test compound.

Pharmaceutical Formulations

The 1-(4-(benzylamino)-5,6,7,8-tetrahydropyrido[2,3-d]pyrimidin-2-yl)-2-methyl-1H-indole-4-carboxamide pharmaceutical formulations described herein comprise 1-(4-(benzylamino)-5,6,7,8-tetrahydropyrido[2,3-d]pyrimidin-2-yl)-2-methyl-1H-indole-4-carboxamide, or a pharmaceutically acceptable salt thereof, and at least one pharmaceutically acceptable excipient, in a solid dosage form. In some embodiments, the pharmaceutical formulations described herein comprise crystalline 1-(4-(benzylamino)-5,6,7,8-tetrahydropyrido[2,3-d]pyrimidin-2-yl)-2-methyl-1H-indole-4-carboxamide, or a pharmaceutically acceptable salt thereof, and at least one pharmaceutically acceptable excipient, in a solid dosage form. In some embodiments, the pharmaceutical formulations described herein comprise crystalline 1-(4-(benzylamino)-5,6,7,8-tetrahydropyrido[2,3-d]pyrimidin-2-yl)-2-methyl-1H-indole-4-carboxamide, or a pharmaceutically acceptable salt thereof, in a crystalline form described herein, and at least one pharmaceutically acceptable excipient, in a solid dosage form. In some embodiments, the pharmaceutical formulations described herein comprise 1-(4-(benzylamino)-5,6,7,8-tetrahydropyrido[2,3-d]pyrimidin-2-yl)-2-methyl-1H-indole-4-carboxamide, or a pharmaceutically acceptable salt thereof, and at least one pharmaceutically acceptable excipient, in a solid dosage form, wherein the solid dosage form is selected from a powder, a tablet, a bite-disintegration tablet, a chewable tablet, a caplet, a capsule, a gelcap, an effervescent powder, a rapid-disintegration tablet, an abuse-deterrent tablet, a modified release tablet, a modified release caplet, a modified release capsule, and an aqueous suspension produced from a powder. In some embodiments, the pharmaceutical formulations described herein comprise 1-(4-(benzylamino)-5,6,7,8-tetrahydropyrido[2,3-d]pyrimidin-2-yl)-2-methyl-1H-indole-4-carboxamide, or a pharmaceutically acceptable salt thereof, and at least one pharmaceutically acceptable excipient, in a solid dosage form, wherein the solid dosage form is a capsule. In some embodiments, the pharmaceutical formulations described herein comprise 1-(4-(benzylamino)-5,6,7,8-tetrahydropyrido[2,3-d]pyrimidin-2-yl)-2-methyl-1H-indole-4-carboxamide, or a pharmaceutically acceptable salt thereof, and at least one pharmaceutically acceptable excipient, in a solid dosage form, wherein the solid dosage form is a tablet.

In some embodiments is a pharmaceutical formulation in a solid dosage form comprising:
(a) about 10 mg to about 120 mg of 1-(4-(benzylamino)-5,6,7,8-tetrahydropyrido[2,3-d]pyrimidin-2-yl)-2-methyl-1H-indole-4-carboxamide, or a pharmaceutically acceptable salt thereof;
(b) about 20 mg to about 100 mg of a first filler;
(c) about 20 mg to about 100 mg of a second filler;
(d) about 1.0 mg to about 10 mg of a surfactant;
(e) about 1.0 mg to about 10 mg of a disintegrant;
(f) about 0.1 mg to about 5 mg of a lubricant; and (g) about 0.1 mg to about 5 mg of a glidant;
wherein the first filler and second filler are independently selected from lactose, mannitol, dicalcium phosphate, microcrystalline cellulose, silicified microcrystalline cellulose, starch, and pregelatinized starch (Starch 1500).

In some embodiments is a pharmaceutical formulation in a solid dosage form comprising:
(a) about 10 mg to about 120 mg of 1-(4-(benzylamino)-5,6,7,8-tetrahydropyrido[2,3-d]pyrimidin-2-yl)-2-methyl-1H-indole-4-carboxamide, or a pharmaceutically acceptable salt thereof;
(b) about 20 mg to about 100 mg of a first filler;
(c) about 20 mg to about 100 mg of a second filler;
(d) about 1.0 mg to about 10 mg of a surfactant;
(e) about 1.0 mg to about 10 mg of a disintegrant;
(f) about 0.1 mg to about 5 mg of a lubricant; and
(g) about 0.1 mg to about 5 mg of a glidant;
wherein the surfactant is selected from polysorbates, poloxamers, bile salts, glyceryl monostearate, sodium lauryl sulfate, sorbitan monooleate, polyoxyethylene sorbitan monooleate, copolymers of ethylene oxide and propylene oxide, and d-α-tocopheryl polyethylene glycol succinate (Vitamin E TPGS).

In some embodiments is a pharmaceutical formulation in a solid dosage form comprising:
(a) about 10 mg to about 120 mg of 1-(4-(benzylamino)-5,6,7,8-tetrahydropyrido[2,3-d]pyrimidin-2-yl)-2-methyl-1H-indole-4-carboxamide, or a pharmaceutically acceptable salt thereof;
(b) about 20 mg to about 100 mg of a first filler;
(c) about 20 mg to about 100 mg of a second filler;
(d) about 1.0 mg to about 10 mg of a surfactant;
(e) about 1.0 mg to about 10 mg of a disintegrant;
(f) about 0.1 mg to about 5 mg of a lubricant; and
(g) about 0.1 mg to about 5 mg of a glidant;
wherein the disintegrant is selected from povidone, crospovidone, hypromellose, croscarmellose sodium, hydroxypropyl cellulose, and polyvinyl alcohol.

In some embodiments is a pharmaceutical formulation in a solid dosage form comprising:
(a) about 10 mg to about 120 mg of 1-(4-(benzylamino)-5,6,7,8-tetrahydropyrido[2,3-d]pyrimidin-2-yl)-2-methyl-1H-indole-4-carboxamide, or a pharmaceutically acceptable salt thereof;
(b) about 20 mg to about 100 mg of a first filler;
(c) about 20 mg to about 100 mg of a second filler;
(d) about 1.0 mg to about 10 mg of a surfactant;
(e) about 1.0 mg to about 10 mg of a disintegrant;
(f) about 0.1 mg to about 5 mg of a lubricant; and
(g) about 0.1 mg to about 5 mg of a glidant;
wherein the lubricant is selected from magnesium stearate, stearic acid, and sodium stearyl fumarate.

In some embodiments is a pharmaceutical formulation in a solid dosage form comprising:
(a) about 10 mg to about 120 mg of 1-(4-(benzylamino)-5,6,7,8-tetrahydropyrido[2,3-d]pyrimidin-2-yl)-2-methyl-1H-indole-4-carboxamide, or a pharmaceutically acceptable salt thereof;
(b) about 20 mg to about 100 mg of a first filler;
(c) about 20 mg to about 100 mg of a second filler;
(d) about 1.0 mg to about 10 mg of a surfactant;
(e) about 1.0 mg to about 10 mg of a disintegrant;
(f) about 0.1 mg to about 5 mg of a lubricant; and
(g) about 0.1 mg to about 5 mg of a glidant;
wherein the glidant is silicon dioxide or talc.

In some embodiments is a pharmaceutical formulation comprising:
(a) about 20 mg to about 45 mg of 1-(4-(benzylamino)-5,6,7,8-tetrahydropyrido[2,3-d]pyrimidin-2-yl)-2-methyl-1H-indole-4-carboxamide, or a pharmaceutically acceptable salt thereof;
(b) about 25 mg to about 35 mg of silicified microcrystalline cellulose;
(c) about 25 mg to about 35 mg of mannitol;
(d) about 1.5 mg to about 3 mg of poloxamer 407;
(e) about 1.5 mg to about 3 mg of croscarmellose sodium;
(f) about 0.1 mg to about 1.0 mg of magnesium stearate; and
(g) about 0.1 mg to about 1.0 mg of silicon dioxide.

In some embodiments is a pharmaceutical formulation comprising:
(a) about 35 mg of 1-(4-(benzylamino)-5,6,7,8-tetrahydropyrido[2,3-d]pyrimidin-2-yl)-2-methyl-1H-indole-4-carboxamide p-toluenesulfonic acid (tosylate) salt;
(b) about 29 mg of silicified microcrystalline cellulose;
(c) about 29 mg of mannitol;
(d) about 2.5 mg of poloxamer 407;
(e) about 2.5 mg of croscarmellose sodium;
(f) about 0.5 mg of magnesium stearate; and
(h) about 0.5 mg of silicon dioxide.

In some embodiments is a pharmaceutical formulation comprising:
(a) about 70 mg to about 110 mg of 1-(4-(benzylamino)-5,6,7,8-tetrahydropyrido[2,3-d]pyrimidin-2-yl)-2-methyl-1H-indole-4-carboxamide, or a pharmaceutically acceptable salt thereof;
(b) about 85 mg to about 95 mg of silicified microcrystalline cellulose;
(c) about 85 mg to about 95 mg of mannitol;
(d) about 6.5 mg to about 8.5 mg of poloxamer 407;
(e) about 6.5 mg to about 8.5 mg of croscarmellose sodium;
(f) about 1 mg to about 2 mg of magnesium stearate; and
(g) about 1 mg to about 2 mg of silicon dioxide.

In some embodiments is a pharmaceutical formulation comprising:
(a) about 106 mg of 1-(4-(benzylamino)-5,6,7,8-tetrahydropyrido[2,3-d]pyrimidin-2-yl)-2-methyl-1H-indole-4-carboxamide p-toluenesulfonic acid (tosylate) salt;
(b) about 88 mg of silicified microcrystalline cellulose;
(c) about 88 mg of mannitol;
(d) about 7.5 mg of poloxamer 407;
(e) about 7.5 mg of croscarmellose sodium;
(f) about 1.5 mg of magnesium stearate; and
(g) about 1.5 mg of silicon dioxide.

In some embodiments is a pharmaceutical formulation comprising:
(a) about 707 mg of 1-(4-(benzylamino)-5,6,7,8-tetrahydropyrido[2,3-d]pyrimidin-2-yl)-2-methyl-1H-indole-4-carboxamide p-toluenesulfonic acid (tosylate) salt;
(b) about 587 mg of silicified microcrystalline cellulose;
(c) about 587 mg of mannitol;
(d) about 50 mg of poloxamer 407;
(e) about 50 mg of croscarmellose sodium;
(f) about 10 mg of magnesium stearate; and
(g) about 10 mg of silicon dioxide.

In some embodiments, the first filler and second filler are independently selected from lactose, mannitol, dicalcium phosphate, microcrystalline cellulose, silicified microcrystalline cellulose, starch, and pregelatinized starch (Starch 1500). In some embodiments, the first filler and second filler are independently selected from lactose, mannitol, microcrystalline cellulose, and silicified microcrystalline cellulose. In some embodiments, the first filler is lactose. In some embodiments, the first filler is mannitol. In some embodiments, the first filler is dicalcium phosphate. In some embodiments, the first filler is microcrystalline cellulose. In some embodiments, the first filler is silicified microcrystalline cellulose. In some embodiments, the first filler is starch. In some embodiments, the first filler is pregelatinized starch (Starch 1500). In some embodiments, the second filler is lactose. In some embodiments, the second filler is mannitol. In some embodiments, the second filler is dicalcium phosphate. In some embodiments, the second filler is microcrystalline cellulose. In some embodiments, the second filler is silicified microcrystalline cellulose. In some embodiments, the second filler is starch. In some embodiments, the second filler is pregelatinized starch (Starch 1500). In some embodiments, the first filler is silicified microcrystalline cellulose and the second filler is mannitol. In some embodiments, the pharmaceutical formulation comprises about 10 mg to about 150 mg of a first filler and about 10 mg to about 150 mg of a second filler. In some embodiments, the pharmaceutical formulation comprises about 10 mg to about 125 mg of a first filler and about 10 mg to about 125 mg of a second filler. In some embodiments, the pharmaceutical formulation comprises about 20 mg to about 125 mg of a first filler and about 20 mg to about 125 mg of a second filler. In some embodiments, the pharmaceutical formulation comprises about 20 mg to about 100 mg of a first filler and about 20 mg to about 100 mg of a second filler. In some embodiments, the pharmaceutical formulation comprises about 50 mg to about 100 mg of a first filler and about 50 mg to about 100 mg of a second filler. In some embodiments, the pharmaceutical formulation comprises about 60 mg to about 100 mg of a first filler and about 60 mg to about 100 mg of a second filler. In some embodiments, the pharmaceutical formulation comprises about 75 mg to about 100 mg of a first filler and about 75 mg to about 100 mg of a second filler. In some embodiments, the pharmaceutical formulation comprises about 80 mg to about 100 mg of a first filler and about 80 mg to about 100 mg of a second filler. In some embodiments, the pharmaceutical formulation comprises about 80 mg to about 95 mg of a first filler and about 80 mg to about 95 mg of a second filler. In some embodiments, the pharmaceutical formulation comprises about 85 mg to about 95 mg of a first filler and about 85 mg to about 95 mg of a second filler. In some embodiments, the pharmaceutical formulation comprises about 10 mg to about 50 mg of a first filler and about 10 mg to about 50 mg of a second filler. In some embodiments, the pharmaceutical formulation comprises about 20 mg to about 50 mg of a first filler and about 20 mg to about 50 mg of a second filler. In some embodiments, the pharmaceutical formulation comprises about 20 mg to about 45 mg of a first filler and about 20 mg to about 45 mg of a second filler. In some embodiments, the pharmaceutical formulation comprises about 25 mg to about 45 mg of a first filler and about 25 mg to about 45 mg of a second filler. In some embodiments, the pharmaceutical formulation comprises about 25 mg to about 40 mg of a first filler and about 25 mg to about 40 mg of a second filler. In some embodiments, the pharmaceutical formulation comprises about 25 mg to about 35 mg of a first filler and about 25 mg to about 35 mg of a second filler. In some embodiments, the pharmaceutical formulation comprises about 10 mg of a first filler. In some embodiments, the pharmaceutical formulation comprises about 15 mg of a first filler. In some embodiments, the pharmaceutical formulation comprises about 20 mg of a first filler. In some embodiments, the pharmaceutical formulation comprises about 25 mg of a first filler. In some embodiments, the pharmaceutical formulation comprises about 30 mg of a first filler. In some embodiments, the pharmaceutical formulation comprises about 35 mg of a first filler. In some embodiments, the pharmaceutical formulation comprises about 40 mg of a first filler. In some embodiments, the pharmaceutical formulation comprises about 45 mg of a first filler. In some embodiments, the pharmaceutical formulation comprises about 50 mg of a first filler. In some embodiments, the pharmaceutical formulation comprises about 55 mg of a first filler. In some embodiments, the pharmaceutical formulation comprises about 60 mg of a first filler. In some embodiments, the pharmaceutical formulation comprises about 65 mg of a first filler. In some embodiments, the pharmaceutical formulation comprises about 70 mg of a first filler. In some embodiments, the pharmaceutical formulation comprises about 75 mg of a first filler. In some embodiments, the pharmaceutical formulation comprises about 80 mg of a first filler. In some embodiments, the pharmaceutical formulation comprises about 85 mg of a first filler. In some embodiments, the pharmaceutical formulation comprises about 90 mg of a first filler. In some embodiments, the pharmaceutical formulation comprises about 95 mg of a first filler. In some embodiments, the pharmaceutical formulation comprises about 100 mg of a first filler. In some embodiments, the pharmaceutical formulation comprises about 105 mg of a first filler. In some embodiments, the pharmaceutical formulation comprises about 110 mg of a first filler. In some embodiments, the pharmaceutical formulation comprises about 115 mg of a first filler. In some embodiments, the pharmaceutical formulation comprises about 120 mg of a first filler. In some embodiments, the pharmaceutical formulation comprises about 125 mg of a first filler. In some embodiments, the pharmaceutical formulation comprises about 10 mg of a second filler. In some embodiments, the pharmaceutical formulation comprises about 15 mg of a second filler. In some embodiments, the pharmaceutical formulation comprises about 20 mg of a second filler. In some embodiments, the pharmaceutical formulation comprises about 25 mg of a second filler. In some embodiments, the pharmaceutical formulation comprises about 30 mg of a second filler. In some embodiments, the pharmaceutical formulation comprises about 35 mg of a second filler. In some embodiments, the pharmaceutical formulation comprises about 40 mg of a second filler. In some embodiments, the pharmaceutical formulation comprises about 45 mg of a second filler. In some embodiments, the pharmaceutical formulation comprises about 50 mg of a second filler. In some embodiments, the pharmaceutical formulation comprises about 55 mg of a second filler. In some embodiments, the pharmaceutical formulation comprises about 60 mg of a second filler. In some embodiments, the pharmaceutical formulation comprises about 65 mg of a second filler. In some embodiments, the pharmaceutical formulation comprises about 70 mg of a second filler. In some embodiments, the pharmaceutical formulation comprises about 75 mg of a second filler. In some embodiments, the pharmaceutical formulation comprises about 80 mg of a second filler. In some embodiments, the pharmaceutical formulation comprises about 85 mg of a second filler. In some embodiments, the pharmaceutical formulation comprises about 90 mg of a second filler. In some embodiments, the pharmaceutical formulation comprises about 95 mg of a second filler. In some embodiments, the pharmaceutical formulation comprises about 100 mg of a second filler. In some embodiments, the pharmaceutical formulation comprises about 105 mg of a second filler. In some embodiments, the pharmaceutical formulation comprises about 110 mg of a second filler. In some embodiments, the pharmaceutical formulation comprises about 115 mg of a second filler. In some embodiments, the pharmaceutical formulation comprises about 120 mg of a second filler. In some embodiments, the pharmaceutical formulation comprises about 125 mg of a second filler. In some embodiments, the pharmaceutical formulation comprises about equal amounts of the first filler and the second filler. In some embodiments, the pharmaceutical formulation comprises more of the first filler than the second filler. In some embodiments, the pharmaceutical formulation comprises less of the first filler than the second filler.

In some embodiments, the surfactant is selected from polysorbates, poloxamers, bile salts, glyceryl monostearate, sodium lauryl sulfate, sorbitan monooleate, polyoxyethylene sorbitan monooleate, copolymers of ethylene oxide and propylene oxide, and d-α-tocopheryl polyethylene glycol succinate (Vitamin E TPGS). In some embodiments, the surfactant is a polysorbate. In some embodiments, the surfactant is a Polysorbate 80 (Tween 80). In some embodiments, the surfactant is a poloxamer. In some embodiments, the surfactant is poloxamer 407. In some embodiments, the surfactant is a bile salt. In some embodiments, the surfactant is glyceryl monostearate. In some embodiments, the surfactant is sodium lauryl sulfate. In some embodiments, the surfactant is sorbitan monooleate. In some embodiments, the surfactant is polyoxyethylene sorbitan monooleate. In some embodiments, the surfactant is a copolymer of ethylene oxide. In some embodiments, the surfactant is a copolymer of propylene oxide. In some embodiments, the surfactant is d-α-tocopheryl polyethylene glycol succinate (Vitamin E TPGS). In some embodiments, the pharmaceutical formulation comprises about 0.2 mg to about 15 mg of the surfactant. In some embodiments, the pharmaceutical formulation comprises about 0.5 mg to about 12 mg of the surfactant. In some embodiments, the pharmaceutical formulation comprises about 1 mg to about 10 mg of the surfactant. In some embodiments, the pharmaceutical formulation comprises about 1 mg to about 5 mg of the surfactant. In some embodiments, the pharmaceutical formulation comprises about 1 mg to about 4.5 mg of the surfactant. In some embodiments, the pharmaceutical formulation comprises about 1 mg to about 4 mg of the surfactant. In some embodiments, the pharmaceutical formulation comprises about 1 mg to about 3.5 mg of the surfactant. In some embodiments, the pharmaceutical formulation comprises about 1.5 mg to about 3.5 mg of the surfactant. In some embodiments, the pharmaceutical formulation comprises about 1.5 mg to about 3 mg of the surfactant. In some embodiments, the pharmaceutical formulation comprises about 2 mg to about 3 mg of the surfactant. In some embodiments, the pharmaceutical formulation comprises about 5 mg to about 10 mg of the surfactant. In some embodiments, the pharmaceutical formulation comprises about 5 mg to about 9.5 mg of the surfactant. In some embodiments, the pharmaceutical formulation comprises about 5.5 mg to about 9.5 mg of the surfactant. In some embodiments, the pharmaceutical formulation comprises about 5.5 mg to about 9 mg of the surfactant. In some embodiments, the pharmaceutical formulation comprises about 6 mg to about 9 mg of the surfactant. In some embodiments, the pharmaceutical formulation comprises about 6 mg to about 8.5 mg of the surfactant. In some embodiments, the pharmaceutical formulation comprises about 6.5 mg to about 8.5 mg of the surfactant. In some embodiments, the pharmaceutical formulation comprises about 6.5 mg to about 8 mg of the surfactant. In some embodiments, the pharmaceutical formulation comprises about 7 mg to about 8 mg of the surfactant. In some embodiments, the pharmaceutical formulation comprises about 0.5 mg of the surfactant. In some embodiments, the pharmaceutical formulation comprises about 1 mg of the surfactant. In some embodiments, the pharmaceutical formulation comprises about 1.5 mg of the surfactant. In some embodiments, the pharmaceutical formulation comprises about 2 mg of the surfactant. In some embodiments, the pharmaceutical formulation comprises about 2.5 mg of the surfactant. In some embodiments, the pharmaceutical formulation comprises about 3 mg of the surfactant. In some embodiments, the pharmaceutical formulation comprises about 3.5 mg of the surfactant. In some embodiments, the pharmaceutical formulation comprises about 4 mg of the surfactant. In some embodiments, the pharmaceutical formulation comprises about 4.5 mg of the surfactant. In some embodiments, the pharmaceutical formulation comprises about 5 mg of the surfactant. In some embodiments, the pharmaceutical formulation comprises about 5.5 mg of the surfactant. In some embodiments, the pharmaceutical formulation comprises about 6 mg of the surfactant. In some embodiments, the pharmaceutical formulation comprises about 6.5 mg of the surfactant. In some embodiments, the pharmaceutical formulation comprises about 7 mg of the surfactant. In some embodiments, the pharmaceutical formulation comprises about 7.5 mg of the surfactant. In some embodiments, the pharmaceutical formulation comprises about 8 mg of the surfactant. In some embodiments, the pharmaceutical formulation comprises about 8.5 mg of the surfactant. In some embodiments, the pharmaceutical formulation comprises about 9 mg of the surfactant. In some embodiments, the pharmaceutical formulation comprises about 9.5 mg of the surfactant. In some embodiments, the pharmaceutical formulation comprises about 10 mg of the surfactant.

In some embodiments, the pharmaceutical formulation further comprises a disintegrant. In some embodiments, the disintegrant is selected from povidone, crospovidone, hypromellose, croscarmellose sodium, hydroxypropyl cellulose, and polyvinyl alcohol. In some embodiments, the disintegrant is selected from povidone, crospovidone, hypromellose, croscarmellose sodium, hydroxypropyl cellulose, and polyvinyl alcohol. In some embodiments, the disintegrant is polyvinyl alcohol. In some embodiments, the disintegrant is hydroxypropyl cellulose. In some embodiments, the disintegrant is hypromellose. In some embodiments, the disintegrant is povidone. In some embodiments, the disintegrant is crospovidone. In some embodiments, the disintegrant is croscarmellose sodium. In some embodiments, the pharmaceutical formulation comprises about 0.2 mg to about 15 mg of the disintegrant. In some embodiments, the pharmaceutical formulation comprises about 0.5 mg to about 12 mg of the disintegrant. In some embodiments, the pharmaceutical formulation comprises about 1 mg to about 10 mg of the disintegrant. In some embodiments, the pharmaceutical formulation comprises about 1 mg to about 5 mg of the disintegrant. In some embodiments, the pharmaceutical formulation comprises about 1 mg to about 4.5 mg of the disintegrant. In some embodiments, the pharmaceutical formulation comprises about 1 mg to about 4 mg of the disintegrant. In some embodiments, the pharmaceutical formulation comprises about 1 mg to about 3.5 mg of the disintegrant. In some embodiments, the pharmaceutical formulation comprises about 1.5 mg to about 3.5 mg of the disintegrant. In some embodiments, the pharmaceutical formulation comprises about 1.5 mg to about 3 mg of the disintegrant. In some embodiments, the pharmaceutical formulation comprises about 2 mg to about 3 mg of the disintegrant. In some embodiments, the pharmaceutical formulation comprises about 5 mg to about 10 mg of the disintegrant. In some embodiments, the pharmaceutical formulation comprises about 5 mg to about 9.5 mg of the disintegrant. In some embodiments, the pharmaceutical formulation comprises about 5.5 mg to about 9.5 mg of the disintegrant. In some embodiments, the pharmaceutical formulation comprises about 5.5 mg to about 9 mg of the disintegrant. In some embodiments, the pharmaceutical formulation comprises about 6 mg to about 9 mg of the disintegrant. In some embodiments, the pharmaceutical formulation comprises about 6 mg to about 8.5 mg of the disintegrant. In some embodiments, the pharmaceutical formulation comprises about 6.5 mg to about 8.5 mg of the disintegrant. In some embodiments, the pharmaceutical formulation comprises about 6.5 mg to about 8 mg of the disintegrant. In some embodiments, the pharmaceutical formulation comprises about 7 mg to about 8 mg of the disintegrant. In some embodiments, the pharmaceutical formulation comprises about 0.5 mg of the disintegrant. In some embodiments, the pharmaceutical formulation comprises about 1 mg of the disintegrant. In some embodiments, the pharmaceutical formulation comprises about 1.5 mg of the disintegrant. In some embodiments, the pharmaceutical formulation comprises about 2 mg of the disintegrant. In some embodiments, the pharmaceutical formulation comprises about 2.5 mg of the disintegrant. In some embodiments, the pharmaceutical formulation comprises about 3 mg of the disintegrant. In some embodiments, the pharmaceutical formulation comprises about 3.5 mg of the disintegrant. In some embodiments, the pharmaceutical formulation comprises about 4 mg of the disintegrant. In some embodiments, the pharmaceutical formulation comprises about 4.5 mg of the disintegrant. In some embodiments, the pharmaceutical formulation comprises about 5 mg of the disintegrant. In some embodiments, the pharmaceutical formulation comprises about 5.5 mg of the disintegrant. In some embodiments, the pharmaceutical formulation comprises about 6 mg of the disintegrant. In some embodiments, the pharmaceutical formulation comprises about 6.5 mg of the disintegrant. In some embodiments, the pharmaceutical formulation comprises about 7 mg of the disintegrant. In some embodiments, the pharmaceutical formulation comprises about 7.5 mg of the disintegrant. In some embodiments, the pharmaceutical formulation comprises about 8 mg of the disintegrant. In some embodiments, the pharmaceutical formulation comprises about 8.5 mg of the disintegrant. In some embodiments, the pharmaceutical formulation comprises about 9 mg of the disintegrant. In some embodiments, the pharmaceutical formulation comprises about 9.5 mg of the disintegrant. In some embodiments, the pharmaceutical formulation comprises about 10 mg of the disintegrant.

In some embodiments, the glidant is silicon dioxide or talc. In some embodiments, the glidant is talc. In some embodiments, the glidant is silicon dioxide. In some embodiments, the pharmaceutical formulation comprises about 0.05 mg to about 10 mg of the glidant. In some embodiments, the pharmaceutical formulation comprises about 0.1 mg to about 10 mg of the glidant. In some embodiments, the pharmaceutical formulation comprises about 0.1 mg to about 5 mg of the glidant. In some embodiments, the pharmaceutical formulation comprises about 0.1 mg to about 4 mg of the glidant. In some embodiments, the pharmaceutical formulation comprises about 0.1 mg to about 3 mg of the glidant. In some embodiments, the pharmaceutical formulation comprises about 0.1 mg to about 2 mg of the glidant. In some embodiments, the pharmaceutical formulation comprises about 0.1 mg to about 1 mg of the glidant. In some embodiments, the pharmaceutical formulation comprises about 0.5 mg to about 5 mg of the glidant. In some embodiments, the pharmaceutical formulation comprises about 0.5 mg to about 4 mg of the glidant. In some embodiments, the pharmaceutical formulation comprises about 0.5 mg to about 3 mg of the glidant. In some embodiments, the pharmaceutical formulation comprises about 1 mg to about 3 mg of the glidant. In some embodiments, the pharmaceutical formulation comprises about 1 mg to about 2 mg of the glidant. In some embodiments, the pharmaceutical formulation comprises about 0.1 mg of the glidant. In some embodiments, the pharmaceutical formulation comprises about 0.2 mg of the glidant. In some embodiments, the pharmaceutical formulation comprises about 0.3 mg of the glidant. In some embodiments, the pharmaceutical formulation comprises about 0.4 mg of the glidant. In some embodiments, the pharmaceutical formulation comprises about 0.5 mg of the glidant. In some embodiments, the pharmaceutical formulation comprises about 0.6 mg of the glidant. In some embodiments, the pharmaceutical formulation comprises about 0.7 mg of the glidant. In some embodiments, the pharmaceutical formulation comprises about 0.8 mg of the glidant. In some embodiments, the pharmaceutical formulation comprises about 0.9 mg of the glidant. In some embodiments, the pharmaceutical formulation comprises about 1 mg of the glidant. In some embodiments, the pharmaceutical formulation comprises about 1.1 mg of the glidant. In some embodiments, the pharmaceutical formulation comprises about 1.2 mg of the glidant. In some embodiments, the pharmaceutical formulation comprises about 1.3 mg of the glidant. In some embodiments, the pharmaceutical formulation comprises about 1.4 mg of the glidant. In some embodiments, the pharmaceutical formulation comprises about 1.5 mg of the glidant. In some embodiments, the pharmaceutical formulation comprises about 1.6 mg of the glidant. In some embodiments, the pharmaceutical formulation comprises about 1.7 mg of the glidant. In some embodiments, the pharmaceutical formulation comprises about 1.8 mg of the glidant. In some embodiments, the pharmaceutical formulation comprises about 1.9 mg of the glidant. In some embodiments, the pharmaceutical formulation comprises about 2 mg of the glidant. In some embodiments, the pharmaceutical formulation comprises about 2.5 mg of the glidant. In some embodiments, the pharmaceutical formulation comprises about 3 mg of the glidant. In some embodiments, the pharmaceutical formulation comprises about 3.5 mg of the glidant. In some embodiments, the pharmaceutical formulation comprises about 4 mg of the glidant. In some embodiments, the pharmaceutical formulation comprises about 4.5 mg of the glidant. In some embodiments, the pharmaceutical formulation comprises about 5 mg of the glidant. In some embodiments, the pharmaceutical formulation comprises about 6 mg of the glidant. In some embodiments, the pharmaceutical formulation comprises about 7 mg of the glidant. In some embodiments, the pharmaceutical formulation comprises about 8 mg of the glidant. In some embodiments, the pharmaceutical formulation comprises about 9 mg of the glidant. In some embodiments, the pharmaceutical formulation comprises about 10 mg of the glidant.

In some embodiments, the pharmaceutical formulation further comprises a lubricant. In some embodiments, the lubricant is selected from magnesium stearate, stearic acid, and sodium stearyl fumarate. In some embodiments, the lubricant is magnesium stearate. In some embodiments, the lubricant is stearic acid. In some embodiments, the lubricant is sodium stearyl fumarate. In some embodiments, the pharmaceutical formulation comprises about 0.05 mg to about 10 mg of the lubricant. In some embodiments, the pharmaceutical formulation comprises about 0.1 mg to about 10 mg of the lubricant. In some embodiments, the pharmaceutical formulation comprises about 0.1 mg to about 5 mg of the lubricant. In some embodiments, the pharmaceutical formulation comprises about 0.1 mg to about 4 mg of the lubricant. In some embodiments, the pharmaceutical formulation comprises about 0.1 mg to about 3 mg of the lubricant. In some embodiments, the pharmaceutical formulation comprises about 0.1 mg to about 2 mg of the lubricant. In some embodiments, the pharmaceutical formulation comprises about 0.1 mg to about 1 mg of the lubricant. In some embodiments, the pharmaceutical formulation comprises about 0.5 mg to about 5 mg of the lubricant. In some embodiments, the pharmaceutical formulation comprises about 0.5 mg to about 4 mg of the lubricant. In some embodiments, the pharmaceutical formulation comprises about 0.5 mg to about 3 mg of the lubricant. In some embodiments, the pharmaceutical formulation comprises about 1 mg to about 3 mg of the lubricant. In some embodiments, the pharmaceutical formulation comprises about 1 mg to about 2 mg of the lubricant. In some embodiments, the pharmaceutical formulation comprises about 0.1 mg of the lubricant. In some embodiments, the pharmaceutical formulation comprises about 0.2 mg of the lubricant. In some embodiments, the pharmaceutical formulation comprises about 0.3 mg of the lubricant. In some embodiments, the pharmaceutical formulation comprises about 0.4 mg of the lubricant. In some embodiments, the pharmaceutical formulation comprises about 0.5 mg of the lubricant. In some embodiments, the pharmaceutical formulation comprises about 0.6 mg of the lubricant. In some embodiments, the pharmaceutical formulation comprises about 0.7 mg of the lubricant. In some embodiments, the pharmaceutical formulation comprises about 0.8 mg of the lubricant. In some embodiments, the pharmaceutical formulation comprises about 0.9 mg of the lubricant. In some embodiments, the pharmaceutical formulation comprises about 1 mg of the lubricant. In some embodiments, the pharmaceutical formulation comprises about 1.1 mg of the lubricant. In some embodiments, the pharmaceutical formulation comprises about 1.2 mg of the lubricant. In some embodiments, the pharmaceutical formulation comprises about 1.3 mg of the lubricant. In some embodiments, the pharmaceutical formulation comprises about 1.4 mg of the lubricant. In some embodiments, the pharmaceutical formulation comprises about 1.5 mg of the lubricant. In some embodiments, the pharmaceutical formulation comprises about 1.6 mg of the lubricant. In some embodiments, the pharmaceutical formulation comprises about 1.7 mg of the lubricant. In some embodiments, the pharmaceutical formulation comprises about 1.8 mg of the lubricant. In some embodiments, the pharmaceutical formulation comprises about 1.9 mg of the lubricant. In some embodiments, the pharmaceutical formulation comprises about 2 mg of the lubricant. In some embodiments, the pharmaceutical formulation comprises about 2.5 mg of the lubricant. In some embodiments, the pharmaceutical formulation comprises about 3 mg of the lubricant. In some embodiments, the pharmaceutical formulation comprises about 3.5 mg of the lubricant. In some embodiments, the pharmaceutical formulation comprises about 4 mg of the lubricant. In some embodiments, the pharmaceutical formulation comprises about 4.5 mg of the lubricant. In some embodiments, the pharmaceutical formulation comprises about 5 mg of the lubricant. In some embodiments, the pharmaceutical formulation comprises about 6 mg of the lubricant. In some embodiments, the pharmaceutical formulation comprises about 7 mg of the lubricant. In some embodiments, the pharmaceutical formulation comprises about 8 mg of the lubricant. In some embodiments, the pharmaceutical formulation comprises about 9 mg of the lubricant. In some embodiments, the pharmaceutical formulation comprises about 10 mg of the lubricant.

In some embodiments, the 1-(4-(benzylamino)-5,6,7,8-tetrahydropyrido[2,3-d]pyrimidin-2-yl)-2-methyl-1H-indole-4-carboxamide is in a pharmaceutically acceptable salt form. In some embodiments, the 1-(4-(benzylamino)-5,6,7,8-tetrahydropyrido[2,3-d]pyrimidin-2-yl)-2-methyl-1H-indole-4-carboxamide is the 1-(4-(benzylamino)-5,6,7,8-tetrahydropyrido[2,3-d]pyrimidin-2-yl)-2-methyl-1H-indole-4-carboxamide p-toluenesulfonic acid salt (tosylate). In some embodiments, the pharmaceutical formulation comprises about 1 mg to about 150 mg of 1-(4-(benzylamino)-5,6,7,8-tetrahydropyrido[2,3-d]pyrimidin-2-yl)-2-methyl-1H-indole-4-carboxamide tosylate. In some embodiments, the pharmaceutical formulation comprises about 1 mg to about 130 mg of 1-(4-(benzylamino)-5,6,7,8-tetrahydropyrido[2,3-d]pyrimidin-2-yl)-2-methyl-1H-indole-4-carboxamide tosylate. In some embodiments, the pharmaceutical formulation comprises about 5 mg to about 130 mg of 1-(4-(benzylamino)-5,6,7,8-tetrahydropyrido[2,3-d]pyrimidin-2-yl)-2-methyl-1H-indole-4-carboxamide tosylate. In some embodiments, the pharmaceutical formulation comprises about 5 mg to about 120 mg of 1-(4-(benzylamino)-5,6,7,8-tetrahydropyrido[2,3-d]pyrimidin-2-yl)-2-methyl-1H-indole-4-carboxamide tosylate. In some embodiments, the pharmaceutical formulation comprises about 10 mg to about 120 mg of 1-(4-(benzylamino)-5,6,7,8-tetrahydropyrido[2,3-d]pyrimidin-2-yl)-2-methyl-1H-indole-4-carboxamide tosylate. In some embodiments, the pharmaceutical formulation comprises about 50 mg to about 120 mg of 1-(4-(benzylamino)-5,6,7,8-tetrahydropyrido[2,3-d]pyrimidin-2-yl)-2-methyl-1H-indole-4-carboxamide tosylate. In some embodiments, the pharmaceutical formulation comprises about 60 mg to about 120 mg of 1-(4-(benzylamino)-5,6,7,8-tetrahydropyrido[2,3-d]pyrimidin-2-yl)-2-methyl-1H-indole carboxamide tosylate. In some embodiments, the pharmaceutical formulation comprises about 60 mg to about 110 mg of 1-(4-(benzylamino)-5,6,7,8-tetrahydropyrido[2,3-d]pyrimidin-2-yl)-2-methyl-1H-indole-4-carboxamide tosylate. In some embodiments, the pharmaceutical formulation comprises about 70 mg to about 110 mg of 1-(4-(benzylamino)-5,6,7,8-tetrahydropyrido[2,3-d]pyrimidin-2-yl)-2-methyl-1H-indole-4-carboxamide tosylate. In some embodiments, the pharmaceutical formulation comprises about 70 mg to about 100 mg of 1-(4-(benzylamino)-5,6,7,8-tetrahydropyrido[2,3-d]pyrimidin-2-yl)-2-methyl-1H-indole carboxamide tosylate. In some embodiments, the pharmaceutical formulation comprises about 10 mg to about 50 mg of 1-(4-(benzylamino)-5,6,7,8-tetrahydropyrido[2,3-d]pyrimidin-2-yl)-2-methyl-1H-indole-4-carboxamide tosylate. In some embodiments, the pharmaceutical formulation comprises about 15 mg to about 50 mg of 1-(4-(benzylamino)-5,6,7,8-tetrahydropyrido[2,3-d]pyrimidin-2-yl)-2-methyl-1H-indole-4-carboxamide tosylate. In some embodiments, the pharmaceutical formulation comprises about 15 mg to about 45 mg of 1-(4-(benzylamino)-5,6,7,8-tetrahydropyrido[2,3-d]pyrimidin-2-yl)-2-methyl-1H-indole-4-carboxamide tosylate. In some embodiments, the pharmaceutical formulation comprises about 20 mg to about 45 mg of 1-(4-(benzylamino)-5,6,7,8-tetrahydropyrido[2,3-d]pyrimidin-2-yl)-2-methyl-1H-indole-4-carboxamide tosylate. In some embodiments, the pharmaceutical formulation comprises about 20 mg to about 35 mg of 1-(4-(benzylamino)-5,6,7,8-tetrahydropyrido[2,3-d]pyrimidin-2-yl)-2-methyl-1H-indole-4-carboxamide tosylate. In some embodiments, the pharmaceutical formulation comprises about 25 mg to about 35 mg of 1-(4-(benzylamino)-5,6,7,8-tetrahydropyrido[2,3-d]pyrimidin-2-yl)-2-methyl-1H-indole-4-carboxamide tosylate. In some embodiments, the pharmaceutical formulation comprises about 10 mg of 1-(4-(benzylamino)-5,6,7,8-tetrahydropyrido[2,3-d]pyrimidin-2-yl)-2-methyl-1H-indole-4-carboxamide tosylate. In some embodiments, the pharmaceutical formulation comprises about 15 mg of 1-(4-(benzylamino)-5,6,7,8-tetrahydropyrido[2,3-d]pyrimidin-2-yl)-2-methyl-1H-indole-4-carboxamide tosylate. In some embodiments, the pharmaceutical formulation comprises about 20 mg of 1-(4-(benzylamino)-5,6,7,8-tetrahydropyrido[2,3-d]pyrimidin-2-yl)-2-methyl-1H-indole-4-carboxamide tosylate. In some embodiments, the pharmaceutical formulation comprises about 25 mg of 1-(4-(benzylamino)-5,6,7,8-tetrahydropyrido[2,3-d]pyrimidin-2-yl)-2-methyl-1H-indole-4-carboxamide tosylate. In some embodiments, the pharmaceutical formulation comprises about 30 mg of 1-(4-(benzylamino)-5,6,7,8-tetrahydropyrido[2,3-d]pyrimidin-2-yl)-2-methyl-1H-indole-4-carboxamide tosylate. In some embodiments, the pharmaceutical formulation comprises about 35 mg of 1-(4-(benzylamino)-5,6,7,8-tetrahydropyrido[2,3-d]pyrimidin-2-yl)-2-methyl-1H-indole carboxamide tosylate. In some embodiments, the pharmaceutical formulation comprises about 40 mg of 1-(4-(benzylamino)-5,6,7,8-tetrahydropyrido[2,3-d]pyrimidin-2-yl)-2-methyl-1H-indole-4-carboxamide tosylate. In some embodiments, the pharmaceutical formulation comprises about 45 mg of 1-(4-(benzylamino)-5,6,7,8-tetrahydropyrido[2,3-d]pyrimidin-2-yl)-2-methyl-1H-indole-4-carboxamide tosylate. In some embodiments, the pharmaceutical formulation comprises about 50 mg of 1-(4-(benzylamino)-5,6,7,8-tetrahydropyrido[2,3-d]pyrimidin-2-yl)-2-methyl-1H-indole-4-carboxamide tosylate. In some embodiments, the pharmaceutical formulation comprises about 55 mg of 1-(4-(benzylamino)-5,6,7,8-tetrahydropyrido[2,3-d]pyrimidin-2-yl)-2-methyl-1H-indole-4-carboxamide tosylate. In some embodiments, the pharmaceutical formulation comprises about 60 mg of 1-(4-(benzylamino)-5,6,7,8-tetrahydropyrido[2,3-d]pyrimidin-2-yl)-2-methyl-1H-indole-4-carboxamide tosylate. In some embodiments, the pharmaceutical formulation comprises about 65 mg of 1-(4-(benzylamino)-5,6,7,8-tetrahydropyrido[2,3-d]pyrimidin-2-yl)-2-methyl-1H-indole-4-carboxamide tosylate. In some embodiments, the pharmaceutical formulation comprises about 70 mg of 1-(4-(benzylamino)-5,6,7,8-tetrahydropyrido[2,3-d]pyrimidin-2-yl)-2-methyl-1H-indole-4-carboxamide tosylate. In some embodiments, the pharmaceutical formulation comprises about 75 mg of 1-(4-(benzylamino)-5,6,7,8-tetrahydropyrido[2,3-d]pyrimidin-2-yl)-2-methyl-1H-indole-4-carboxamide tosylate. In some embodiments, the pharmaceutical formulation comprises about 80 mg of 1-(4-(benzylamino)-5,6,7,8-tetrahydropyrido[2,3-d]pyrimidin-2-yl)-2-methyl-1H-indole-4-carboxamide tosylate. In some embodiments, the pharmaceutical formulation comprises about 85 mg of 1-(4-(benzylamino)-5,6,7,8-tetrahydropyrido[2,3-d]pyrimidin-2-yl)-2-methyl-1H-indole-4-carboxamide tosylate. In some embodiments, the pharmaceutical formulation comprises about 90 mg of 1-(4-(benzylamino)-5,6,7,8-tetrahydropyrido[2,3-d]pyrimidin-2-yl)-2-methyl-1H-indole-4-carboxamide tosylate. In some embodiments, the pharmaceutical formulation comprises about 95 mg of 1-(4-(benzylamino)-5,6,7,8-tetrahydropyrido[2,3-d]pyrimidin-2-yl)-2-methyl-1H-indole-4-carboxamide tosylate. In some embodiments, the pharmaceutical formulation comprises about 100 mg of 1-(4-(benzylamino)-5,6,7,8-tetrahydropyrido[2,3-d]pyrimidin-2-yl)-2-methyl-1H-indole-4-carboxamide tosylate.

In some embodiments, the 1-(4-(benzylamino)-5,6,7,8-tetrahydropyrido[2,3-d]pyrimidin-2-yl)-2-methyl-1H-indole-4-carboxamide is the 1-(4-(benzylamino)-5,6,7,8-tetrahydropyrido[2,3-d]pyrimidin-2-yl)-2-methyl-1H-indole-4-carboxamide sulfuric acid salt (sulfate). In some embodiments, the pharmaceutical formulation comprises about 1 mg to about 150 mg of 1-(4-(benzylamino)-5,6,7,8-tetrahydropyrido[2,3-d]pyrimidin-2-yl)-2-methyl-1H-indole-4-carboxamide sulfate. In some embodiments, the pharmaceutical formulation comprises about 1 mg to about 130 mg of 1-(4-(benzylamino)-5,6,7,8-tetrahydropyrido[2,3-d]pyrimidin yl)-2-methyl-1H-indole-4-carboxamide sulfate. In some embodiments, the pharmaceutical formulation comprises about 5 mg to about 130 mg of 1-(4-(benzylamino)-5,6,7,8-tetrahydropyrido[2,3-d]pyrimidin-2-yl)-2-methyl-1H-indole-4-carboxamide sulfate. In some embodiments, the pharmaceutical formulation comprises about 5 mg to about 120 mg of 1-(4-(benzylamino)-5,6,7,8-tetrahydropyrido[2,3-d]pyrimidin-2-yl)-2-methyl-1H-indole carboxamide sulfate. In some embodiments, the pharmaceutical formulation comprises about 10 mg to about 120 mg of 1-(4-(benzylamino)-5,6,7,8-tetrahydropyrido[2,3-d]pyrimidin-2-yl)-2-methyl-1H-indole-4-carboxamide sulfate. In some embodiments, the pharmaceutical formulation comprises about 50 mg to about 120 mg of 1-(4-(benzylamino)-5,6,7,8-tetrahydropyrido[2,3-d]pyrimidin-2-yl)-2-methyl-1H-indole-4-carboxamide sulfate. In some embodiments, the pharmaceutical formulation comprises about 60 mg to about 120 mg of 1-(4-(benzylamino)-5,6,7,8-tetrahydropyrido[2,3-d]pyrimidin-2-yl)-2-methyl-1H-indole-4-carboxamide sulfate. In some embodiments, the pharmaceutical formulation comprises about 60 mg to about 110 mg of 1-(4-(benzylamino)-5,6,7,8-tetrahydropyrido[2,3-d]pyrimidin-2-yl)-2-methyl-1H-indole-4-carboxamide sulfate. In some embodiments, the pharmaceutical formulation comprises about 70 mg to about 110 mg of 1-(4-(benzylamino)-5,6,7,8-tetrahydropyrido[2,3-d]pyrimidin-2-yl)-2-methyl-1H-indole-4-carboxamide sulfate. In some embodiments, the pharmaceutical formulation comprises about 70 mg to about 100 mg of 1-(4-(benzylamino)-5,6,7,8-tetrahydropyrido[2,3-d]pyrimidin-2-yl)-2-methyl-1H-indole-4-carboxamide sulfate. In some embodiments, the pharmaceutical formulation comprises about 10 mg to about 50 mg of 1-(4-(benzylamino)-5,6,7,8-tetrahydropyrido[2,3-d]pyrimidin-2-yl)-2-methyl-1H-indole-4-carboxamide sulfate. In some embodiments, the pharmaceutical formulation comprises about 15 mg to about 50 mg of 1-(4-(benzylamino)-5,6,7,8-tetrahydropyrido[2,3-d]pyrimidin-2-yl)-2-methyl-1H-indole-4-carboxamide sulfate. In some embodiments, the pharmaceutical formulation comprises about 15 mg to about 45 mg of 1-(4-(benzylamino)-5,6,7,8-tetrahydropyrido[2,3-d]pyrimidin-2-yl)-2-methyl-1H-indole-4-carboxamide sulfate. In some embodiments, the pharmaceutical formulation comprises about 20 mg to about 45 mg of 1-(4-(benzylamino)-5,6,7,8-tetrahydropyrido[2,3-d]pyrimidin-2-yl)-2-methyl-1H-indole-4-carboxamide sulfate. In some embodiments, the pharmaceutical formulation comprises about 20 mg to about 35 mg of 1-(4-(benzylamino)-5,6,7,8-tetrahydropyrido[2,3-d]pyrimidin-2-yl)-2-methyl-1H-indole-4-carboxamide sulfate. In some embodiments, the pharmaceutical formulation comprises about 25 mg to about 35 mg of 1-(4-(benzylamino)-5,6,7,8-tetrahydropyrido[2,3-d]pyrimidin-2-yl)-2-methyl-1H-indole carboxamide sulfate. In some embodiments, the pharmaceutical formulation comprises about 10 mg of 1-(4-(benzylamino)-5,6,7,8-tetrahydropyrido[2,3-d]pyrimidin-2-yl)-2-methyl-1H-indole carboxamide sulfate. In some embodiments, the pharmaceutical formulation comprises about 15 mg of 1-(4-(benzylamino)-5,6,7,8-tetrahydropyrido[2,3-d]pyrimidin-2-yl)-2-methyl-1H-indole carboxamide sulfate. In some embodiments, the pharmaceutical formulation comprises about 20 mg of 1-(4-(benzylamino)-5,6,7,8-tetrahydropyrido[2,3-d]pyrimidin-2-yl)-2-methyl-1H-indole carboxamide sulfate. In some embodiments, the pharmaceutical formulation comprises about 25 mg of 1-(4-(benzylamino)-5,6,7,8-tetrahydropyrido[2,3-d]pyrimidin-2-yl)-2-methyl-1H-indole-4-carboxamide sulfate. In some embodiments, the pharmaceutical formulation comprises about 30 mg of 1-(4-(benzylamino)-5,6,7,8-tetrahydropyrido[2,3-d]pyrimidin-2-yl)-2-methyl-1H-indole-4-carboxamide sulfate. In some embodiments, the pharmaceutical formulation comprises about 35 mg of 1-(4-(benzylamino)-5,6,7,8-tetrahydropyrido[2,3-d]pyrimidin-2-yl)-2-methyl-1H-indole-4-carboxamide sulfate. In some embodiments, the pharmaceutical formulation comprises about 40 mg of 1-(4-(benzylamino)-5,6,7,8-tetrahydropyrido[2,3-d]pyrimidin-2-yl)-2-methyl-1H-indole-4-carboxamide sulfate. In some embodiments, the pharmaceutical formulation comprises about 45 mg of 1-(4-(benzylamino)-5,6,7,8-tetrahydropyrido[2,3-d]pyrimidin-2-yl)-2-methyl-1H-indole-4-carboxamide sulfate. In some embodiments, the pharmaceutical formulation comprises about 50 mg of 1-(4-(benzylamino)-5,6,7,8-tetrahydropyrido[2,3-d]pyrimidin-2-yl)-2-methyl-1H-indole-4-carboxamide sulfate. In some embodiments, the pharmaceutical formulation comprises about 55 mg of 1-(4-(benzylamino)-5,6,7,8-tetrahydropyrido[2,3-d]pyrimidin-2-yl)-2-methyl-1H-indole-4-carboxamide sulfate. In some embodiments, the pharmaceutical formulation comprises about 60 mg of 1-(4-(benzylamino)-5,6,7,8-tetrahydropyrido[2,3-d]pyrimidin-2-yl)-2-methyl-1H-indole-4-carboxamide sulfate. In some embodiments, the pharmaceutical formulation comprises about 65 mg of 1-(4-(benzylamino)-5,6,7,8-tetrahydropyrido[2,3-d]pyrimidin-2-yl)-2-methyl-1H-indole-4-carboxamide sulfate. In some embodiments, the pharmaceutical formulation comprises about 70 mg of 1-(4-(benzylamino)-5,6,7,8-tetrahydropyrido[2,3-d]pyrimidin-2-yl)-2-methyl-1H-indole-4-carboxamide sulfate. In some embodiments, the pharmaceutical formulation comprises about 75 mg of 1-(4-(benzylamino)-5,6,7,8-tetrahydropyrido[2,3-d]pyrimidin-2-yl)-2-methyl-1H-indole-4-carboxamide sulfate. In some embodiments, the pharmaceutical formulation comprises about 80 mg of 1-(4-(benzylamino)-5,6,7,8-tetrahydropyrido[2,3-d]pyrimidin-2-yl)-2-methyl-1H-indole-4-carboxamide sulfate. In some embodiments, the pharmaceutical formulation comprises about 85 mg of 1-(4-(benzylamino)-5,6,7,8-tetrahydropyrido[2,3-d]pyrimidin-2-yl)-2-methyl-1H-indole-4-carboxamide sulfate. In some embodiments, the pharmaceutical formulation comprises about 90 mg of 1-(4-(benzylamino)-5,6,7,8-tetrahydropyrido[2,3-d]pyrimidin-2-yl)-2-methyl-1H-indole carboxamide sulfate. In some embodiments, the pharmaceutical formulation comprises about 95 mg of 1-(4-(benzylamino)-5,6,7,8-tetrahydropyrido[2,3-d]pyrimidin-2-yl)-2-methyl-1H-indole carboxamide sulfate. In some embodiments, the pharmaceutical formulation comprises about 100 mg of 1-(4-(benzylamino)-5,6,7,8-tetrahydropyrido[2,3-d]pyrimidin-2-yl)-2-methyl-1H-indole-4-carboxamide sulfate.

In some embodiments, the 1-(4-(benzylamino)-5,6,7,8-tetrahydropyrido[2,3-d]pyrimidin-2-yl)-2-methyl-1H-indole-4-carboxamide is in a pharmaceutically acceptable salt form. In some embodiments, the 1-(4-(benzylamino)-5,6,7,8-tetrahydropyrido[2,3-d]pyrimidin-2-yl)-2-methyl-1H-indole-4-carboxamide is the 1-(4-(benzylamino)-5,6,7,8-tetrahydropyrido[2,3-d]pyrimidin-2-yl)-2-methyl-1H-indole-4-carboxamide hydrochloride salt. In some embodiments, the pharmaceutical formulation comprises about 1 mg to about 150 mg of 1-(4-(benzylamino)-5,6,7,8-tetrahydropyrido[2,3-d]pyrimidin-2-yl)-2-methyl-1H-indole-4-carboxamide hydrochloride salt. In some embodiments, the pharmaceutical formulation comprises about 1 mg to about 130 mg of 1-(4-(benzylamino)-5,6,7,8-tetrahydropyrido[2,3-d]pyrimidin-2-yl)-2-methyl-1H-indole-4-carboxamide hydrochloride salt. In some embodiments, the pharmaceutical formulation comprises about 5 mg to about 130 mg of 1-(4-(benzylamino)-5,6,7,8-tetrahydropyrido[2,3-d]pyrimidin-2-yl)-2-methyl-1H-indole-4-carboxamide hydrochloride salt. In some embodiments, the pharmaceutical formulation comprises about 5 mg to about 120 mg of 1-(4-(benzylamino)-5,6,7,8-tetrahydropyrido[2,3-d]pyrimidin-2-yl)-2-methyl-1H-indole-4-carboxamide hydrochloride salt. In some embodiments, the pharmaceutical formulation comprises about 10 mg to about 120 mg of 1-(4-(benzylamino)-5,6,7,8-tetrahydropyrido[2,3-d]pyrimidin-2-yl)-2-methyl-1H-indole-4-carboxamide hydrochloride salt. In some embodiments, the pharmaceutical formulation comprises about 50 mg to about 120 mg of 1-(4-(benzylamino)-5,6,7,8-tetrahydropyrido[2,3-d]pyrimidin-2-yl)-2-methyl-1H-indole-4-carboxamide hydrochloride salt. In some embodiments, the pharmaceutical formulation comprises about 60 mg to about 120 mg of 1-(4-(benzylamino)-5,6,7,8-tetrahydropyrido[2,3-d]pyrimidin-2-yl)-2-methyl-1H-indole-4-carboxamide hydrochloride salt. In some embodiments, the pharmaceutical formulation comprises about 60 mg to about 110 mg of 1-(4-(benzylamino)-5,6,7,8-tetrahydropyrido[2,3-d]pyrimidin-2-yl)-2-methyl-1H-indole-4-carboxamide hydrochloride salt. In some embodiments, the pharmaceutical formulation comprises about 70 mg to about 110 mg of 1-(4-(benzylamino)-5,6,7,8-tetrahydropyrido[2,3-d]pyrimidin-2-yl)-2-methyl-1H-indole-4-carboxamide hydrochloride salt. In some embodiments, the pharmaceutical formulation comprises about 70 mg to about 100 mg of 1-(4-(benzylamino)-5,6,7,8-tetrahydropyrido[2,3-d]pyrimidin-2-yl)-2-methyl-1H-indole-4-carboxamide hydrochloride salt. In some embodiments, the pharmaceutical formulation comprises about 10 mg to about 50 mg of 1-(4-(benzylamino)-5,6,7,8-tetrahydropyrido[2,3-d]pyrimidin-2-yl)-2-methyl-1H-indole carboxamide hydrochloride salt. In some embodiments, the pharmaceutical formulation comprises about 15 mg to about 50 mg of 1-(4-(benzylamino)-5,6,7,8-tetrahydropyrido[2,3-d]pyrimidin-2-yl)-2-methyl-1H-indole-4-carboxamide hydrochloride salt. In some embodiments, the pharmaceutical formulation comprises about 15 mg to about 45 mg of 1-(4-(benzylamino)-5,6,7,8-tetrahydropyrido[2,3-d]pyrimidin-2-yl)-2-methyl-1H-indole-4-carboxamide hydrochloride salt. In some embodiments, the pharmaceutical formulation comprises about 20 mg to about 45 mg of 1-(4-(benzylamino)-5,6,7,8-tetrahydropyrido[2,3-d]pyrimidin-2-yl)-2-methyl-1H-indole-4-carboxamide hydrochloride salt. In some embodiments, the pharmaceutical formulation comprises about 20 mg to about 35 mg of 1-(4-(benzylamino)-5,6,7,8-tetrahydropyrido[2,3-d]pyrimidin-2-yl)-2-methyl-1H-indole-4-carboxamide hydrochloride salt. In some embodiments, the pharmaceutical formulation comprises about 25 mg to about 35 mg of 1-(4-(benzylamino)-5,6,7,8-tetrahydropyrido[2,3-d]pyrimidin-2-yl)-2-methyl-1H-indole-4-carboxamide hydrochloride salt. In some embodiments, the pharmaceutical formulation comprises about 10 mg of 1-(4-(benzylamino)-5,6,7,8-tetrahydropyrido[2,3-d]pyrimidin-2-yl)-2-methyl-1H-indole-4-carboxamide hydrochloride salt. In some embodiments, the pharmaceutical formulation comprises about 15 mg of 1-(4-(benzylamino)-5,6,7,8-tetrahydropyrido[2,3-d]pyrimidin-2-yl)-2-methyl-1H-indole-4-carboxamide hydrochloride salt. In some embodiments, the pharmaceutical formulation comprises about 20 mg of 1-(4-(benzylamino)-5,6,7,8-tetrahydropyrido[2,3-d]pyrimidin-2-yl)-2-methyl-1H-indole-4-carboxamide hydrochloride salt. In some embodiments, the pharmaceutical formulation comprises about 25 mg of 1-(4-(benzylamino)-5,6,7,8-tetrahydropyrido[2,3-d]pyrimidin-2-yl)-2-methyl-1H-indole-4-carboxamide hydrochloride salt. In some embodiments, the pharmaceutical formulation comprises about 30 mg of 1-(4-(benzylamino)-5,6,7,8-tetrahydropyrido[2,3-d]pyrimidin-2-yl)-2-methyl-1H-indole-4-carboxamide hydrochloride salt. In some embodiments, the pharmaceutical formulation comprises about 35 mg of 1-(4-(benzylamino)-5,6,7,8-tetrahydropyrido[2,3-d]pyrimidin-2-yl)-2-methyl-1H-indole-4-carboxamide hydrochloride salt. In some embodiments, the pharmaceutical formulation comprises about 40 mg of 1-(4-(benzylamino)-5,6,7,8-tetrahydropyrido[2,3-d]pyrimidin-2-yl)-2-methyl-1H-indole-4-carboxamide hydrochloride salt. In some embodiments, the pharmaceutical formulation comprises about 45 mg of 1-(4-(benzylamino)-5,6,7,8-tetrahydropyrido[2,3-d]pyrimidin-2-yl)-2-methyl-1H-indole-4-carboxamide hydrochloride salt. In some embodiments, the pharmaceutical formulation comprises about 50 mg of 1-(4-(benzylamino)-5,6,7,8-tetrahydropyrido[2,3-d]pyrimidin-2-yl)-2-methyl-1H-indole-4-carboxamide hydrochloride salt. In some embodiments, the pharmaceutical formulation comprises about 55 mg of 1-(4-(benzylamino)-5,6,7,8-tetrahydropyrido[2,3-d]pyrimidin-2-yl)-2-methyl-1H-indole-4-carboxamide hydrochloride salt. In some embodiments, the pharmaceutical formulation comprises about 60 mg of 1-(4-(benzylamino)-5,6,7,8-tetrahydropyrido[2,3-d]pyrimidin-2-yl)-2-methyl-1H-indole-4-carboxamide hydrochloride salt. In some embodiments, the pharmaceutical formulation comprises about 65 mg of 1-(4-(benzylamino)-5,6,7,8-tetrahydropyrido[2,3-d]pyrimidin-2-yl)-2-methyl-1H-indole carboxamide hydrochloride salt. In some embodiments, the pharmaceutical formulation comprises about 70 mg of 1-(4-(benzylamino)-5,6,7,8-tetrahydropyrido[2,3-d]pyrimidin-2-yl)-2-methyl-1H-indole-4-carboxamide hydrochloride salt. In some embodiments, the pharmaceutical formulation comprises about 75 mg of 1-(4-(benzylamino)-5,6,7,8-tetrahydropyrido[2,3-d]pyrimidin-2-yl)-2-methyl-1H-indole-4-carboxamide hydrochloride salt. In some embodiments, the pharmaceutical formulation comprises about 80 mg of 1-(4-(benzylamino)-5,6,7,8-tetrahydropyrido[2,3-d]pyrimidin-2-yl)-2-methyl-1H-indole-4-carboxamide hydrochloride salt. In some embodiments, the pharmaceutical formulation comprises about 85 mg of 1-(4-(benzylamino)-5,6,7,8-tetrahydropyrido[2,3-d]pyrimidin-2-yl)-2-methyl-1H-indole-4-carboxamide hydrochloride salt. In some embodiments, the pharmaceutical formulation comprises about 90 mg of 1-(4-(benzylamino)-5,6,7,8-tetrahydropyrido[2,3-d]pyrimidin-2-yl)-2-methyl-1H-indole-4-carboxamide hydrochloride salt. In some embodiments, the pharmaceutical formulation comprises about 95 mg of 1-(4-(benzylamino)-5,6,7,8-tetrahydropyrido[2,3-d]pyrimidin-2-yl)-2-methyl-1H-indole-4-carboxamide hydrochloride salt. In some embodiments, the pharmaceutical formulation comprises about 100 mg of 1-(4-(benzylamino)-5,6,7,8-tetrahydropyrido[2,3-d]pyrimidin-2-yl)-2-methyl-1H-indole-4-carboxamide hydrochloride salt.

In some embodiments, the 1-(4-(benzylamino)-5,6,7,8-tetrahydropyrido[2,3-d]pyrimidin-2-yl)-2-methyl-1H-indole-4-carboxamide is in the free base form. In some embodiments, the pharmaceutical formulation comprises about 1 mg to about 150 mg of 1-(4-(benzylamino)-5,6,7,8-tetrahydropyrido[2,3-d]pyrimidin-2-yl)-2-methyl-1H-indole-4-carboxamide free base. In some embodiments, the pharmaceutical formulation comprises about 1 mg to about 130 mg of 1-(4-(benzylamino)-5,6,7,8-tetrahydropyrido[2,3-d]pyrimidin-2-yl)-2-methyl-1H-indole-4-carboxamide free base. In some embodiments, the pharmaceutical formulation comprises about 5 mg to about 130 mg of 1-(4-(benzylamino)-5,6,7,8-tetrahydropyrido[2,3-d]pyrimidin-2-yl)-2-methyl-1H-indole-4-carboxamide free base. In some embodiments, the pharmaceutical formulation comprises about 5 mg to about 120 mg of 1-(4-(benzylamino)-5,6,7,8-tetrahydropyrido[2,3-d]pyrimidin-2-yl)-2-methyl-1H-indole carboxamide free base. In some embodiments, the pharmaceutical formulation comprises about 10 mg to about 120 mg of 1-(4-(benzylamino)-5,6,7,8-tetrahydropyrido[2,3-d]pyrimidin-2-yl)-2-methyl-1H-indole-4-carboxamide free base. In some embodiments, the pharmaceutical formulation comprises about 50 mg to about 120 mg of 1-(4-(benzylamino)-5,6,7,8-tetrahydropyrido[2,3-d]pyrimidin-2-yl)-2-methyl-1H-indole-4-carboxamide free base. In some embodiments, the pharmaceutical formulation comprises about 60 mg to about 120 mg of 1-(4-(benzylamino)-5,6,7,8-tetrahydropyrido[2,3-d]pyrimidin-2-yl)-2-methyl-1H-indole carboxamide free base. In some embodiments, the pharmaceutical formulation comprises about 60 mg to about 110 mg of 1-(4-(benzylamino)-5,6,7,8-tetrahydropyrido[2,3-d]pyrimidin-2-yl)-2-methyl-1H-indole-4-carboxamide free base. In some embodiments, the pharmaceutical formulation comprises about 70 mg to about 110 mg of 1-(4-(benzylamino)-5,6,7,8-tetrahydropyrido[2,3-d]pyrimidin-2-yl)-2-methyl-1H-indole-4-carboxamide free base. In some embodiments, the pharmaceutical formulation comprises about 70 mg to about 100 mg of 1-(4-(benzylamino)-5,6,7,8-tetrahydropyrido[2,3-d]pyrimidin-2-yl)-2-methyl-1H-indole-4-carboxamide free base. In some embodiments, the pharmaceutical formulation comprises about 10 mg to about 50 mg of 1-(4-(benzylamino)-5,6,7,8-tetrahydropyrido[2,3-d]pyrimidin-2-yl)-2-methyl-1H-indole-4-carboxamide free base. In some embodiments, the pharmaceutical formulation comprises about 15 mg to about 50 mg of 1-(4-(benzylamino)-5,6,7,8-tetrahydropyrido[2,3-d]pyrimidin-2-yl)-2-methyl-1H-indole-4-carboxamide free base. In some embodiments, the pharmaceutical formulation comprises about 15 mg to about 45 mg of 1-(4-(benzylamino)-5,6,7,8-tetrahydropyrido[2,3-d]pyrimidin-2-yl)-2-methyl-1H-indole-4-carboxamide free base. In some embodiments, the pharmaceutical formulation comprises about 20 mg to about 45 mg of 1-(4-(benzylamino)-5,6,7,8-tetrahydropyrido[2,3-d]pyrimidin-2-yl)-2-methyl-1H-indole-4-carboxamide free base. In some embodiments, the pharmaceutical formulation comprises about 20 mg to about 35 mg of 1-(4-(benzylamino)-5,6,7,8-tetrahydropyrido[2,3-d]pyrimidin-2-yl)-2-methyl-1H-indole-4-carboxamide free base. In some embodiments, the pharmaceutical formulation comprises about 25 mg to about 35 mg of 1-(4-(benzylamino)-5,6,7,8-tetrahydropyrido[2,3-d]pyrimidin-2-yl)-2-methyl-1H-indole-4-carboxamide free base. In some embodiments, the pharmaceutical formulation comprises about 10 mg of 1-(4-(benzylamino)-5,6,7,8-tetrahydropyrido[2,3-d]pyrimidin-2-yl)-2-methyl-1H-indole-4-carboxamide free base. In some embodiments, the pharmaceutical formulation comprises about 15 mg of 1-(4-(benzylamino)-5,6,7,8-tetrahydropyrido[2,3-d]pyrimidin-2-yl)-2-methyl-1H-indole-4-carboxamide free base. In some embodiments, the pharmaceutical formulation comprises about 20 mg of 1-(4-(benzylamino)-5,6,7,8-tetrahydropyrido[2,3-d]pyrimidin-2-yl)-2-methyl-1H-indole-4-carboxamide free base. In some embodiments, the pharmaceutical formulation comprises about 25 mg of 1-(4-(benzylamino)-5,6,7,8-tetrahydropyrido[2,3-d]pyrimidin-2-yl)-2-methyl-1H-indole-4-carboxamide free base. In some embodiments, the pharmaceutical formulation comprises about 30 mg of 1-(4-(benzylamino)-5,6,7,8-tetrahydropyrido[2,3-d]pyrimidin-2-yl)-2-methyl-1H-indole-4-carboxamide free base. In some embodiments, the pharmaceutical formulation comprises about 35 mg of 1-(4-(benzylamino)-5,6,7,8-tetrahydropyrido[2,3-d]pyrimidin-2-yl)-2-methyl-1H-indole carboxamide free base. In some embodiments, the pharmaceutical formulation comprises about 40 mg of 1-(4-(benzylamino)-5,6,7,8-tetrahydropyrido[2,3-d]pyrimidin-2-yl)-2-methyl-1H-indole-4-carboxamide free base. In some embodiments, the pharmaceutical formulation comprises about 45 mg of 1-(4-(benzylamino)-5,6,7,8-tetrahydropyrido[2,3-d]pyrimidin-2-yl)-2-methyl-1H-indole-4-carboxamide free base. In some embodiments, the pharmaceutical formulation comprises about 50 mg of 1-(4-(benzylamino)-5,6,7,8-tetrahydropyrido[2,3-d]pyrimidin-2-yl)-2-methyl-1H-indole-4-carboxamide free base. In some embodiments, the pharmaceutical formulation comprises about 55 mg of 1-(4-(benzylamino)-5,6,7,8-tetrahydropyrido[2,3-d]pyrimidin-2-yl)-2-methyl-1H-indole-4-carboxamide free base. In some embodiments, the pharmaceutical formulation comprises about 60 mg of 1-(4-(benzylamino)-5,6,7,8-tetrahydropyrido[2,3-d]pyrimidin-2-yl)-2-methyl-1H-indole-4-carboxamide free base. In some embodiments, the pharmaceutical formulation comprises about 65 mg of 1-(4-(benzylamino)-5,6,7,8-tetrahydropyrido[2,3-d]pyrimidin-2-yl)-2-methyl-1H-indole-4-carboxamide free base. In some embodiments, the pharmaceutical formulation comprises about 70 mg of 1-(4-(benzylamino)-5,6,7,8-tetrahydropyrido[2,3-d]pyrimidin-2-yl)-2-methyl-1H-indole-4-carboxamide free base. In some embodiments, the pharmaceutical formulation comprises about 75 mg of 1-(4-(benzylamino)-5,6,7,8-tetrahydropyrido[2,3-d]pyrimidin-2-yl)-2-methyl-1H-indole-4-carboxamide free base. In some embodiments, the pharmaceutical formulation comprises about 80 mg of 1-(4-(benzylamino)-5,6,7,8-tetrahydropyrido[2,3-d]pyrimidin-2-yl)-2-methyl-1H-indole-4-carboxamide free base. In some embodiments, the pharmaceutical formulation comprises about 85 mg of 1-(4-(benzylamino)-5,6,7,8-tetrahydropyrido[2,3-d]pyrimidin-2-yl)-2-methyl-1H-indole-4-carboxamide free base. In some embodiments, the pharmaceutical formulation comprises about 90 mg of 1-(4-(benzylamino)-5,6,7,8-tetrahydropyrido[2,3-d]pyrimidin-2-yl)-2-methyl-1H-indole-4-carboxamide free base. In some embodiments, the pharmaceutical formulation comprises about 95 mg of 1-(4-(benzylamino)-5,6,7,8-tetrahydropyrido[2,3-d]pyrimidin-2-yl)-2-methyl-1H-indole-4-carboxamide free base. In some embodiments, the pharmaceutical formulation comprises about 100 mg of 1-(4-(benzylamino)-5,6,7,8-tetrahydropyrido[2,3-d]pyrimidin-2-yl)-2-methyl-1H-indole-4-carboxamide free base.

Excipients

Suitable optional excipients for use in the 1-(4-(benzylamino)-5,6,7,8-tetrahydropyrido[2,3-d]pyrimidin-2-yl)-2-methyl-1H-indole-4-carboxamide pharmaceutical formulations described herein include any commonly used excipients in pharmaceutics and are selected on the basis of compatibility with the active pharmaceutical agent and the release profile properties of the desired dosage form. Excipients include, but are not limited to, binders, fillers, flow aids, disintegrants, lubricants, glidants, polymeric carriers, plasticizers, stabilizers, surfactants, and the like. A summary of excipients described herein, may be found, for example in *Remington: The Science and Practice of Pharmacy*, Nineteenth Ed (Easton, Pa.: Mack Publishing Company, 1995); Hoover, John E., *Remington's Pharmaceutical Sciences*, Mack Publishing Co., Easton, Pennsylvania 1975; Liberman, H. A. and Lachman, L., Eds., *Pharmaceutical Dosage Forms*, Marcel Decker, New York, N.Y., 1980; and *Pharmaceutical Dosage Forms and Drug Delivery Systems*, Seventh Ed. (Lippincott Williams & Wilkins, 1999), herein incorporated by reference in their entirety.

Fillers or diluents increase bulk in the pharmaceutical formulation. Such compounds include e.g., lactose; starch; mannitol; sorbitol; dextrose; microcrystalline cellulose such as Avicel®; silicified microcrystalline cellulose such as ProSolv® HD90; dibasic calcium phosphate; dicalcium phosphate dihydrate; tricalcium phosphate; calcium phosphate; anhydrous lactose; spray-dried lactose; pregelatinized starch; compressible sugar, such as Di-Pac® (Amstar); hydroxypropylmethylcellulose; sucrose-based diluents; confectioner's sugar; monobasic calcium sulfate monohydrate; calcium sulfate dihydrate; calcium lactate trihydrate; dextrates; hydrolyzed cereal solids; amylose; powdered cellulose; calcium carbonate; glycine; kaolin; sodium chloride; inositol; bentonite; and the like. In some embodiments, the pharmaceutical formulations described herein comprise two fillers. In some embodiments of the pharmaceutical formulations described herein, the first filler and second filler are selected from lactose, mannitol, dicalcium phosphate, microcrystalline cellulose, silicified microcrystalline cellulose, starch, and pregelatinized starch (Starch 1500). In some embodiments of the pharmaceutical formulations described herein, the first filler and second filler are independently selected from lactose, mannitol, microcrystalline cellulose, and silicified microcrystalline cellulose.

Binders impart cohesiveness to solid oral dosage form formulations: for powder filled capsule formulation, they aid in plug formation that can be filled into soft or hard shell capsules and for tablet formulation, they ensure the tablet remaining intact after compression and help assure blend uniformity prior to a compression or fill step. Materials suitable for use as binders in the solid dosage forms described herein include, but are not limited to, carboxymethylcellulose, methylcellulose (e.g., Methocel®), hydroxypropylmethylcellulose (e.g. Hypromellose USP Pharmacoat-603, hydroxypropylmethylcellulose acetate stearate (Aqoate HS-LF and HS), hydroxyethylcellulose, hydroxypropylcellulose (e.g., Klucel®), ethylcellulose (e.g., Ethocel®), microcrystalline cellulose (e.g., Avicel®), silicified microcrystalline cellulose such as ProSolv® HD90, microcrystalline dextrose, amylose, magnesium aluminum silicate, polysaccharide acids, bentonites, gelatin, polyvinyl pyrrolidone/vinyl acetate copolymer, crospovidone, povidone, starch, pregelatinized starch, tragacanth, dextrin, a sugar, such as sucrose (e.g., Dipac®), glucose, dextrose, molasses, mannitol, sorbitol, xylitol (e.g., Xylitab®), lactose, a natural or synthetic gum such as acacia, tragacanth, ghatti gum, mucilage of isapol husks, starch, polyvinyl pyrrolidone (e.g., Povidone® CL, Kollidon® CL, Polyplasdone® XL-10, and Povidone® K-12), larch arabogalactan, Veegum®, polyethylene glycol, waxes, sodium alginate, and the like. In some embodiments, the binder is hypromellose, hydroxypropyl cellulose, or ethyl cellulose.

Glidants improve the flow characteristics of a powder mixtures. Such compounds include, e.g., colloidal silicon dioxide such as Cab-o-Sil®; tribasic calcium phosphate, talc, corn starch, DL-leucine, sodium lauryl sulfate, magnesium stearate, calcium stearate, sodium stearate, kaolin, and micronized amorphous silicon dioxide (Syloid®) and the like. In some embodiments of the pharmaceutical formulations described herein, the glidant is colloidal silicon dioxide or talc. In some embodiments, the glidant is talc. In some embodiments, the glidant is colloidal silicon dioxide.

Lubricants are compounds which prevent, reduce, or inhibit adhesion or friction of materials. Exemplary lubricants include, e.g., stearic acid; calcium hydroxide, talc; paraffin; a hydrocarbon such as mineral oil, or hydrogenated vegetable oil such as hydrogenated soybean oil (Sterotex®), Lubritab®, Cutina®; higher fatty acids and their alkalimetal and alkaline earth metal salts, such as aluminum, calcium, magnesium, zinc, stearic acid, sodium stearate, calcium stearate, magnesium stearate, glycerol, talc, waxes, Stearowet®, boric acid, sodium acetate, leucine, a polyethylene glycol or a methoxypolyethylene glycol such as Carbowax™, sodium oleate, glyceryl behenate (Compitrol 888®), glyceryl palmitostearate (Precirol®), colloidal silica such as Syloid™, Carb-O-Sil®, a starch such as corn starch, silicone oil, a surfactant, and the like. Hydrophilic lubricants include, e.g., sodium stearyl fumarate (currently marketed under the trade name PRUV®), polyethylene glycol (PEG), magnesium lauryl sulfate, sodium lauryl sulfate (SLS), sodium benzoate, sodium chloride, and the like. In some embodiments of the pharmaceutical formulations described herein, the lubricant is magnesium stearate, stearic acid, or sodium stearyl fumarate. In some embodiments, the lubricant is stearic acid. In some embodiments, the lubricant is sodium stearyl fumarate. In some embodiments, the lubricant is magnesium stearate.

Disintegrants facilitate breakup or disintegration of the pharmaceutical formulation after administration. Examples of disintegrants include a starch, e.g., a natural starch such as corn starch or potato starch, a pregelatinized starch such as National 1551 or Amijel®, or sodium starch glycolate such as Promogel® or Explotab®; a cellulose such as a wood product, microcrystalline cellulose, e.g., Avicel®, Avicel® PH101, Avicel® PH102, Avicel® PH105, Elcema® P100, Emcocel®, Vivacel®, Ming Tia®, and Solka-Floc®, methylcellulose, croscarmellose, or a cross-linked cellulose, such as cross-linked sodium carboxymethylcellulose (Ac-Di-Sol®), cross-linked carboxymethylcellulose, or cross-linked croscarmellose; a cross-linked starch such as sodium starch glycolate; a cross-linked polymer such as crospovidone; a cross-linked polyvinyl pyrrolidone; alginate such as alginic acid or a salt of alginic acid such as sodium alginate; a clay such as Veegum® HV (magnesium aluminum silicate); a gum such as agar, guar, locust bean, Karaya, pectin, or tragacanth; sodium starch glycolate; bentonite; a natural sponge; a resin such as a cation-exchange resin; citrus pulp; sodium lauryl sulfate; sodium lauryl sulfate in combination starch; and the like. In some embodiments of the pharmaceutical formulations described herein, the disintegrant is selected from povidone, crospovidone, hypromellose, croscarmellose sodium, hydroxypropyl cellulose, and polyvinyl alcohol. In some embodiments, the disintegrant is croscarmellose sodium. In some embodiments, the disintegrant is polyvinyl alcohol. In some embodiments, the disintegrant is hydroxypropyl cellulose. In some embodiments, the disintegrant is hypromellose. In some embodiments, the disintegrant is povidone. In some embodiments, the disintegrant is crospovidone.

In some embodiments, the pharmaceutical formulations described herein include one or more pH-adjusting agents or buffering agents. In some embodiments, the pharmaceutical formulation comprises a buffer selected from acetates, carbonates, phosphates, citrates, and glutamates. In some embodiments, the buffer is selected from potassium dihydrogen phosphate, sodium bicarbonate, magnesium carbonate, sodium citrate, sodium dihydrogen phosphate, dipotassium monohydrogen phosphate, and disodium monohydrogen phosphate. In some embodiments, buffers are included in an amount required to maintain pH of the pharmaceutical formulation in an acceptable range.

In some embodiments, a film coating is provided around the pharmaceutical composition. In some embodiments, the coating of 1-(4-(benzylamino)-5,6,7,8-tetrahydropyrido[2,3-d]pyrimidin-2-yl)-2-methyl-1H-indole-4-carboxamide, or a pharmaceutically acceptable salt thereof, is an immediate release coating. In some embodiments, the immediate release coating comprises hydroxypropyl methyl cellulose (HPMC), with or without plasticizer, and with or without surfactants and anti-foaming agents (clear or pigmented or dyed). In some embodiments, the coating of 1-(4-(benzylamino)-5,6,7,8-tetrahydropyrido[2,3-d]pyrimidin-2-yl)-2-methyl-1H-indole-4-carboxamide, or a pharmaceutically acceptable salt thereof, is an immediate release coating with a moisture barrier. In some embodiments, the film coating is Opadry AMB II Beige. In some embodiments, the immediate release coating with a moisture barrier comprises polyvinyl alcohol (PVA), with or without plasticizer, with or without surfactants and anti-foaming agents (clear or pigmented or dyed). In some embodiments, the compositions are formulated into particles (for example for administration by capsule) and some or all of the particles are coated. In some embodiments, the compositions are formulated into particles (for example, for administration by capsule) and some or all of the particles are microencapsulated. In some embodiments, the compositions are formulated into particles (for example, for administration by capsule) and some or all of the particles are not microencapsulated and are uncoated.

In some embodiments, the formulations described herein are delivered using a pulsatile dosage form. A pulsatile dosage form is capable of providing one or more immediate release pulses at predetermined time points after a controlled lag time or at specific sites. Many other types of controlled release systems known to those of ordinary skill in the art and are suitable for use with the formulations described herein. Examples of such delivery systems include, e.g., polymer-based systems, such as polylactic and polyglycolic acid, polyanhydrides and polycaprolactone; porous matrices, nonpolymer-based systems that are lipids, including sterols, such as cholesterol, cholesterol esters and fatty acids, or neutral fats, such as mono-, di- and triglycerides; hydrogel release systems; silastic systems; peptide-based systems; wax coatings, bioerodible dosage forms, compressed tablets using conventional binders and the like. See, e.g., Liberman et al., *Pharmaceutical Dosage Forms,* 2 Ed., Vol. 1, pp. 209-214 (1990); Singh et al., *Encyclopedia of Pharmaceutical Technology,* $2^{nd}$ Ed., pp. 751-753 (2002); U.S. Pat. Nos.

4,327,725, 4,624,848, 4,968,509, 5,461,140, 5,456,923, 5,516,527, 5,622,721, 5,686,105, 5,700,410, 5,977,175, 6,465,014, and 6,932,983, each of which is specifically incorporated by reference.

Stabilizers include compounds such as any anti-oxidation agents, e.g., butylated hydroxytoluene (BHT), sodium ascorbate, and tocopherol; buffers, acids, and the like.

Surfactants include compounds such polysorbates, poloxamers, bile salts, glyceryl monostearate, sodium lauryl sulfate, sorbitan monooleate, polyoxyethylene sorbitan monooleate, copolymers of ethylene oxide and propylene oxide, and d-α-tocopheryl polyethylene glycol succinate (Vitamin E TPGS). In some embodiments, the surfactant is selected from Soluplus, PEG4000, PEG6000, Poloxamer 6200, and Kolliphor P407 micro. In some embodiments, the surfactant is a poloxamer. In some embodiments, the surfactant is Kolliphor P407 micro.

The aforementioned excipients are given as examples only and are not meant to include all possible choices. Other suitable excipient classes include coloring agents, granulating agents, preservatives, anti-foaming agents, plasticizers, and the like. Additionally, many excipients can have more than one role or function, or can be classified in more than one group; the classifications are descriptive only, and are not intended to limit any use of a particular excipient.

Methods

In some embodiments is a method of treating cancer in an individual in need thereof, comprising administering to the individual a therapeutically effective amount of a crystalline form of 1-(4-(benzylamino)-5,6,7,8-tetrahydropyrido[2,3-d]pyrimidin-2-yl)-2-methyl-1H-indole-4-carboxamide, or a pharmaceutically acceptable salt thereof, described herein. In some embodiments is a method of treating cancer in an individual in need thereof, comprising administering to the individual a therapeutically effective amount of a crystalline form of 1-(4-(benzylamino)-5,6,7,8-tetrahydropyrido[2,3-d]pyrimidin-2-yl)-2-methyl-1H-indole-4-carboxamide p-toluenesulfonic acid salt (tosylate) described herein. In some embodiments is a method of treating cancer in an individual in need thereof, comprising administering to the individual a therapeutically effective amount of a crystalline form of 1-(4-(benzylamino)-5,6,7,8-tetrahydropyrido[2,3-d]pyrimidin-2-yl)-2-methyl-1H-indole-4-carboxamide sulfuric acid salt (sulfate) described herein. In some embodiments is a method of treating cancer in an individual in need thereof, comprising administering to the individual a therapeutically effective amount of a crystalline form of 1-(4-(benzylamino)-5,6,7,8-tetrahydropyrido[2,3-d]pyrimidin-2-yl)-2-methyl-1H-indole-4-carboxamide hydrochloric acid salt (hydrochloride) described herein. In some embodiments is a method of treating cancer in an individual in need thereof, comprising administering to the individual a therapeutically effective amount of a crystalline form of 1-(4-(benzylamino)-5,6,7,8-tetrahydropyrido[2,3-d]pyrimidin-2-yl)-2-methyl-1H-indole-4-carboxamide free base (form A) described herein. In some embodiments is a method of treating cancer in an individual in need thereof, comprising administering to the individual a therapeutically effective amount of a crystalline form of 1-(4-(benzylamino)-5,6,7,8-tetrahydropyrido[2,3-d]pyrimidin-2-yl)-2-methyl-1H-indole-4-carboxamide free base (form B) described herein. In some embodiments, the cancer is selected from the group consisting of a solid tumor, a metastatic form of a solid tumor, an advanced metastatic solid tumor, a lymphoma, and an advanced lymphoma. In some embodiments, the cancer is selected from brain (gliomas), glioblastomas, breast, Wilm's tumor, Ewing's sarcoma, rhabdomyosarcoma, ependymoma, medulloblastoma, colon, head and neck, kidney, lung, liver, melanoma, ovarian, pancreatic, prostate, sarcoma, osteosarcoma, giant cell tumor of bone, thyroid, lymphoblastic T cell leukemia, myelodysplastic syndrome (MDS), chronic myelogenous leukemia, chronic lymphocytic leukemia, Hairy-cell leukemia, acute lymphoblastic leukemia, acute myelogenous leukemia (AML), chronic neutrophilic leukemia, acute lymphoblastic T cell leukemia, plasmacytoma, immunoblastic large cell leukemia, mantle cell leukemia, multiple myeloma megakaryoblastic leukemia, multiple myeloma, acute megakaryocytic leukemia, promyelocytic leukemia, erythroleukemia, malignant lymphoma, Hodgkin's lymphoma, non-Hodgkin's lymphoma, lymphoblastic T cell lymphoma, Burkitt's lymphoma, follicular lymphoma, neuroblastoma, bladder cancer, urothelial cancer, lung cancer, vulval cancer, cervical cancer, endometrial cancer, renal cancer, mesothelioma, esophageal cancer, salivary gland cancer, hepatocellular cancer, gastric cancer, nasopharangeal cancer, buccal cancer, cancer of the mouth, GIST (gastrointestinal stromal tumor) and testicular cancer. In some embodiments, the cancer is selected from acute myelogenous leukemia (AML) and myelodysplastic syndrome (MDS). In some embodiments, the cancer is acute myelogenous leukemia (AML). In some embodiments, the acute myelogenous leukemia (AML) is relapsed AML, recurrent AML, refractory AML, or any combination thereof. In some embodiments, the cancer is myelodysplastic syndrome (MDS). In some embodiments, the cancer is a hematological cancer. In some embodiments, the cancer is selected from the group consisting of acute myeloid leukemia (AML), myelodysplastic syndrome (MDS), myelodysplastic/myeloproliferative overlap neoplasms (MDS/MPN), CMML (chronic myelomonocytic leukemia), atypical CML (chronic myeloid leukemia), multiple myeloma, myeloma, amyloidosis, Waldenstrom's macroglobulinemia (also known as lymphoplasmacytic lymphoma), acute lymphoblastic leukemia (ALL), B-lymphoblastic leukemia, T-lymphoblastic leukemia, lymphoma, B-cell acute lymphoblastic leukemia, T-cell acute lymphoblastic leukemia, B-cell acute lymphoblastic lymphoma, T-cell acute lymphoblastic lymphoma, Burkitt's leukemia/lymphoma, Non-Hodgkin's lymphoma (NHL), chronic lymphocytic leukemia (CLL), small lymphocytic lymphoma (SLL), B-cell NHL, follicular lymphoma, marginal zone lymphoma, mantle cell lymphoma, diffuse large B-cell lymphoma (DLBCL), double/triple hit B-cell lymphoma, myeloproliferative neoplasm (MPN), essential thrombocythemia (ET), polycythemia vera (PV), myelofibrosis, primary myelofibrosis, post-PV myelofibrosis, Post-ET myelofibrosis, chronic myeloid leukemia (CML), blastic plasmacytoid dendritic cell neoplasm (BPDCN), M3 AML, and APL (acute promyelocytic leukemia).

In some embodiments is a method of treating cancer in an individual in need thereof, comprising administering to the individual a therapeutically effective amount of a pharmaceutical formulation of 1-(4-(benzylamino)-5,6,7,8-tetrahydropyrido[2,3-d]pyrimidin yl)-2-methyl-1H-indole-4-carboxamide, or a pharmaceutically acceptable salt thereof, described herein. In some embodiments is a method of treating cancer in an individual in need thereof, comprising administering to the individual a therapeutically effective amount of a pharmaceutical formulation of 1-(4-(benzylamino)-5,6,7,8-tetrahydropyrido[2,3-d]pyrimidin-2-yl)-2-methyl-1H-indole-4-carboxamide p-toluenesulfonic acid salt (tosylate) described herein. In some embodiments is a method of treating cancer in an individual in need thereof, comprising administering to the individual a therapeutically effective amount of a pharmaceutical formulation of 1-(4-(benzylamino)-5,6,7,8-tetrahydropyrido[2,3-d]pyrimidin-2-yl)-2-methyl-1H-indole-4-carboxamide sulfuric acid salt (sulfate) described herein. In some embodiments is a method of treating cancer in an individual in need thereof, comprising administering to the individual a therapeutically effective amount of a pharmaceutical formulation of 1-(4-(benzylamino)-5,6,7,8-tetrahydropyrido[2,3-d]pyrimidin-2-yl)-2-methyl-1H-indole-4-carboxamide hydrochloric acid salt (hydrochloride) described herein. In some embodiments is a method of treating cancer in an individual in need thereof, comprising administering to the individual a therapeutically effective amount of a pharmaceutical formulation of 1-(4-(benzylamino)-5,6,7,8-tetrahydropyrido[2,3-d]pyrimidin-2-yl)-2-methyl-1H-indole-4-carboxamide free base (form A) described herein. In some embodiments is a method of treating cancer in an individual in need thereof, comprising administering to the individual a therapeutically effective amount of a pharmaceutical formulation of 1-(4-(benzylamino)-5,6,7,8-tetrahydropyrido[2,3-d]pyrimidin-2-yl)-2-methyl-1H-indole-4-carboxamide free base (form B) described herein. In some embodiments, the cancer is selected from the group consisting of a solid tumor, a metastatic form of a solid tumor, an advanced metastatic solid tumor, a lymphoma, and an advanced lymphoma. In some embodiments, the cancer is selected from brain (gliomas), glioblastomas, breast, Wilm's tumor, Ewing's sarcoma, rhabdomyosarcoma, ependymoma, medulloblastoma, colon, head and neck, kidney, lung, liver, melanoma, ovarian, pancreatic, prostate, sarcoma, osteosarcoma, giant cell tumor of bone, thyroid, lymphoblastic T cell leukemia, myelodysplastic syndrome (MDS), chronic myelogenous leukemia, chronic lymphocytic leukemia, Hairy-cell leukemia, acute lymphoblastic leukemia, acute myelogenous leukemia (AML), chronic neutrophilic leukemia, acute lymphoblastic T cell leukemia, plasmacytoma, immunoblastic large cell leukemia, mantle cell leukemia, multiple myeloma megakaryoblastic leukemia, multiple myeloma, acute megakaryocytic leukemia, promyelocytic leukemia, erythroleukemia, malignant lymphoma, Hodgkin's lymphoma, non-Hodgkin's lymphoma, lymphoblastic T cell lymphoma, Burkitt's lymphoma, follicular lymphoma, neuroblastoma, bladder cancer, urothelial cancer, lung cancer, vulval cancer, cervical cancer, endometrial cancer, renal cancer, mesothelioma, esophageal cancer, salivary gland cancer, hepatocellular cancer, gastric cancer, nasopharangeal cancer, buccal cancer, cancer of the mouth, GIST (gastrointestinal stromal tumor) and testicular cancer. In some embodiments, the cancer is selected from acute myelogenous leukemia (AML) and myelodysplastic syndrome (MDS). In some embodiments, the cancer is acute myelogenous leukemia (AML). In some embodiments, the acute myelogenous leukemia (AML) is relapsed AML, recurrent AML, refractory AML, or any combination thereof. In some embodiments, the cancer is myelodysplastic syndrome (MDS). In some embodiments, the cancer is a hematological cancer. In some embodiments, the cancer is selected from the group consisting of acute myeloid leukemia (AML), myelodysplastic syndrome (MDS), myelodysplastic/myeloproliferative overlap neoplasms (MDS/MPN), CMML (chronic myelomonocytic leukemia), atypical CML (chronic myeloid leukemia), multiple myeloma, myeloma, amyloidosis, Waldenstrom's macroglobulinemia (also known as lymphoplasmacytic lymphoma), acute lymphoblastic leukemia (ALL), B-lymphoblastic leukemia, T-lymphoblastic leukemia, lymphoma, B-cell acute lymphoblastic leukemia, T cell acute lymphoblastic leukemia, B-cell acute lymphoblastic lymphoma, T-cell acute lymphoblastic lymphoma, Burkitt's leukemia/lymphoma, Non-Hodgkin's lymphoma (NHL), chronic lymphocytic leukemia (CLL), small lymphocytic lymphoma (SLL), B-cell NHL, follicular lymphoma, marginal zone lymphoma, mantle cell lymphoma, diffuse large B-cell lymphoma (DLBCL), double/triple hit B-cell lymphoma, myeloproliferative neoplasm (MPN), essential thrombocythemia (ET), polycythemia vera (PV), myelofibrosis, primary myelofibrosis, post-PV myelofibrosis, Post-ET myelofibrosis, chronic myeloid leukemia (CML), blastic plasmacytoid dendritic cell neoplasm (BPDCN), M3 AML, and APL (acute promyelocytic leukemia).

In some embodiments of the methods of treatment described herein, the method further comprises the administration of a second therapeutic agent. In some embodiments, the second therapeutic agent is a chemotherapeutic agent, hormonal therapeutic agent, or an immunotherapeutic agent. In some embodiments, the second therapeutic agent is a chemotherapeutic agent. In some embodiments, the second therapeutic agent is a hormonal therapeutic agent. In some embodiments, the second therapeutic agent is an immunotherapeutic agent.

Kits/Articles of Manufacture

For use in the therapeutic methods of use described herein, kits and articles of manufacture are also described herein. Such kits include a carrier, package, or container that is compartmentalized to receive one or more containers such as vials, tubes, and the like, each of the container(s) comprising one of the separate elements to be used in a method described herein. Suitable containers include, for example, bottles, vials, syringes, and test tubes. In one embodiment, the containers are formed from a variety of materials such as glass or plastic.

The articles of manufacture provided herein contain packaging materials. Packaging materials for use in packaging pharmaceutical products include, e.g., U.S. Pat. No. 5,323,907. Examples of pharmaceutical packaging materials include, but are not limited to, blister packs, bottles, tubes, bags, containers, bottles, and any packaging material suitable for a selected formulation and intended mode of administration and treatment.

In some embodiments, the pharmaceutical formulations of 1-(4-(benzylamino)-5,6,7,8-tetrahydropyrido[2,3-d]pyrimidin-2-yl)-2-methyl-1H-indole-4-carboxamide described herein, are presented in a package or dispenser device which may contain one or more unit dosage forms containing the active ingredient. The pharmaceutical formulation of 1-(4-(benzylamino)-5,6,7,8-tetrahydropyrido[2,3-d]pyrimidin-2-yl)-2-methyl-1H-indole-4-carboxamide described herein is packaged alone, or packaged with another compound or another ingredient or additive. In some embodiments, the package contains one or more containers filled with one or more of the ingredients of the pharmaceutical compositions. In some embodiments, the package comprises metal or plastic foil, such as a blister pack. In some embodiments, the package or dispenser is accompanied with a notice associated with the container in form prescribed by a governmental agency regulating the manufacture, use, or sale of pharmaceuticals, which notice is reflective of approval by the agency of the form of the drug for human or veterinary administration. In some embodiments, such notice, for example, is the labeling approved by the U.S. Food and Drug Administration for prescription drugs, or the approved product insert. In some embodiments, compositions include a crystalline form of 1-(4-(benzylamino)-5,6,7,8-tetrahydropyrido[2,3-d]pyrimidin-2-yl)-2-methyl-1H-indole-4-carboxamide described herein formulated in a compatible pharmaceutical carrier are prepared, placed in an appropriate container, and labeled for treatment of an indicated condition.

For example, the container(s) include crystalline 1-(4-(benzylamino)-5,6,7,8-tetrahydropyrido[2,3-d]pyrimidin-2-yl)-2-methyl-1H-indole-4-carboxamide, optionally in a composition or in combination with another agent as disclosed herein. Such kits optionally include an identifying description or label or instructions relating to its use in the methods described herein.

A kit typically includes labels listing contents and/or instructions for use, and package inserts with instructions for use. A set of instructions will also typically be included.

In one embodiment, a label is on or associated with the container. In one embodiment, a label is on a container when letters, numbers or other characters forming the label are attached, molded or etched into the container itself; a label is associated with a container when it is present within a receptacle or carrier that also holds the container, e.g., as a package insert. In one embodiment, a label is used to indicate that the contents are to be used for a specific therapeutic application. The label also indicates directions for use of the contents, such as in the methods described herein.

In certain embodiments, the pharmaceutical compositions are presented in a pack or dispenser device which contains one or more unit dosage forms containing a compound provided herein. The pack, for example, contains metal or plastic foil, such as a blister pack. In one embodiment, the pack or dispenser device is accompanied by instructions for administration. In one embodiment, the pack or dispenser is also accompanied with a notice associated with the container in form prescribed by a governmental agency regulating the manufacture, use, or sale of pharmaceuticals, which notice is reflective of approval by the agency of the form of the drug for human or veterinary administration. Such notice, for example, is the labeling approved by the U.S. Food and Drug Administration for prescription drugs, or the approved product insert. In one embodiment, compositions containing a crystalline form of 1-(4-(benzylamino)-5,6,7,8-tetrahydro-pyrido[2,3-d]pyrimidin-2-yl)-2-methyl-1H-indole-4-carboxamide formulated in a compatible pharmaceutical carrier are also prepared, placed in an appropriate container, and labeled for treatment of an indicated condition.

EXAMPLES

List of Abbreviations

As used throughout the description of the invention, the following abbreviations, unless otherwise indicated, shall be understood to have the following meanings:

ACN or MeCN acetonitrile
Bn benzyl
BOC or Boc tert-butyl carbamate
t-Bu tert-butyl
Cy cyclohexyl
DCE dichloroethane ($ClCH_2CH_2Cl$)
DCM dichloromethane ($CH_2Cl_2$)
DIPEA or DIEA diisopropylethylamine
DMAP 4-(N,N-dimethylamino)pyridine
DMF dimethylformamide
DMA N,N-dimethylacetamide
DMSO dimethylsulfoxide
eq or equiv equivalent(s)
Et ethyl
$Et_2O$ diethyl ether
EtOH ethanol
EtOAc ethyl acetate
HPLC high performance liquid chromatography
Me methyl
MEK methyl ethyl ketone
MeOH methanol
MS mass spectroscopy
GC gas chromatography
h hour(s)
KF Karl Fischer
min minutes
MsOH methanesulfonic acid
NMR nuclear magnetic resonance
RP-HPLC reverse phase-high performance liquid chromatography
r.t. room temperature
TFA trifluoroacetic acid
THF tetrahydrofuran
TLC thin layer chromatography
V volumes I. Chemical Synthesis Unless otherwise noted, reagents and solvents were used as received from commercial suppliers. Anhydrous solvents and oven-dried glassware were used for synthetic transformations sensitive to moisture and/or oxygen. Yields were not optimized. Reaction times are approximate and were not optimized.

Example 1: Preparation of Compound 1

The preparation of Compound 1 is disclosed in U.S. Pat. No. 9,828,363, the content of which is incorporated by reference in its entirety.

II. Salt and Polymorph Screen

Example 2: General Conditions for Salt/Polymorph Screen

A total of 55 salt or cocrystal attempts were performed in the screening, and twelve salts, salt/cocrystals, or potential salt/cocrystals were produced with nine acids including BsOH, citric, gentisic, HCl, MsOH, phosphoric, sulfuric, tartaric, and TsOH acids. These materials were further analyzed by $^1$H NMR to determine the chemical compositions. For materials obtained from reactions with HCl, sulfuric and phosphoric acid, IC testing was carried out to determine their chemical compositions. Selected materials were stressed at ~94% RH at ambient temperature to examine hygroscopicity and slurried in water to examine disproportionation tendency, along with the aqueous solubility estimation. Additional analyses of DSC and TGA were performed on selected salts to evaluate their thermal behavior.

In general, Compound 1 free base (form A) was added to the appropriate acid in a Class 2 or Class 3 solvent and stirred at a temperature from 0° C. to 60° C. for 1 to 4 days. Any solid that formed was collected by filtration, dried, and characterized for crystallinity and other properties by the techniques disclosed herein.

Example 3: Preparation of Compound 1 Tosylate Salt

Figure 16:
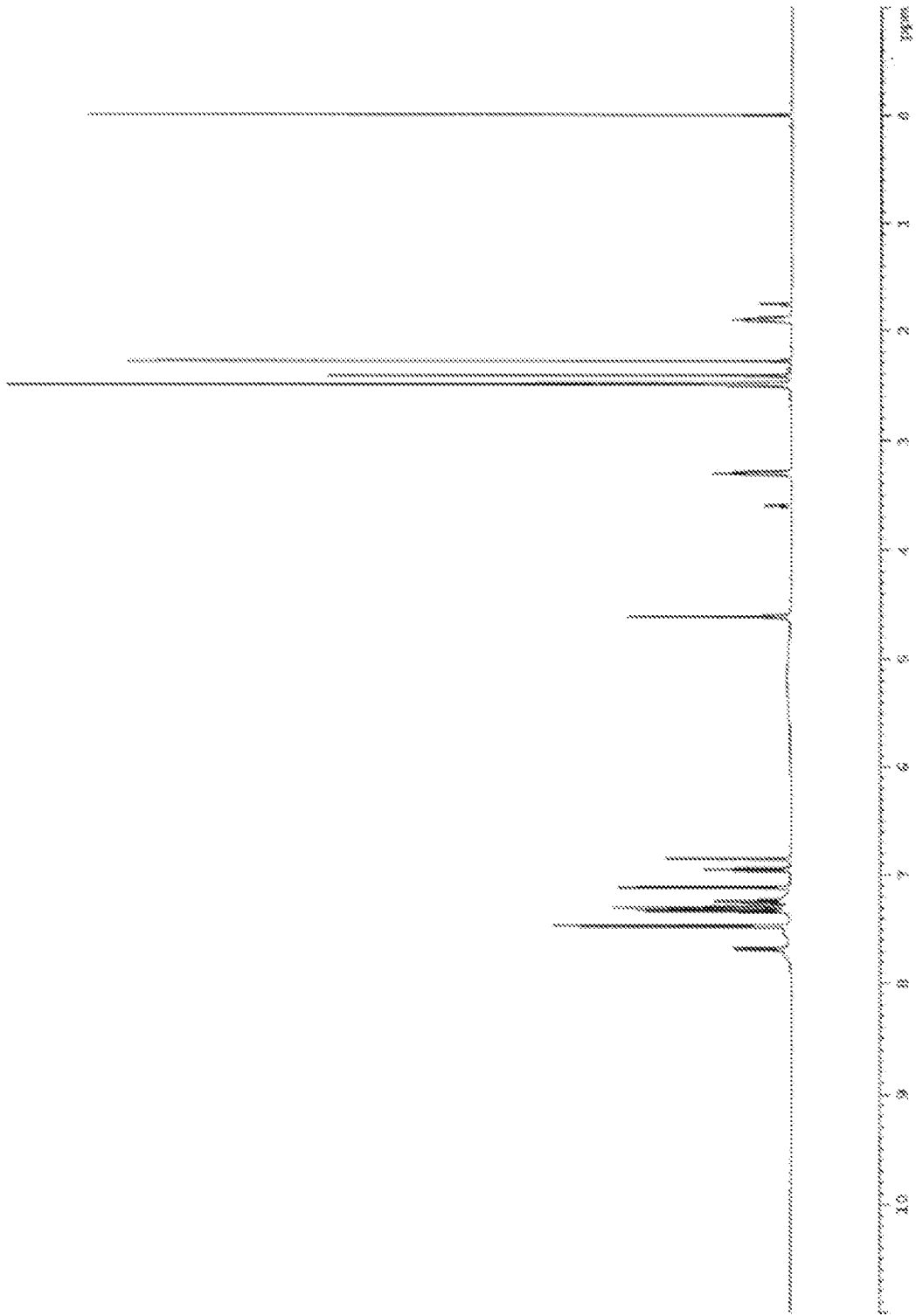
FIG. 16. Illustrates a $^1$H NMR spectrum of crystalline 1-(4-(benzylamino)-5,6,7,8-tetrahydropyrido[2,3-d]pyrimidin-2-yl)-2-methyl-1H-indole-4-carboxamide tosylate.

A solution of p-toluenesulfonic acid (54.5 mg) in THF (5 mL) was added to Compound 1 free base (form A) (99.6 mg). The mixture was stirred at room temperature for 4 days. Solids were removed by filtration and dried to afford Compound 1, tosylate salt (XRPD pattern same as FIG. 1). $^1$H NMR (400 MHz, DMSO-d6) spectrum is shown in FIG. 16 and is consistent with chemical structure of Compound 1 tosylate containing TsOH (peak at 2.3 and 7.4 ppm) with stoichiometry of 1:1.

Example 4: Preparation of Compound 1 Sulfate Salt

Figure 17:
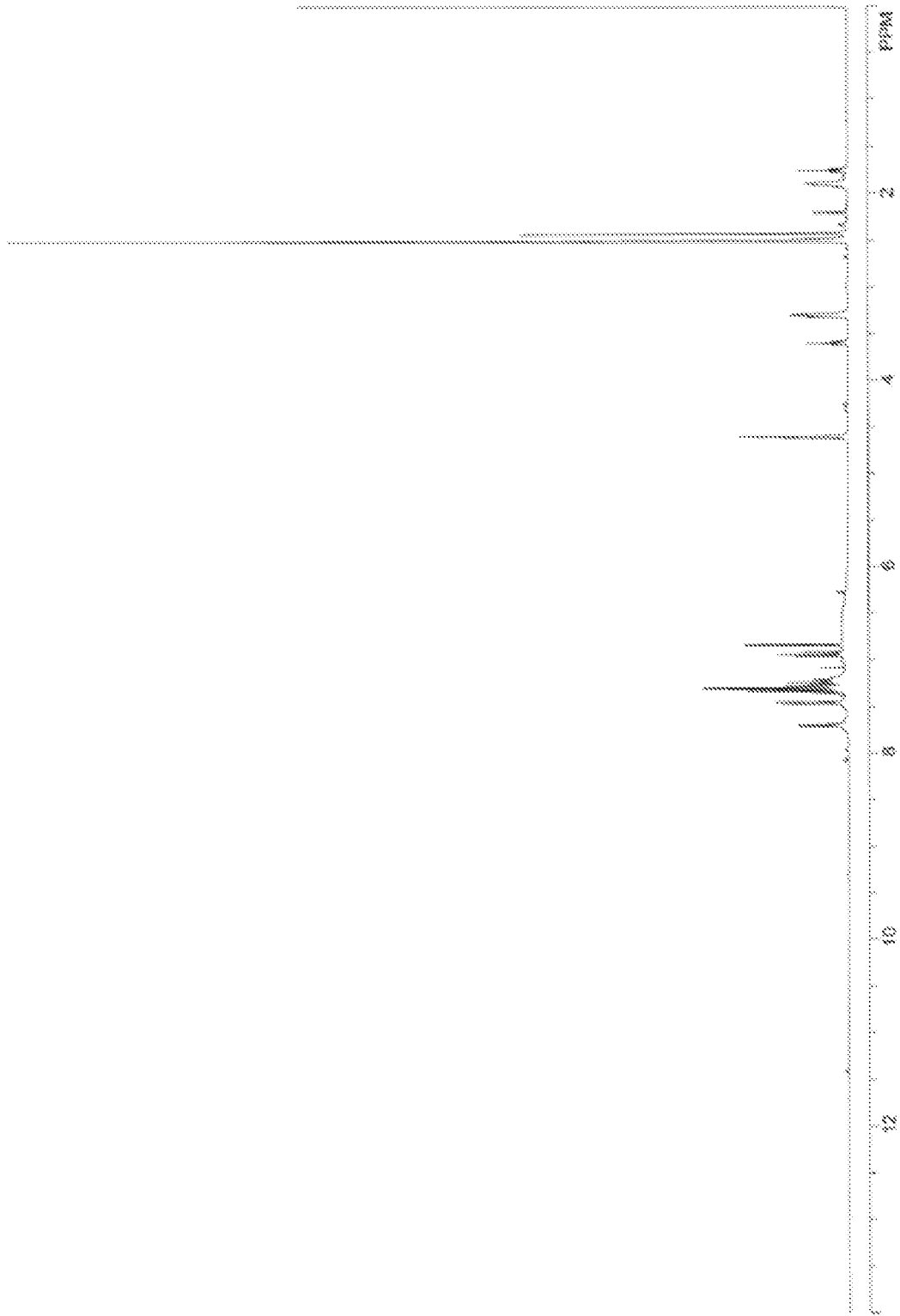
FIG. 17. Illustrates a $^1$H NMR spectrum of crystalline 1-(4-(benzylamino)-5,6,7,8-tetrahydropyrido[2,3-d]pyrimidin-2-yl)-2-methyl-1H-indole-4-carboxamide sulfate.

A solution of sulfuric acid (47.4 µL, 95% purity) in THF (5 mL) was added to Compound 1 free base (form A) (102.4 mg). The mixture was stirred at room temperature for 1 day. Solids were removed by filtration. The solids were ground with a mortar and pestle, and dried at 80° C. for 24 hours to afford Compound 1 sulfate salt (XRPD pattern same as FIG. 4). $^1$H NMR (400 MHz, DMSO-d6) spectrum is shown in FIG. 17 and is consistent with chemical structure of Compound 1 sulfate. Ion chromatography (IC) of Compound 1 sulfate showed 15.9 wt % of $SO_4^{2-}$ corresponding to ~1:1 stoichiometry.

Example 5: Preparation of Compound 1 Hydrochloride Salt

Figure 18:
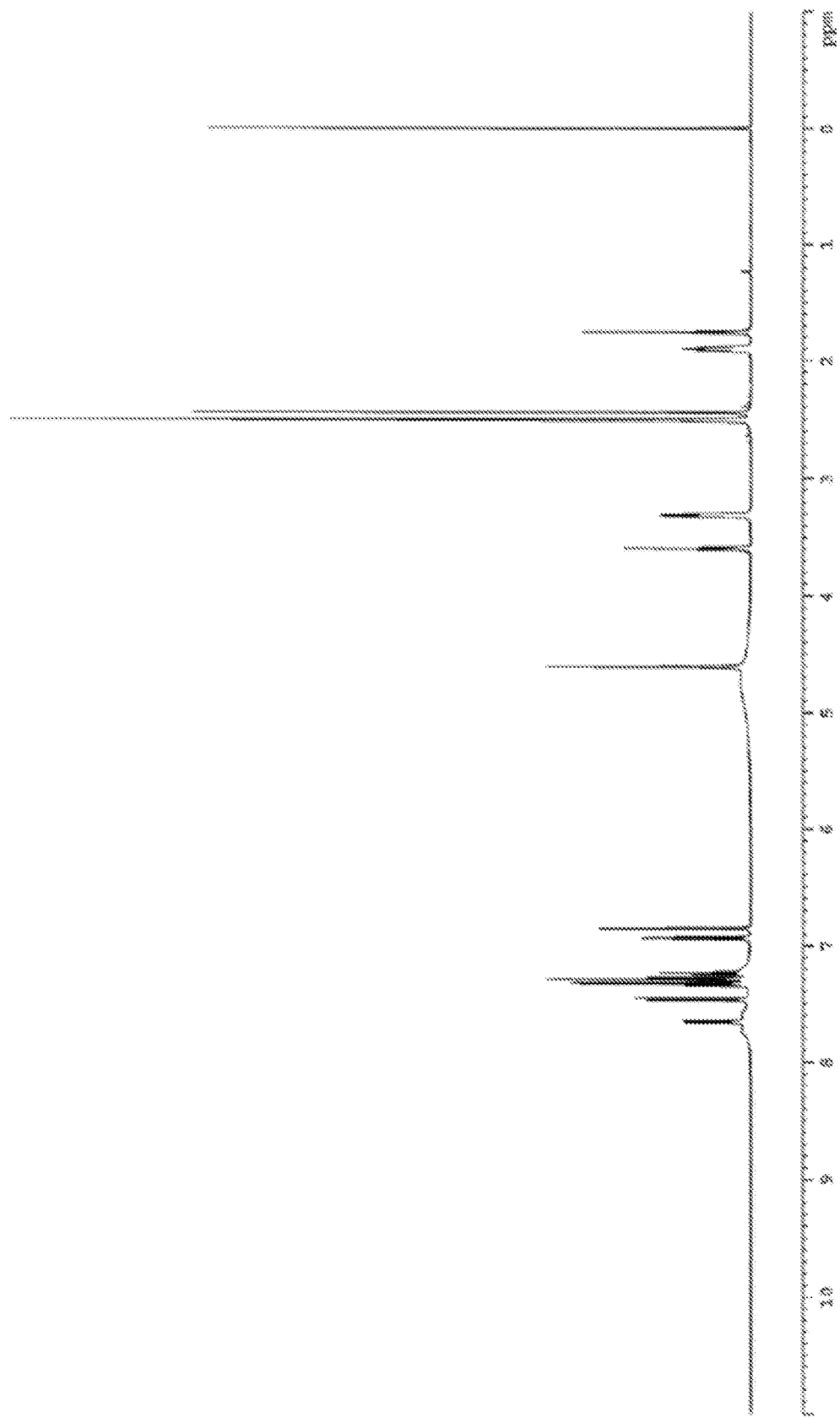
FIG. 18. Illustrates a $^1$H NMR spectrum of crystalline 1-(4-(benzylamino)-5,6,7,8-tetrahydropyrido[2,3-d]pyrimidin-2-yl)-2-methyl-1H-indole-4-carboxamide hydrochloride.

To a slurry of Compound 1 free base (form A) (184.1 mg) in methyl ethyl ketone (10 mL) was added 5N hydrochloric acid (98 µL). The mixture was stirred at room temperature for 1 day. Solids were removed by filtration and dried to afford Compound 1, hydrochloride salt (XRPD pattern same as FIG. 7). $^1$H NMR (400 MHz, DMSO-d6) spectrum is shown in FIG. 18 and is consistent with chemical structure of Compound 1 hydrochloride. Ion chromatography (IC) of Compound 1 hydrochloride showed 6.4 wt % of Cl$^-$ corresponding to ~1:1 stoichiometry.

III. Characterization of Polymorphs

Example 6: X-Ray Powder Diffraction (XRPD)

XRPD patterns were collected with a PANalytical X'Pert PRO MPD diffractometer using an incident beam of Cu radiation produced using an Optix long, fine-focus source. An elliptically graded multilayer mirror was used to focus Cu Kα X-rays through the specimen and onto the detector. Prior to the analysis, a silicon specimen (NIST SRM 640e) was analyzed to verify the observed position of the Si 111 peak is consistent with the NIST-certified position. A specimen of the sample was sandwiched between 3-µm-thick films and analyzed in transmission geometry. A beam-stop, short antiscatter extension, antiscatter knife edge were used to minimize the background generated by air. Soller slits for the incident and diffracted beams were used to minimize broadening from axial divergence. Diffraction patterns were collected using a scanning position-sensitive detector (X'Celerator) located 240 mm from the specimen and Data Collector software v. 2.2b.

XRPD analysis of Compound 1 tosylate (FIG. 1) showed the compound to be crystalline with characteristic peaks at 7.5° 2-Theta, 10.8° 2-Theta, 12.5° 2-Theta, 17.4° 2-Theta, 18.8° 2-Theta, 20.3° 2-Theta, 20.5° 2-Theta, 22.4° 2-Theta, 22.5° 2-Theta, and 22.6° 2-Theta.

XRPD analysis of Compound 1 sulfate (FIG. 4) showed the compound to be crystalline with characteristic peaks at 6.8° 2-Theta, 7.6° 2-Theta, 7.7° 2-Theta, 10.2° 2-Theta, 12.0° 2-Theta, 12.5° 2-Theta, 16.3° 2-Theta, 21.0° 2-Theta, 21.3° 2-Theta, 22.6° 2-Theta, 23.7° 2-Theta, 25.5° 2-Theta, 27.0° 2-Theta, 30.1° 2-Theta.

XRPD analysis of Compound 1 hydrochloride (FIG. 7) showed the compound to be crystalline with characteristic peaks at 9.8° 2-Theta, 11.3° 2-Theta, 20.0° 2-Theta, 21.2° 2-Theta, 21.4° 2-Theta, and 23.8° 2-Theta.

XRPD analysis of Compound 1 sulfate THF solvate (FIG. 10) showed the compound to be crystalline.

XRPD analysis of Compound 1 hydrochloride THF solvate (FIG. 11) showed the compound to be crystalline.

XRPD analysis of Compound 1 besylate (FIG. 12) showed the compound to be crystalline.

XRPD analysis of Compound 1 free base (form A) (FIG. 13) showed the compound to be crystalline.

XRPD analysis of Compound 1 free base (form B) (FIG. 15) showed the compound to be crystalline.

Example 7: Thermogravimetric Analysis (TGA)

Thermogravimetric analysis (TGA) was performed using a TA Instruments 2050 or Mettler Toledo: TGA/DSC 3+ thermogravimetric analyzer. Sample was placed in an aluminum sample pan and inserted into the TG furnace. The data acquisition and processing parameters are displayed on each thermogram. Nickel and Alumel were used as the calibration standards. The method code on the thermogram is an abbreviation for the start and end temperature as well as the heating rate; e.g., 00-350-10 means "from ambient to 350° C., at 10° C./min".

TGA of Compound 1 tosylate (FIG. 2) showed −0.8% weight change from 26 to 198° C.; −0.9% weight change from 198 to 251° C. Onset suspected decomposition 222° C.

TGA of Compound 1 sulfate (FIG. 5) showed −3% weight change from 25 to 106° C. Onset suspected decomposition 244° C.

TGA of Compound 1 hydrochloride (FIG. 8) showed −0.6% weight change from 26 to 144° C. Onset suspected decomposition 180° C.

Example 8: Differential Scanning Calorimetry (DSC)

DSC was performed using a TA Instrument Q2000 differential scanning calorimeter. Temperature calibration was performed using NIST traceable indium metal. The sample was placed into an aluminum Tzero DSC pan, covered with a lid, and the weight was accurately recorded. A weighed aluminum pan configured as the sample pan was placed on the reference side of the cell.

DSC analysis of Compound 1 tosylate (FIG. 3) showed a sharp melting endotherm at 233° C.

DSC analysis of Compound 1 sulfate (FIG. 6) showed a sharp melting endotherm at 229° C.

DSC analysis of Compound 1 hydrochloride (FIG. 9) showed a sharp melting endotherm at 236° C.

DSC analysis of Compound 1 free base (form A) (FIG. 14) showed a sharp melting endotherm at 224° C.

Example 9: Relative Humidity (RH) Stress

Solids of select Compound 1 salts were exposed to ~94% RH (ASTM Standard E, 104-85, 1996) for a given period of time by placing the solids into an open vial inside a sealed container. Samples were observed visually for signs of deliquescence after removal from the stress environment.

RH stress of Compound 1 tosylate showed no apparent change in appearance/texture after 10 days at 94% RH.

RH stress of Compound 1 sulfate showed no apparent change in appearance/texture after 10 days at 94% RH.

RH stress of Compound 1 hydrochloride showed no apparent change in appearance/texture after 10 days at 94% RH.

Example 10: Ion Chromatography (IC)

A multi-element cation standard solution (Sigma-Aldrich, Part No. 89316, 10 mg/L) was diluted 10-fold with water to a working concentration of 1 mg/L. Samples salts were prepared to contain, approximately, the cation concentration of the standard solution. For each sample, solids of Compound 1 salts were accurately weighed (1-3 mg) and dissolved in methanol, using a class A volumetric flask. The experimentally-determined cation concentration was used to calculate the cation content of each sample.

IC analyses were performed using a Dionex ICS-5000+ series ion chromatograph. The ICS-5000+ consists of two chromatography systems that share an autosampler. The system used for cation detection was equipped with an isocratic pump, an eluent generator module, a conductivity detector, and a suppressor (CERS 500 4 mm). A 25 µL sample loop was installed. A Dionex IonPac™ CG12A-5 µm 3×30 mm guard column and a Dionex IonPac™ CS12A-5 µm 3×150 mm analytical column were installed. Water (18.2 MΩ, dispensed from ELGA Purelab Flex 2) was used to fill the eluent reservoir, for standard and sample preparations, and for autosampler flush. The flow rate was 0.500 mL/min. The injection volume was 25.00 µL. The data collection rate was 5.0 Hz and the detector rise time was 0.50 sec. The temperatures of the cell, columns, and detector compartment were 30° C. The autosampler temperature was 25° C. The suppressor current was 41 mA. The eluent generator cartridge type was EGC III MSA.

IC of Compound 1 sulfate showed 15.9 wt % of $SO_4^{2-}$ corresponding to ~1:1 stoichiometry.

IC of Compound 1 hydrochloride showed 6.4 wt % of $Cl^-$ corresponding to ~1:1 stoichiometry.

Example 11: Single Crystal X-Ray Diffraction

Figure 19:
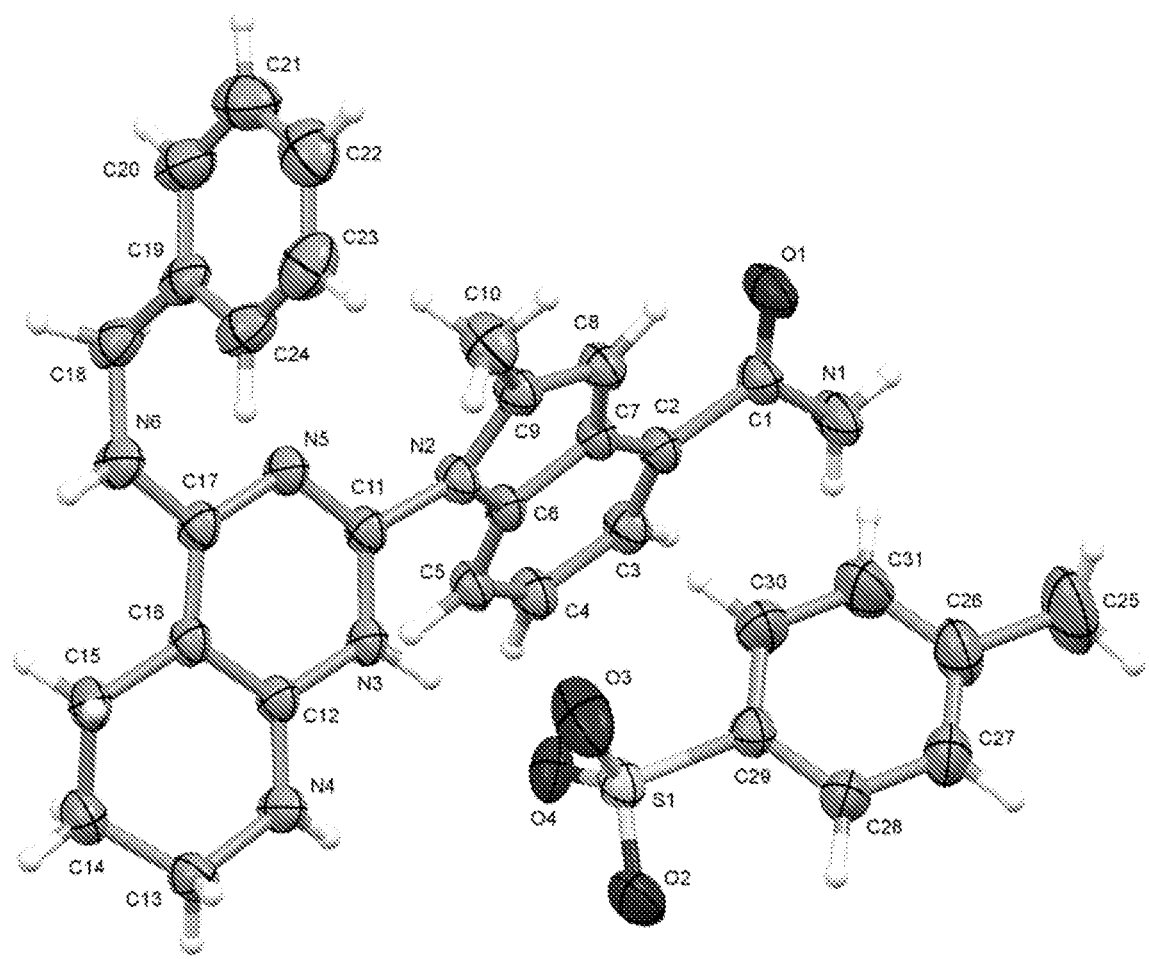
FIG. 19. Illustrates an atomic displacement ellipsoid drawing of crystalline 1-(4-(benzylamino)-5,6,7,8-tetrahydropyrido[2,3-d]pyrimidin-2-yl)-2-methyl-1H-indole-4-carboxamide tosylate.
Figure 20:
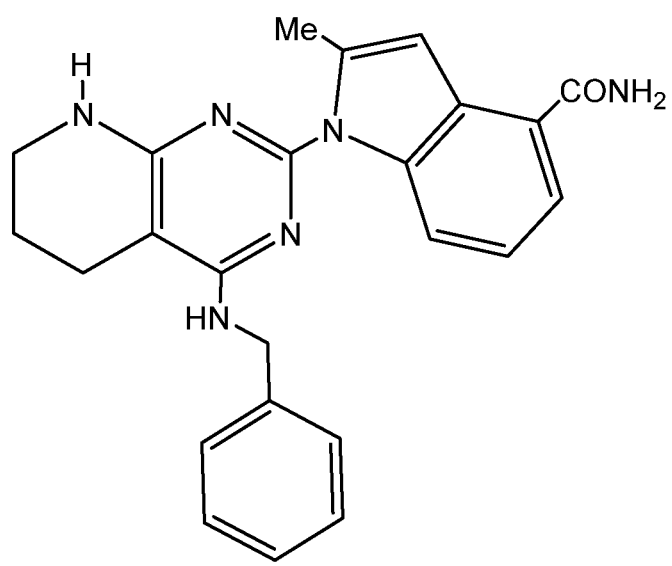
FIG. 20. Depicts the structure of 1-(4-(benzylamino)-5,6,7,8-tetrahydropyrido[2,3-d]pyrimidin-2-yl)-2-methyl-1H-indole-4-carboxamide which is CB-5339 and also referred to as Compound 1 herein.

A suitable single crystal of Compound 1 tosylate was selected and analyzed by single-crystal X-ray diffractometry. Preliminary examination and data collection were performed on a Rigaku SuperNova diffractometer, equipped with a copper anode microfocus sealed X-ray tube (Cu Kα λ=1.54184 Å) and a Dectris Pilatus3 R 200K hybrid pixel array detector. Cell constants and an orientation matrix for data collection were obtained from least-squares refinement using the setting angles of 9647 reflections in the range 3.7390°<θ<77.2970°. The crystal system is triclinic and the space group is $P\bar{1}$. The cell parameters and calculated volume are: a=8.58749(9) Å, b=13.81610(16) Å, c=14.5053(2) Å, α=61.6641(13)°, β=82.5955(10)°, γ=73.8349(10)°, V=1454.88(4) Å$^3$. The formula weight is 584.68 g mol$^{-1}$ with Z=2, resulting in a calculated density of 1.335 g cm$^{-3}$. The data were collected to a maximum diffraction angle (2θ) of 155.244° at room temperature. An atomic displacement ellipsoid drawing of Compound 1 tosylate is shown in FIG. 19. The asymmetric unit shown contains one Compound 1 cation and one tosylate anion. Crystal data are summarized below:

| Empirical formula | $C_{31}H_{32}N_6O_4S$ |
|---|---|
| Formula weight (g mol$^{-1}$) | 584.68 |
| Temperature (K.) | 300.50(13) |
| Wavelength (Å) | 1.54184 |
| Crystal system | triclinic |
| Space group | $P\bar{1}$ |
| Unit cell parameters | |
| a = 8.58749(9) Å | α = 61.6641(13)° |
| b = 13.81610(16) Å | β = 82.5955(10)° |
| c = 14.5053(2) Å | γ = 73.8349(10)° |
| Unit cell volume (Å$^3$) | 1454.88(4) |
| Cell formula units, Z | 2 |
| Calculated density (g cm$^{-3}$) | 1.335 |
| Absorption coefficient (mm$^{-1}$) | 1.379 |
| F(000) | 616 |
| Crystal size (mm$^3$) | 0.39 × 0.14 × 0.06 |
| Reflections used for cell measurement | 9647 |
| θ range for cell measurement | 3.7390°-77.2970° |
| Total reflections collected | 13608 |
| Index ranges | −10 ≤ h ≤ 6; −17 ≤ k ≤ 17; −18 ≤ l ≤ 18 |
| θ range for data collection | $θ_{min}$ = 3.462°, $θ_{max}$ = 77.622° |
| Completeness to $θ_{max}$ | 96.6% |
| Completeness to $θ_{full}$ = 67.684° | 99.9% |
| Absorption correction | multi-scan |
| Transmission coefficient range | 0.826-1.000 |
| Refinement method | full matrix least-squares on F$^2$ |
| Independent reflections | 5981 [$R_{int}$ = 0.0220, $R_σ$ = 0.0278] |
| Reflections [ I>2σ(I) ] | 5538 |
| Reflections/restraints/parameters | 5981/0/508 |
| Goodness-of-fit on F$^2$ | S = 1.05 |
| Final residuals [ I>2σ(I) ] | R = 0.0362, $R_w$ = 0.0991 |
| Final residuals [ all reflections ] | R = 0.0384, $R_w$ = 0.1011 |
| Largest diff. peak and hole (e Å$^{-3}$) | 0.299, −0.364 |
| Max/mean shift/standard uncertainty | 0.000/0.000 |

IV. Biological Data

Example 12: p97 Inhibition Assay

The p97 assay is an assay used to determine inhibitory activity of compounds against the p97 complex. Inhibition of activity of the p97 proteosome complex can enable apoptosis and cause elimination of neoplastic cells (cancer cells). The assay follows that of Christianson in Nat. Cell Biol., (2011) 14:93. The reagents used for the p97 assay include an assay buffer which is a mixture of 50 mM TRIS pH 7.5, 20 mM MgCl~, 0.02% TX-100, 1 mM DTT and 0.2% (v/v) glycerol. The well plate is a Corning 3674, 384w plate. The identification kit is an ADP glo kit (Promega): stop buffer, detection reagent.

The assay is conducted as follows:
Serial dilute compound in DMSO in a 1:3.33-fold 10 point serial dilution.
In each well of 384w plate add the following reagents:
 0.5 µL compound serial diluted in DMSO (Final Conc. 10%)
 2 µL ATP (Final Conc.=20 µM, diluted in assay buffer)
 2.5 µL p97 (Final Conc.=20 nM, diluted in assay buffer).
Incubate at 37° C. for 15 min.
Add 5 µL of stop buffer, incubate at RT for 40 min.
Add 10 µL of detection reagent, incubate at RT for 30 min.
Read luminescence on Envision plate reader.
Upon obtaining the data from the luminescence reading, the data may be analyzed as follows:
 Normalize luminescence data using no enzyme (full inhibition) and no compound (no inhibition) controls.
 Plot normalized luminescence data against log-transformed concentration values and fit to a sigmoidal curve to determine IC50 values (done in Collaborative Drug Discovery software).

Compound 1, when tested in the above-described assay, demonstrated the ability to inhibit p97. Compound 1 p97 $IC_{50}$<30 nM.

V. Pharmaceutical Formulations

Example 13: Pharmaceutical Formulation 1-(4-(Benzylamino)-5,6,7,8-tetrahydropyrido[2,3-d]pyrimidin-2-yl)-2-methyl-1H-indole-4-carboxamide p-toluenesulfonic acid salt (tosylate); 25 and 75 mg Common Blend Composition:

| Component | % |
|---|---|
| 1-(4-(Benzylamino)-5,6,7,8-tetrahydropyrido[2,3-d]pyrimidin-2-yl)-2-methyl-1H-indole-4-carboxamide p-toluenesulfonic acid salt (tosylate) | 35.35% |
| ProSolv HD90 | 29.33% |
| Mannitol M100 | 29.33% |
| Kolliphor P407 Micro | 2.50% |
| Ac-Di-Sol | 2.50% |
| Aerosil 200 | 0.50% |
| Mg Stearate | 0.50% |
| Total: | 100.00 |

[1] a correction factor of 0.707 was applied to this formulation based on the calculated value of the free base weight divided by the tosylate salt weight (413.00/584.17)

Blending procedure:
1. 1-(4-(Benzylamino)-5,6,7,8-tetrahydropyrido[2,3-d]pyrimidin-2-yl)-2-methyl-1H-indole-4-carboxamide p-toluenesulfonic acid salt (tosylate) was passed through an 850 μm sieve. Agglomerates were removed and broken up using a mortar and pestle before passing through sieve. The compound was then blended for 10 minutes on a turbula blender at 32 RPM.
2. Weighed out the blend components.
3. Set up the GlobePharma V-Blender with the v-shell.
4. Added the materials to the v-shell in the following order:
   Half of the Mannitol M100
   Half of the ProSolv HD90
   All of the 1-(4-(benzylamino)-5,6,7,8-tetrahydropyrido[2,3-d]pyrimidin-2-yl)-2-methyl-1H-indole-4-carboxamide p-toluenesulfonic acid salt (tosylate), Ac-Di-Sol, Aerosil 200, and Micronized Poloxamer P407 (dry wash the 1-(4-(benzylamino)-5,6,7,8-tetrahydropyrido[2,3-d]pyrimidin-2-yl)-2-methyl-1H-indole-4-carboxamide p-toluenesulfonic acid salt (tosylate), Ac-Di-Sol, and Poloxamer containers with ProSolv HD90)
   The remaining ProSolv HD90
   The remaining Parteck M100
5. Blended for 10 minutes.
6. Removed the contents of the v-shell and Comil at 50% speed through an 1143 μm screen.
7. Placed the milled material back into the V-blender and blend for 10 minutes.
8. Pulled 6 blend uniformity samples using a stainless-steel sample thief with a 1-mL tip to target a sample size of 100 mg-300 mg (1-3× unit weight of the 25 mg dose) and paused for testing.
9. After confirming the blend uniformity, pre-sieved magnesium stearate (850 μm sieve) was added to the blend and the blend was blended a final time for 3 minutes. The 25 mg blend was then filled into Size 3 white opaque gelatin coni-snap capsules, and the 75 mg blend was filled into Swedish Orange size 00 gelatin coni-snap capsules, using profill trays.

We claim:

1. A crystalline form of 1-(4-(benzylamino)-5,6,7,8-tetrahydropyrido[2,3-d]pyrimidin-2-yl)-2-methyl-1H-indole-4-carboxamide tosylate having at least one of the following properties:
   (a) an X-ray powder diffraction (XRPD) pattern substantially the same as shown in FIG. 1;
   (b) an X-ray powder diffraction (XRPD) pattern with characteristic peaks at 7.5° 2-Theta, 10.8° 2-Theta, 12.5° 2-Theta, 17.4° 2-Theta, 18.8° 2-Theta, 20.3° 2-Theta, 20.5° 2-Theta, 22.4° 2-Theta, 22.5° 2-Theta, and 22.6° 2-Theta;
   (c) a thermo-gravimetric analysis (TGA) substantially similar to the one set forth in FIG. 2;
   (d) a DSC thermogram substantially similar to the one set forth in FIG. 3;
   (e) a DSC thermogram with an endotherm at about 233° C.;
   (f) combinations thereof.

2. The crystalline form of claim 1, wherein the crystalline form is characterized as having properties (a), (b), (c), (d), and (e).

3. The crystalline form of claim 1, wherein the crystalline form is unsolvated.

4. The crystalline form of claim 1, wherein the crystalline form is non-hygroscopic.

5. A pharmaceutical composition comprising the crystalline form of claim 1, and at least one inactive ingredient selected from pharmaceutically acceptable carriers, diluents, and excipients.

6. A pharmaceutical composition comprising 1-(4-(benzylamino)-5,6,7,8-tetrahydropyrido[2,3-d]pyrimidin-2-yl)-2-methyl-1H-indole-4-carboxamide p-toluenesulfonic acid salt (tosylate) and at least one inactive ingredient selected from pharmaceutically acceptable carriers, diluents, and excipients.

7. The pharmaceutical composition of claim 6, wherein the composition is a solid dosage form.

8. The pharmaceutical composition of claim 7, wherein the solid dosage form is selected from a powder, a tablet, a bite-disintegration tablet, a chewable tablet, a caplet, a capsule, a gelcap, an effervescent powder, a rapid-disintegration tablet, an abuse-deterrent tablet, a modified release tablet, a modified release caplet, a modified release capsule, and an aqueous suspension produced from a powder.

9. The pharmaceutical composition of claim 6, wherein the composition comprises:
   (a) about 10 mg to about 120 mg of 1-(4-(benzylamino)-5,6,7,8-tetrahydropyrido[2,3-d]pyrimidin-2-yl)-2-methyl-1H-indole-4-carboxamide p-toluenesulfonic acid salt (tosylate);
   (b) about 20 mg to about 100 mg of a first filler;
   (c) about 20 mg to about 100 mg of a second filler;
   (d) about 1.0 mg to about 10 mg of a surfactant;
   (e) about 1.0 mg to about 10 mg of a disintegrant;
   (f) about 0.1 mg to about 5 mg of a lubricant; and
   (g) about 0.1 mg to about 5 mg of a glidant.

10. The pharmaceutical composition of claim 9, wherein:
    the first filler and second filler are independently selected from lactose, mannitol, dicalcium phosphate, microcrystalline cellulose, silicified microcrystalline cellulose, starch, and pregelatinized starch (Starch 1500);
    the surfactant is selected from polysorbates, poloxamers, bile salts, glyceryl monostearate, sodium lauryl sulfate, sorbitan monooleate, polyoxyethylene sorbitan monooleate, copolymers of ethylene oxide and propylene oxide, and d-α-tocopheryl polyethylene glycol succinate (Vitamin E TPGS);

the disintegrant is selected from povidone, crospovidone, hypromellose, croscarmellose sodium, hydroxypropyl cellulose, and polyvinyl alcohol;

the lubricant is selected from magnesium stearate, stearic acid, and sodium stearyl fumarate; and/or the glidant is silicon dioxide or talc.

11. The pharmaceutical composition of claim 9, wherein the composition comprises from 20 mg to about 45 mg or about 35 mg 1-(4-(benzylamino)-5,6,7,8-tetrahydropyrido[2,3-d]pyrimidin-2-yl)-2-methyl-1H-indole-4-carboxamide p-toluenesulfonic acid salt (tosylate).

12. A method of treating cancer comprising:
administering the crystalline form of claim 1, or a pharmaceutical composition comprising the crystalline form, to a subject in need thereof;
for use in a method for treating cancer in an individual in need thereof.

13. The method of claim 12, wherein the cancer is a hematological cancer.

14. The method of claim 12, wherein the cancer is selected from the group consisting of acute myeloid leukemia (AML), myelodysplastic syndrome (MDS), myelodysplastic/myeloproliferative overlap neoplasms (MDS/MPN), CMML (chronic myelomonocytic leukemia), atypical CML (chronic myeloid leukemia), multiple myeloma, myeloma, amyloidosis, Waldenstrom's macroglobulinemia (also known as lymphoplasmacytic lymphoma), acute lymphoblastic leukemia (ALL), B-lymphoblastic leukemia, T-lymphoblastic leukemia, lymphoma, B-cell acute lymphoblastic leukemia, T-cell acute lymphoblastic leukemia, B-cell acute lymphoblastic lymphoma, T-cell acute lymphoblastic lymphoma, Burkitt's leukemia/lymphoma, Non-Hodgkin's lymphoma (NHL), chronic lymphocytic leukemia (CLL), small lymphocytic lymphoma (SLL), B-cell NHL, follicular lymphoma, marginal zone lymphoma, mantle cell lymphoma, diffuse large B-cell lymphoma (DLBCL), double/triple hit B-cell lymphoma, myeloproliferative neoplasm (MPN), essential thrombocythemia (ET), polycythemia vera (PV), myelofibrosis, primary myelofibrosis, post-PV myelofibrosis, Post-ET myelofibrosis, chronic myeloid leukemia (CML), blastic plasmacytoid dendritic cell neoplasm (BPDCN), M3 AML, and APL (acute promyelocytic leukemia).

15. The method of claim 12, wherein the method further comprises the administration of a second therapeutic agent.

16. The method of claim 15, wherein the second therapeutic agent is a chemotherapeutic agent, hormonal therapeutic agent, or an immunotherapeutic agent.

17. The method of claim 12, wherein the subject is a human subject.

* * * * *